United States Patent
Witz et al.

(10) Patent No.: US 9,238,321 B2
(45) Date of Patent: Jan. 19, 2016

(54) MOLDING SYSTEM HAVING A RESIDUE CLEANING FEATURE AND AN ADJUSTABLE MOLD SHUT HEIGHT

(71) Applicant: Husky Injection Molding Systems Ltd., Bolton (CA)

(72) Inventors: Jean-Christophe Witz, Yutz (FR); Sven Kmoch, Platten (DE); Ralf Walter Fisch, Saarburg (DE)

(73) Assignee: HUSKY INJECTION MOLDING SYSTEMS LTD., Bolton, Ontario (CA)

( * ) Notice: Subject to any disclaimer, the term of this patent is extended or adjusted under 35 U.S.C. 154(b) by 0 days.

(21) Appl. No.: 14/560,080

(22) Filed: Dec. 4, 2014

(65) Prior Publication Data

US 2015/0091197 A1 Apr. 2, 2015

Related U.S. Application Data

(60) Division of application No. 13/756,693, filed on Feb. 1, 2013, now Pat. No. 9,090,010, and a continuation-in-part of application No. PCT/CA2012/050408, filed on Jun. 20, 2012.

(60) Provisional application No. 61/514,931, filed on Aug. 4, 2011.

(51) Int. Cl.
| | |
|---|---|
| *B29C 45/34* | (2006.01) |
| *B29C 45/17* | (2006.01) |
| *B29C 33/72* | (2006.01) |
| *B29C 45/64* | (2006.01) |

(52) U.S. Cl.
CPC ............. *B29C 45/1753* (2013.01); *B29C 33/72* (2013.01); *B29C 45/34* (2013.01); *B29C 45/64* (2013.01)

(58) Field of Classification Search
CPC B29C 45/1711; B29C 45/2669; B29C 45/34; B29C 2045/2671
See application file for complete search history.

(56) References Cited

U.S. PATENT DOCUMENTS

| | | |
|---|---|---|
| 3,327,353 A | 6/1967 | Eggenberger |
| 4,133,260 A | 1/1979 | Gundal |

(Continued)

FOREIGN PATENT DOCUMENTS

| | | | |
|---|---|---|---|
| EP | 704292 | * | 4/1996 |
| EP | 2343176 A1 | | 7/2011 |

(Continued)

OTHER PUBLICATIONS

PCT International Search Report, 4 pages.

(Continued)

*Primary Examiner* — Jill Heitbrink

(57) ABSTRACT

A method is provided of cleaning of a portion of a mold component, the portion of the mold component including a passage configured, in use, to allow passage of fluid and to prevent passage of melt, the method comprising: entering the mold component into a cleaning configuration, whereby a portion of the passage becomes part of a molding surface; performing a molding cycle to fill in at least the portion of the passage with molding material for incorporation and removal of a residue there from. Also provided is a mold having a first mold half and a second mold half, the halves being movable relative to each other. A mold shut height adjustment apparatus can provide for a change in the mold shut height.

23 Claims, 44 Drawing Sheets

(56) References Cited

U.S. PATENT DOCUMENTS

| | | | |
|---|---|---|---|
| 4,790,173 | A | 12/1988 | Boutcher, Jr. |
| 4,791,803 | A | 12/1988 | Broquet et al. |
| 5,002,479 | A | 3/1991 | Brown et al. |
| 5,135,385 | A | 8/1992 | Fukuzawa et al. |
| 5,397,230 | A | 3/1995 | Brew |
| 5,536,166 | A | 7/1996 | Schad |
| 5,609,099 | A | 3/1997 | Burns et al. |
| 5,666,838 | A | 9/1997 | Dudick et al. |
| 5,682,813 | A | 11/1997 | Brewer et al. |
| 5,704,245 | A | 1/1998 | McClellan et al. |
| 5,853,773 | A | 12/1998 | Choi |
| 5,884,520 | A | 3/1999 | Bakermans |
| 5,906,777 | A | 5/1999 | Kamiguchi et al. |
| 5,909,913 | A | 6/1999 | Fitz, Jr. et al. |
| 5,915,293 | A | 6/1999 | Welsh et al. |
| 5,937,510 | A | 8/1999 | Seiersen et al. |
| 5,964,134 | A | 10/1999 | Arends |
| 6,055,904 | A | 5/2000 | Chun et al. |
| 6,200,122 | B1 | 3/2001 | Chun et al. |
| 6,408,673 | B1 | 6/2002 | Korner et al. |
| 6,468,449 | B1 | 10/2002 | Fujikawa |
| 6,715,409 | B2 | 4/2004 | Brewer |
| 6,814,908 | B2 | 11/2004 | Marazita |
| 6,832,906 | B2 | 12/2004 | Hamann |
| 6,945,765 | B2 | 9/2005 | Roetzel |
| 7,128,865 | B2 | 10/2006 | Martin |
| 7,220,117 | B2 | 5/2007 | Steil et al. |
| 7,452,199 | B2 | 11/2008 | Eigler et al. |
| 7,455,515 | B2 | 11/2008 | Pruden et al. |
| 7,481,642 | B2 | 1/2009 | Niewels |
| 7,811,497 | B2 | 10/2010 | Balint et al. |
| 7,939,009 | B2 | 5/2011 | Balboni et al. |
| 8,709,326 | B2 | 4/2014 | Sakamoto |
| 2002/0127292 | A1 | 9/2002 | Gallinotti et al. |
| 2007/0212443 | A1 | 9/2007 | Li et al. |
| 2008/0211129 | A1 | 9/2008 | Dubay |

FOREIGN PATENT DOCUMENTS

| | | | |
|---|---|---|---|
| JP | 03-199023 | * | 8/1991 |
| JP | 2009056633 A | | 3/2009 |

OTHER PUBLICATIONS

European Search Report, Mar. 11, 2015, 6 pages.

* cited by examiner

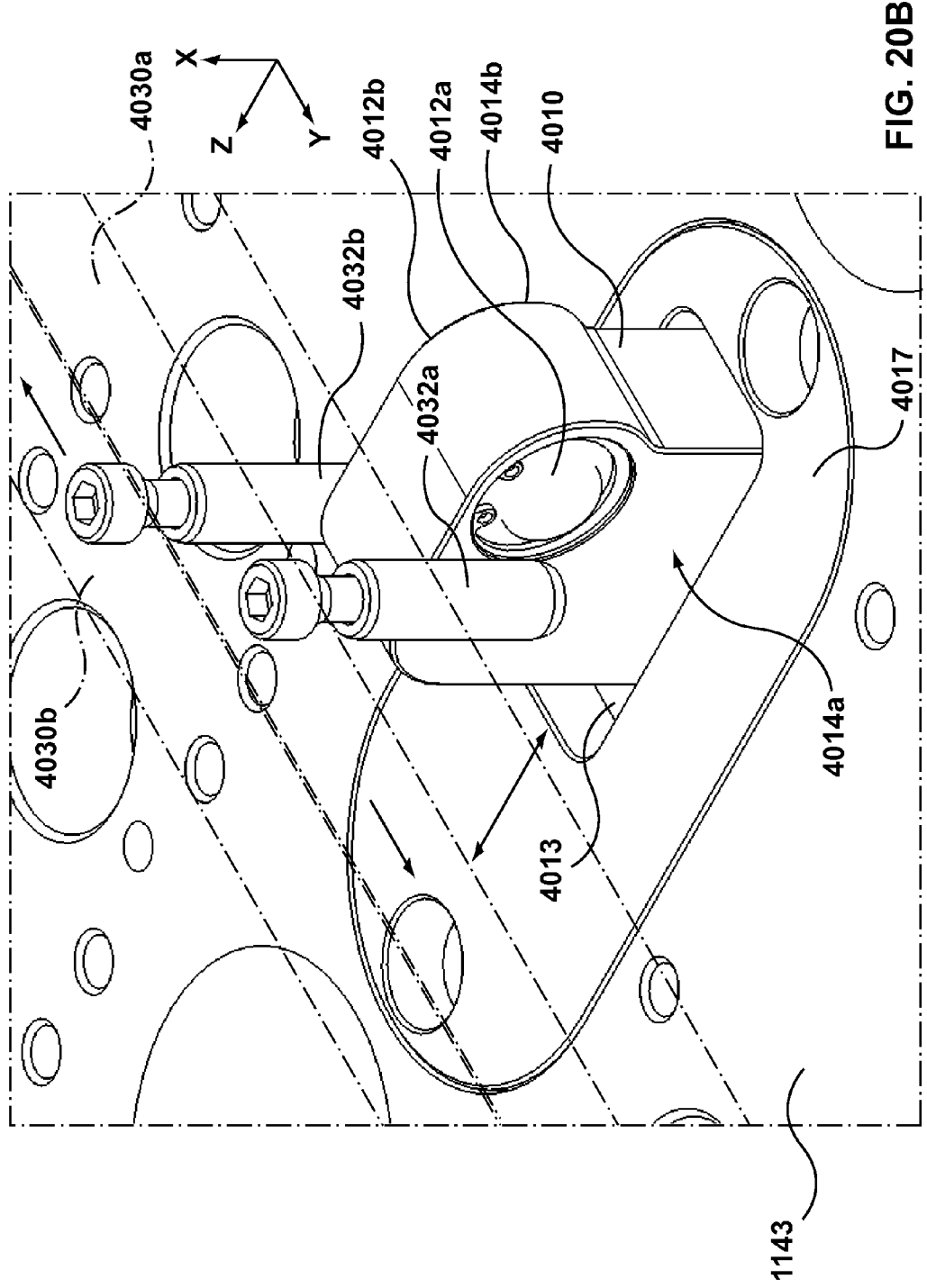

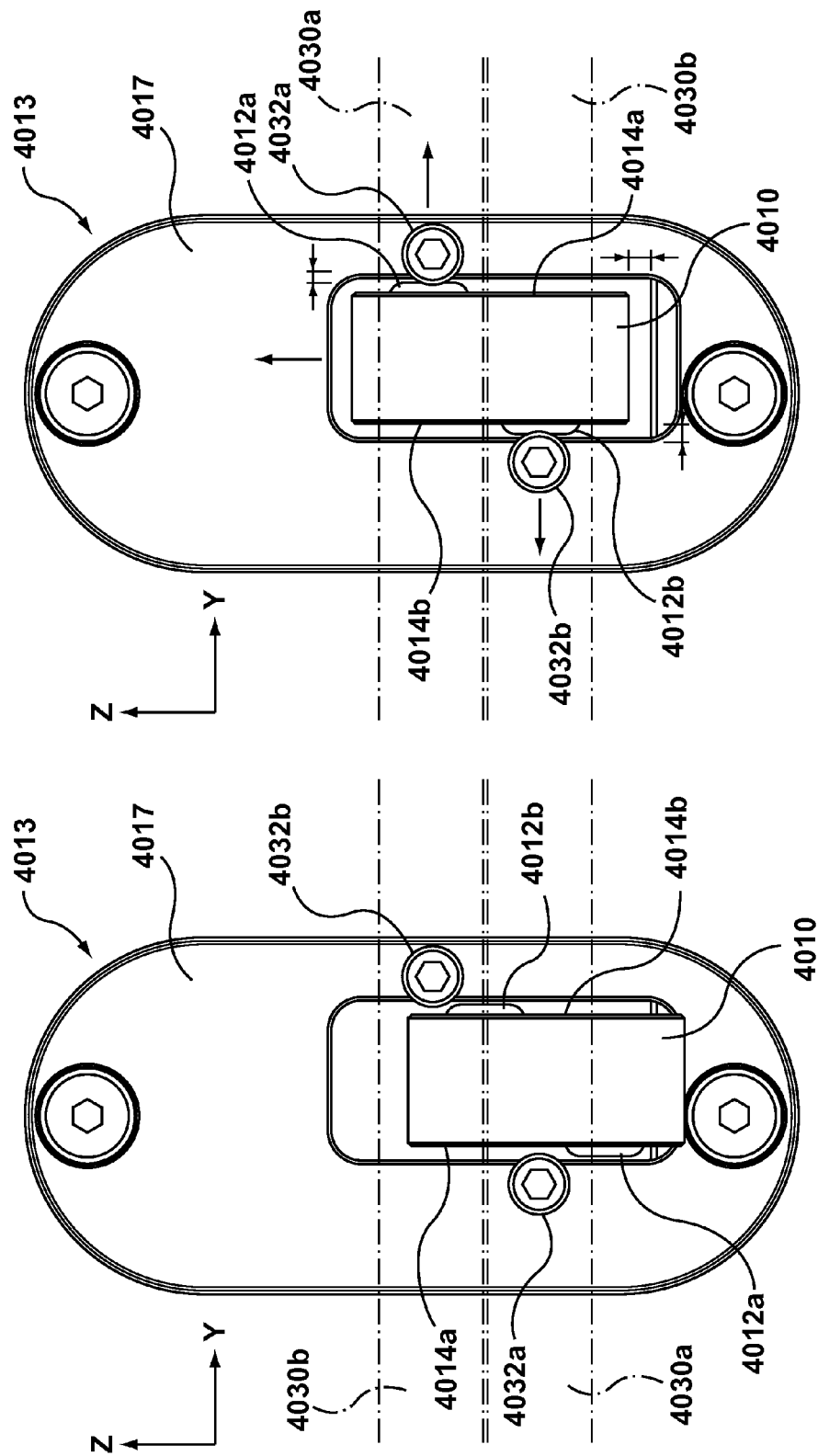

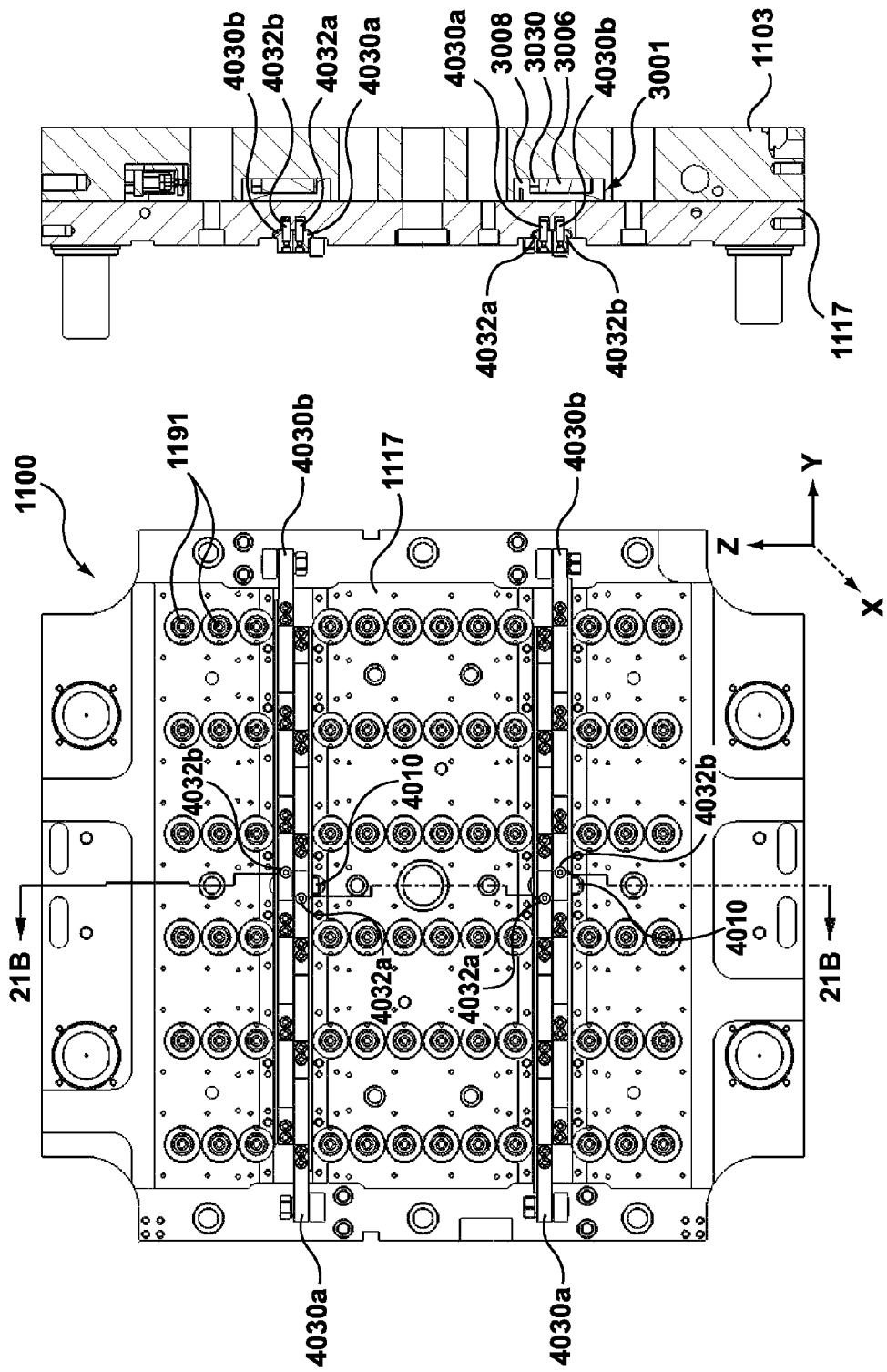

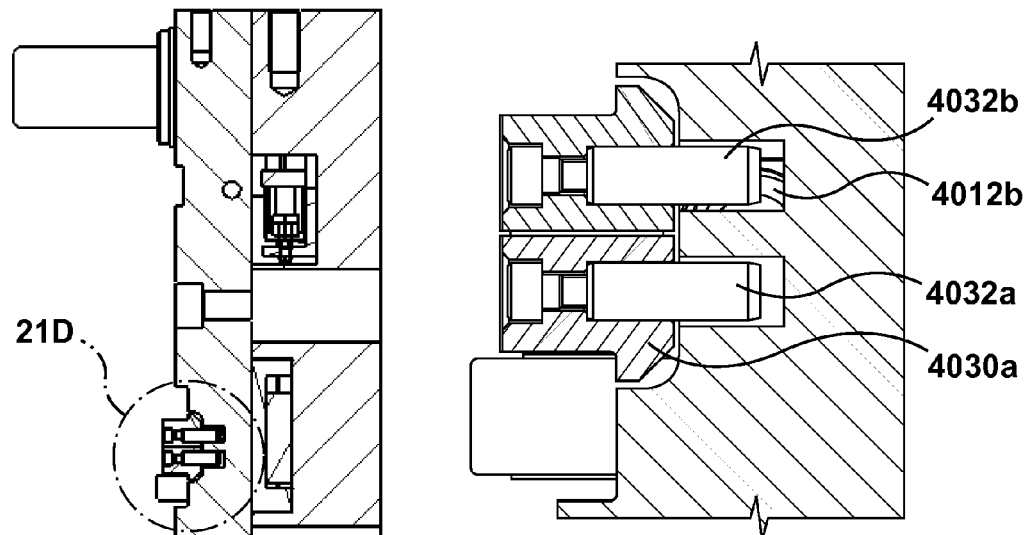
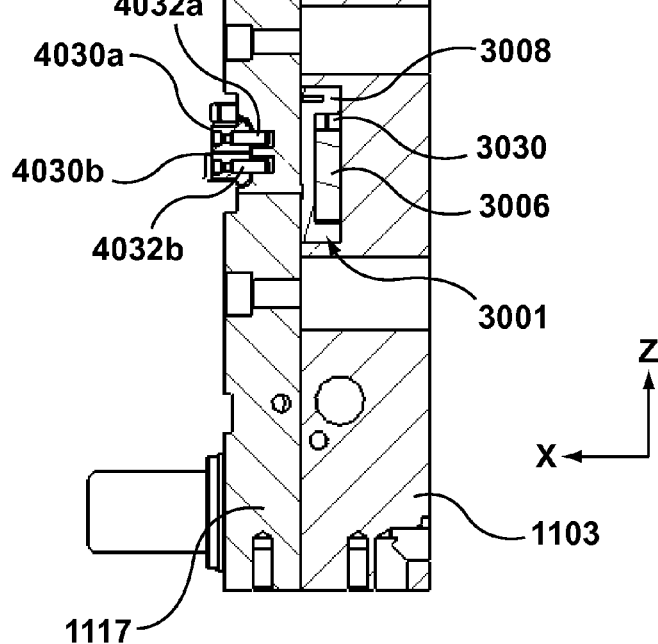
FIG. 21D
FIG. 21C

MOLDING SYSTEM HAVING A RESIDUE CLEANING FEATURE AND AN ADJUSTABLE MOLD SHUT HEIGHT

RELATED APPLICATIONS

This application is a divisional of U.S. patent application Ser. No. 13/756,693 which is a continuation-in-part of PCT patent application serial no. PCT/CA2012/050408 filed Jun. 20, 2012, designating inter alia the United States of America, and which claimed priority from U.S. provisional patent application Ser. No. 61/514,931 filed Aug. 4, 2011, the entire subject contents of both such patent applications being hereby incorporated by reference in their entirety herein as if fully set forth herein.

FIELD OF THE INVENTION

The present invention generally relates to, but is not limited to, molding systems, and more specifically the present invention relates to, but is not limited to, molding systems having a residue cleaning feature and to molding systems with an adjustable mold shut height and/or adjustable neck ring configuration.

BACKGROUND OF THE INVENTION

Molding is a process by virtue of which a molded article can be formed from molding material by using a molding system. Various molded articles can be formed by using the molding process, such as an injection molding process. One example of a molded article that can be formed, for example, from Polyethylene Teraphalate (PET) material is a preform that is capable of being subsequently blown into a beverage container, such as, a bottle and the like.

As an illustration, injection molding of PET material involves heating the molding material (ex. PET pellets, etc.) to a homogeneous molten state and injecting, under pressure, the so-melted PET material into a molding cavity defined, at least in part, by a female cavity piece and a male core piece mounted respectively on a cavity plate and a core plate of the mold. The cavity plate and the core plate are urged together and are held together by clamp force, the clamp force being sufficient enough to keep the cavity and the core pieces together against the pressure of the injected PET material. The molding cavity has a shape that substantially corresponds to a final cold-state shape of the molded article to be molded. The so-injected PET material is then cooled to a temperature sufficient to enable ejection of the so-formed molded article from the mold. When cooled, the molded article shrinks inside of the molding cavity and, as such, when the cavity and core plates are urged apart, the molded article tends to remain associated with the core piece. Accordingly, by urging the core plate away from the cavity plate, the molded article can be demolded, i.e. ejected off of the core piece. Ejection structures are known to assist in removing the molded articles from the core halves. Examples of the ejection structures include stripper plates, ejector pins, etc.

When dealing with molding a preform that is capable of being blown into a beverage container, one consideration that needs to be addressed is forming a so-called "neck portion". Typically and as an example, the neck portion includes (i) threads (or other suitable structure) for accepting and retaining a closure assembly (ex. a bottle cap), and (ii) an anti-pilferage assembly configured to cooperate, for example, with the closure assembly to indicate whether the end product (i.e. the beverage container that has been filled with a beverage and shipped to a store) has been tampered with in any way. The neck portion may comprise other additional elements used for various purposes, for example, to cooperate with parts of the molding system (ex. a support ledge, etc.). As is appreciated in the art, the neck portion can not be easily formed by using the cavity and core halves. Traditionally, split mold inserts (sometimes referred to by those skilled in the art as "neck rings") have been used to form the neck portion.

With reference to FIG. 1, a section along a portion of an injection mold 50 illustrates a portion of typical molding insert stack assembly 60 that is arranged within a molding system (not depicted). The description of FIG. 1 that will be presented herein below will be greatly simplified, as it is expected that one skilled in the art will appreciate general configuration of other components of the injection mold 50 that will not be discussed in the following description.

The molding insert stack assembly 60 includes a neck ring insert pair 52 that together with a mold cavity insert 54, a gate insert (not shown) and a core insert 61 define a molding cavity (not separately numbered) where molding material can be injected to form a molded article, such as a preform 63. In order to facilitate forming of the neck portion of the preform 63 and subsequent removal of the preform 63, the neck ring insert pair 52 comprises a pair of complementary neck ring inserts that are mounted on adjacent slides of a slide pair 68. The slide pair 68 is slidably mounted on a top surface of a stripper plate 66. As commonly known, and as, for example, generally described in U.S. Pat. No. 6,799,962 to Mai et al (granted on Oct. 5, 2004), the stripper plate 66 is configured to be movable relative to a cavity plate assembly 74 and a core plate assembly (not depicted), when the mold is arranged in an open configuration, whereby the slide pair 68, and the complementary neck ring insert pair 52 mounted thereon, can be laterally driven, via a cam arrangement or some other means (not shown), for the release of the molded article from the molding cavity.

A typical neck ring insert has a body that includes a pair of projecting portions 70 that extend from a top and a bottom face of a flange portion 72 (i.e. a top projecting portion and a bottom projecting portion). Typically, the bottom face of the flange portion 72 abuts, in use, a top surface of the slide pair 68. Even though not depicted in FIG. 1, one skilled in the art will appreciate that the neck ring insert pair 52 cooperates with suitable fasteners for connecting to a respective one of the slide pair 68. In use, during certain portions of a molding cycle, the top projecting portion cooperates with a female receptacle disposed on the cavity plate assembly 74.

FIG. 2 depicts an example of a prior art implementation of a neck ring 200 of the neck ring insert pair 52. More specifically, FIG. 2 depicts a front planar view of the neck ring 200. The neck ring 200 comprises a molding surface 202 for forming, in use, various portions of the neck finish of the preform and a mating surface 204 for abutting, in use, another one of the neck ring 200. The neck ring 200 further includes a venting structure 206. The venting structure 206 comprises (i) an air vent groove 208 for collecting and venting, in use, excess air from the molding cavity as it is being filled with the molding material and (ii) an air collector groove 210 in fluid communication with the air vent groove 208 for providing an evacuation path for the air to be vented from the vent groove 208.

U.S. Pat. No. 7,939,009 issued to Balboni, et al. on May 10, 2011 discloses a preform that is formed by an upper neck which maintains unchanged its form in the final object and a hollow body, joined to the neck. The method foresees the insertion, within a matrix cavity, of a metered body of polymeric material whose mass is metered according to a reference value, and the subsequent pressure insertion of a punch within the matrix cavity until it closes the mold's molding chamber, the punch conferring the shape to the inner surface of the preform and the matrix having an inner surface which confers the shape to the outer surface of the preform. According to the invention, in the molding of the preform, the error of the mass of the metered body with respect to the reference value is distributed in the hollow body, which undergoes a subsequent hot deformation until it achieves the final shape. In the mold, the matrix comprises at least one deformable wall (31) whose inner surface defines at least part of the inner surface of the matrix part intended to give form to the hollow body of the preform, said deformable wall (31) having, at least in part, a relatively thin thickness which permits it to be elastically deformed under the pressure of the polymeric material in the final preform molding step, thereby varying the thickness of the hollow body.

U.S. Pat. No. 7,128,865 issued to Martin on Oct. 31, 2006 discloses an injection molding method and apparatus for ejecting a molded plastic preform from a mold. A first lifting structure and/or step is configured to have an inner surface with an area for sealing and aligning with a complementary surface on a core, and to have an upper surface with an area for sealing and aligning with a complementary surface on a second lifting structure, said upper surface of said first lifting structure being configured to lift a molded plastic preform from the injection mold in a lifting direction for a first period of time, the lower portion of the molded plastic preform lying in a plane substantially perpendicular to the lifting direction. A second lifting structure and/or step is configured to have an inner surface configured to lift an outer surface of the molded plastic preform from the injection mold in the lifting direction for a second period of time, the outer surface of the molded plastic preform including structure lying in a plane substantially parallel with the lifting direction. Since the molded plastic preform is lifted by its end, the preform does not have to be solidified at its interior, thus allowing earlier removal of the preform from the mold, reducing cycle time.

U.S. Pat. No. 7,481,642 issued to Niewels on Jan. 27, 2009 discloses a method and apparatus for controlling a vent gap in a mold for an injection molding machine, which include an active material insert configured to be regulate the degree of opening of the vent gap. The active material insert is configured to be actuated in response to signals from a controller, so as to selectively block the opening of the vent gap during the molding process. Wiring structure is coupled to the active material insert, and is configured to carry the actuation signals. Melt flow sensors may also be provided to aid in regulating the vent gap, and may be connected to the controller in order to provide real-time closed loop control over the operation of the vent gap. Preferably, the methods and apparatus are used as part of a system for controlling the flow of melt within a mold cavity.

SUMMARY OF THE INVENTION

According to a first broad aspect of the present invention, there is provided a method of cleaning of a portion of a mold component, the portion of the mold component including a passage configured, in use, to allow passage of fluid (such as air) and to prevent passage of melt, the method comprising: entering the mold component into a cleaning configuration, whereby a portion of the passage becomes part of a molding surface; performing a molding cycle to fill in at least the portion of the passage with molding material for incorporation and removal of a residue therefrom.

According to a second broad aspect of the present invention, there is provided a mold component configured to be actuated between: a first configuration in which the mold component comprises a passage that allows passage of fluid (such as air) and prevents passage of the melt; and a second configuration in which the passage is actuated such as to become part of a molding surface.

According to a third broad aspect of the present invention, there is provided a neck ring for defining at least a portion of a neck portion of a preform, the neck ring comprising: a molding surface defining a portion of a molding cavity for defining the at least a portion of the neck portion of the preform; a venting structure for evacuating the fluid, in use, from the molding cavity, the venting structure including: a primary vent groove; a secondary vent groove; a pocket groove in fluid communication with both the primary vent groove and the secondary vent groove.

According to a fourth broad aspect of the present invention, there is provided a method of operating a mold comprising: maintaining a neck ring in a standard molding configuration and executing at least one molding cycle; actuating the neck ring into a vent cleaning configuration and executing at least one molding cycle in the vent cleaning configuration to remove residue from at least a primary vent groove of the neck ring.

According to another broad aspect of the present invention, there is provided a distance augmenting structure for use in an injection molding machine between a first machine component and a second machine component, the distance augmenting structure comprising: a base operatively attachable, in use, to one of the first machine component and a second machine component; an actuator, a distance adjustment insert operatively coupled to the actuator, the actuator being configured to translate the distance adjustment insert between an outbound position in which position the distance adjustment insert is positioned away from the first machine component and the second machine component; and an in-bound position, in which the distance adjustment insert is positioned between the first machine component and the second machine component, in which inbound position the distance adjustment insert is configured to increase distance between the first machine component and the second machine component.

According to yet another broad aspect of the present invention, there is provided a method of operating a mold, the mold comprising a first mold half and a second mold half, the first mold half and the second mold half defining a passage configured, in use, to allow passage of fluid and to prevent passage of melt, the method comprising: maintaining the mold in a standard molding configuration and executing at least one molding cycle; actuating the first mold half and the second mold half into a cleaning configuration and executing at least one molding cycle in the cleaning configuration to remove residue from at least a portion of the passage.

According to another broad aspect of the invention there is provided an injection mold comprising a first mold half and a second mold half. The first and second mold halves are supported and movable relative to each other, and the first and second mold halves have a mold shut height when said mold is an operational configuration. The mold also comprise a mold shut height adjustment apparatus operable to provide for a change in the mold shut height.

According to another broad aspect of the invention there is provided a method of operating an injection mold comprising: (i) operating the mold in a first operational configuration; (ii) varying a mold shut height of the mold; and operating the mold in a second operational configuration.

According to another broad aspect of the invention there is provided a mold height adjustment apparatus for an injection mold. The injection mold comprises a first mold half and a second mold half, the first and second mold halves being supported and movable relative to each other and the first and second mold halves having a mold shut height when said mold is an operational configuration. The mold shut height adjustment apparatus is operable to provide for a change in the mold shut height.

These and other aspects and features of non-limiting embodiments of the present invention will now become apparent to those skilled in the art upon review of the following description of specific non-limiting embodiments of the invention in conjunction with the accompanying drawings.

DESCRIPTION OF THE DRAWINGS

A better understanding of the embodiments of the present invention (including alternatives and/or variations thereof) may be obtained with reference to the detailed description of the non-limiting embodiments along with the following drawings, in which:

FIGS. 20B-20C are enlarged views of portions marked 20B, 20C, respectively, of the sub-assembly of FIG. 20A;

FIG. 20F is a top plan view of the portion marked 20B in FIG. 20A in one operational position;

FIG. 20G is a top plan view of the portion in FIG. 20F but in another operational position;

FIG. 21A is a front elevation view of a stripper plate of the mold of FIG. 14, mounted on the core plate of FIG. 15;

FIG. 21B is a cross-sectional view of the stripper plate and core plate of FIG. 21A at section 21B-21B in FIG. 21A.

FIG. 21C is an enlarged view of the cross-section shown in FIG. 21B;

FIG. 21D is an enlarged view of the portion marked 21D in FIG. 21C;

The drawings are not necessarily to scale and are may be illustrated by phantom lines, diagrammatic representations and fragmentary views. In certain instances, details that are not necessary for an understanding of the non-limiting embodiments or that render other details difficult to perceive may have been omitted.

DETAILED DESCRIPTION OF EMBODIMENTS

Figure 6:
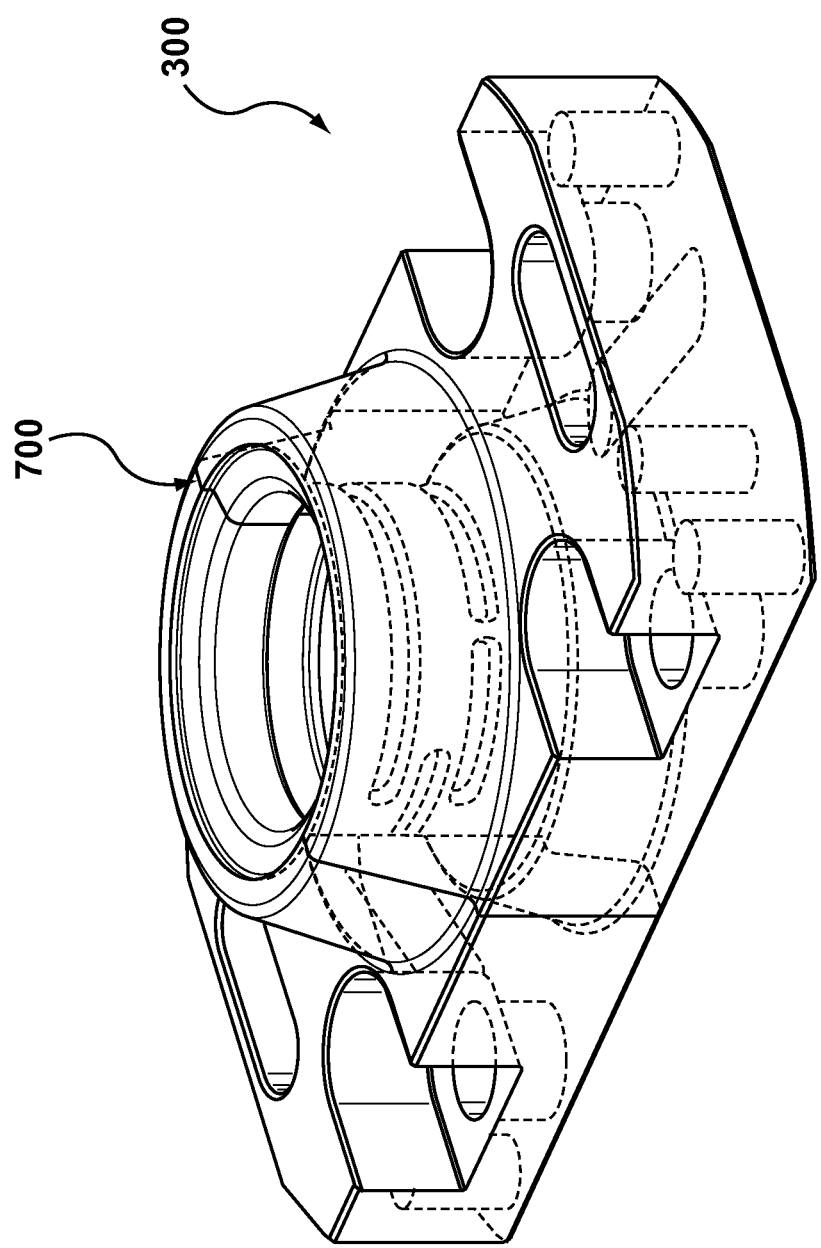
FIG. 6 depicts a perspective view of the entirety of the neck ring 300 implemented in accordance with non-limiting embodiments of the present invention.
Figure 7:
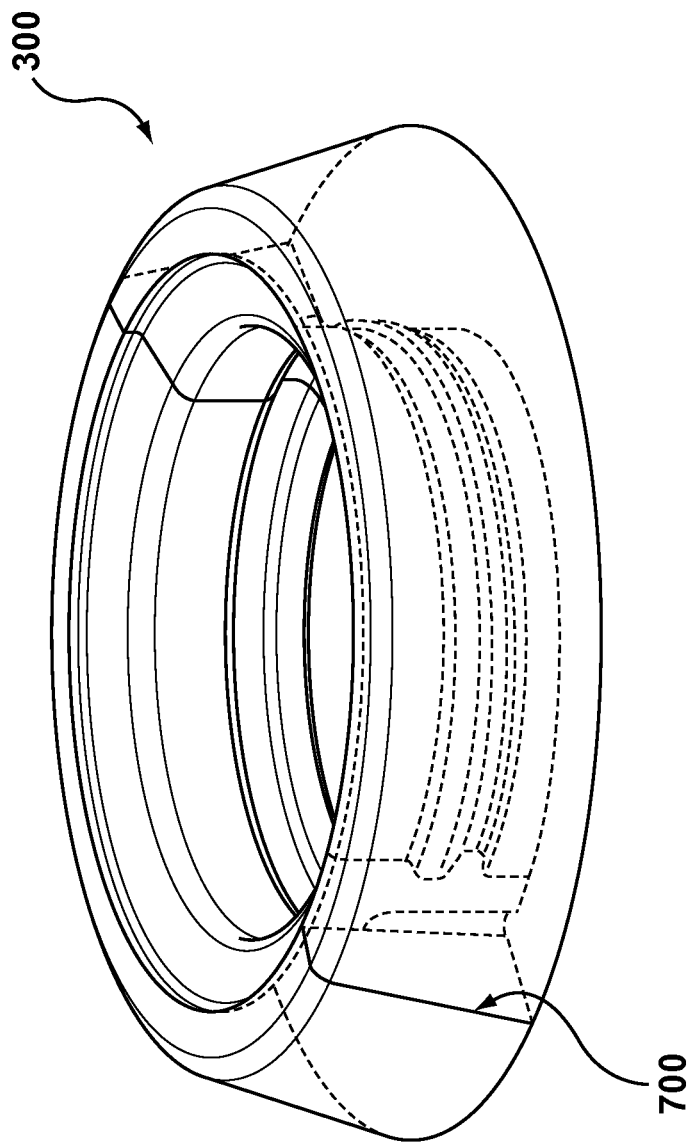
FIG. 7 depicts a perspective view of a portion of the neck ring 300 of FIG. 6.

With reference to FIGS. 6 and 7, there is depicted a perspective view of a neck ring 300, the neck ring 300 being suitable for implementation of embodiments of the present invention. FIG. 6 depicts a perspective view of the entirety of the neck ring 300, while FIG. 7 depicts a perspective view of a portion of the neck ring 300. The neck ring 300 comprises of two halves thereof, the halves of the neck ring 300 defining therebetween a shut off face 700.

Further description will make continued reference to FIGS. 6 and 7, and will make reference to FIGS. 3A-3F, which depict the neck rings 300 in various stages of the molding and vent cleaning cycles, as will be described in greater detail herein below.

Figure 1:
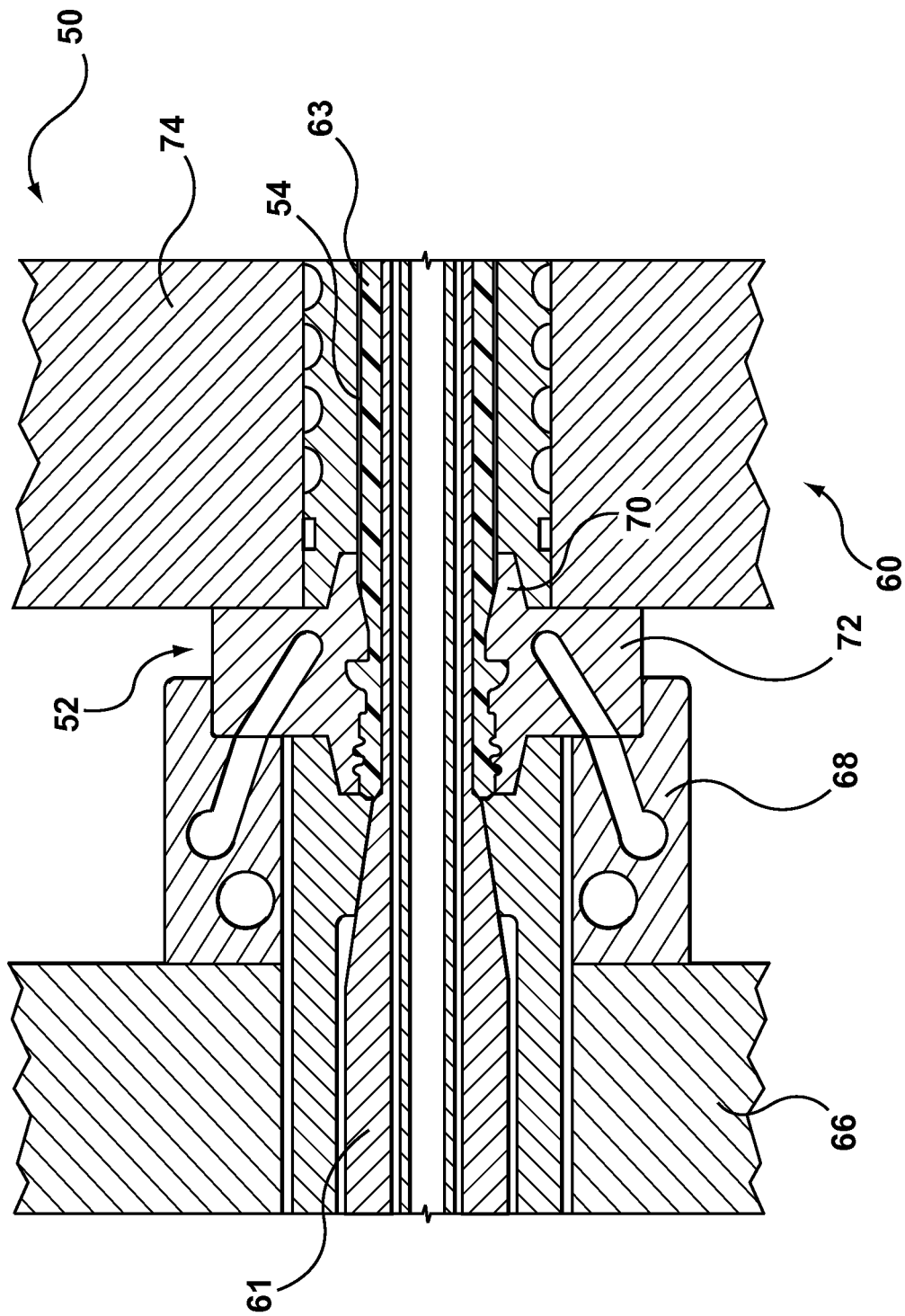
FIG. 1 depicts a cross-section along an operational axis of a molding stack implemented in accordance with known techniques.
Figure 2:
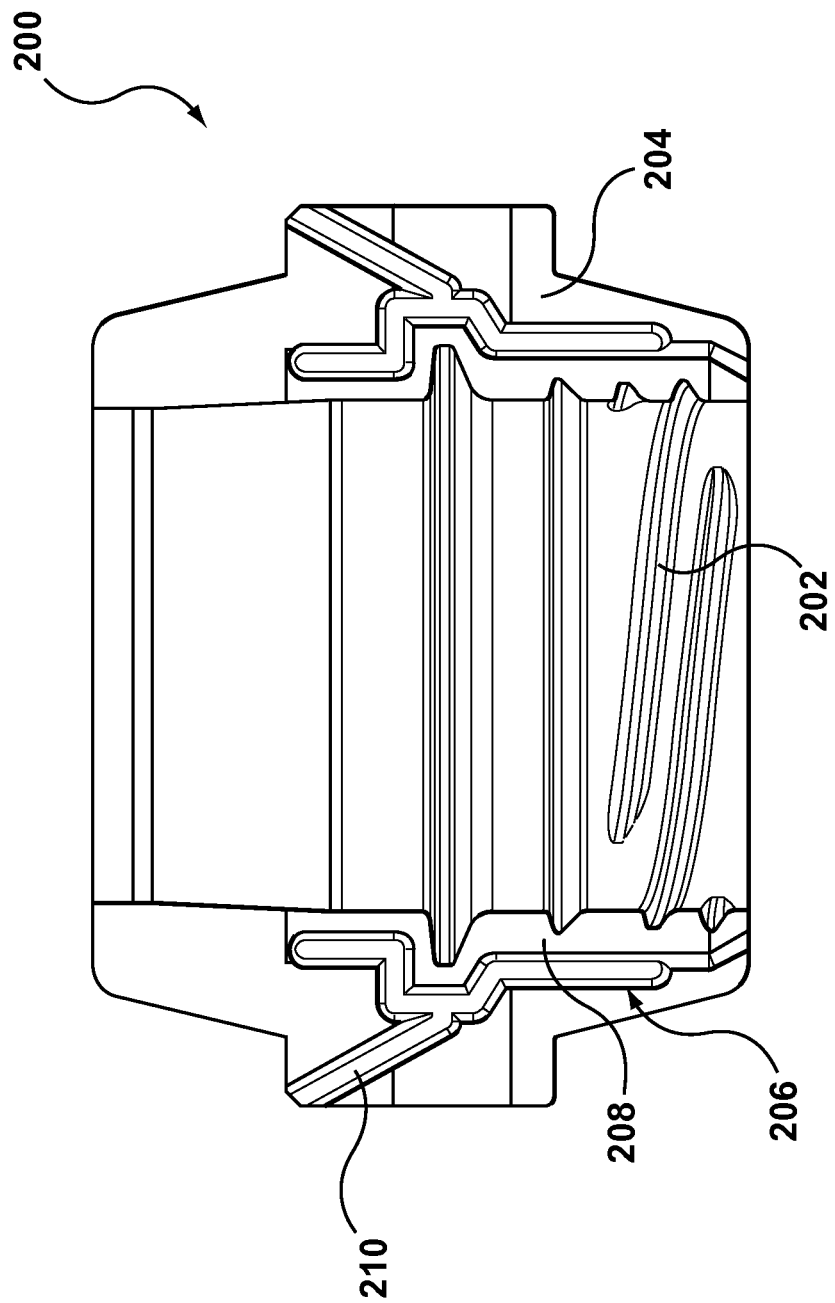
FIG. 2 is a front planar view of a neck ring of the molding stack of FIG. 1, implemented in accordance with known techniques.
Figure 3B:
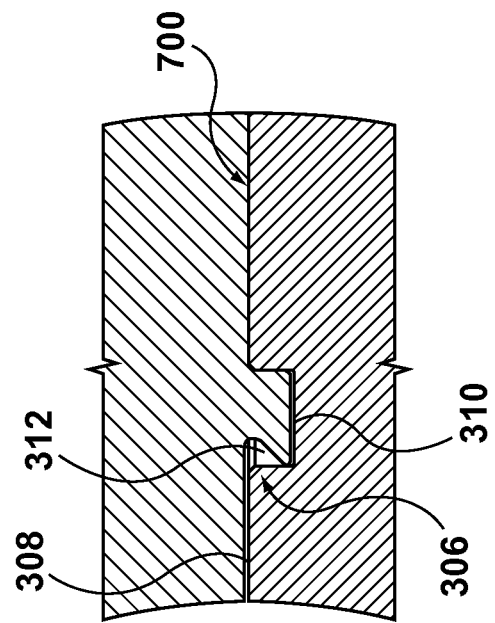
FIGS. 3A-3F depict a schematic top view of a neck ring implementing embodiments of the present invention, the neck ring in a standard molding configuration and in progression through vent cleaning configurations.
Figure 3A:
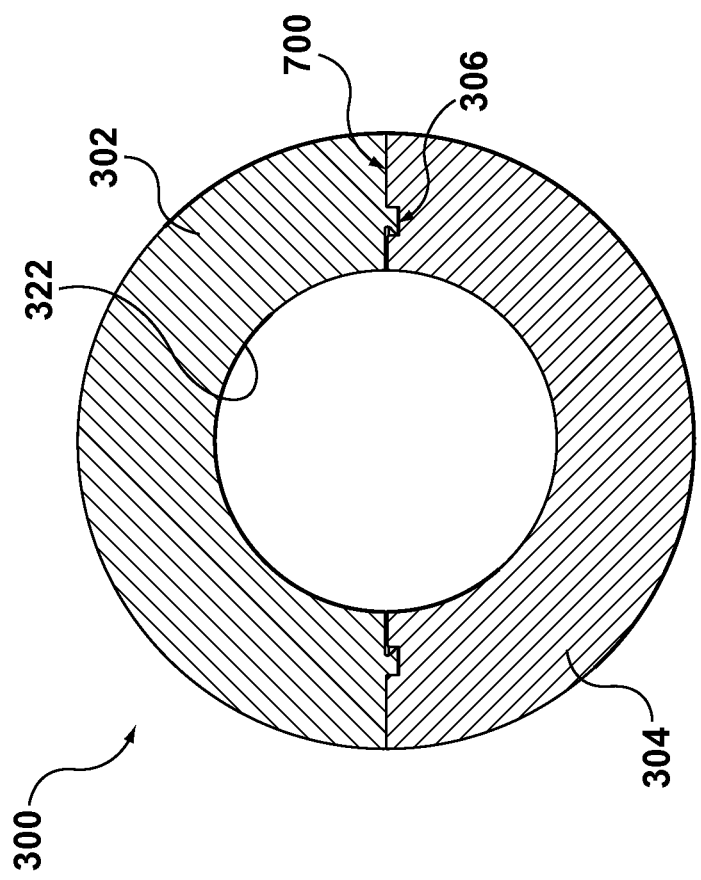

In particular, FIG. 3A depicts a schematic representation of the top view of the neck ring 300 in a "standard molding configuration", the neck ring 300 being implemented in accordance with non-limiting embodiments of the present invention. FIG. 3B depicts a portion of the neck ring 300 of FIG. 3A in greater detail. The neck ring depicted in FIG. 3A comprises a first body portion 302 and a second body portion 304. In the embodiment being depicted herein, the first body portion 302 and the second body portion 304 are embodied in a first neck ring half and a second neck ring half. Defined between the first body portion 302 and the second body portion 304 is the aforementioned shut off face 700. Within the shut off face 700, there is provided a venting structure 306. The general purpose of the venting structure 306, much akin to the prior art implementation of the venting structure, is for collecting and venting, in use, excess fluid (such as air) from the molding cavity and providing an evacuation path for such vented air. Within these embodiments, the venting structure 306 comprises a primary vent area 308 and a secondary vent area 310. It is noted that "vent area" is also referred to by some skilled in the art as "vent grooves", but it is not so limited. In the depicted embodiments, the primary vent area 308 and the secondary vent area 310 are implemented as cooperating (or tandem) structures. As an example only and by no means as a limitation, the primary vent area 308 and the secondary vent area 310 are implemented as parallel to each other, but other spatial relationship can be implemented in alternative embodiments of the present invention.

There is also defined a pocket groove 312, located in-between and in fluid communication with the primary vent area 308 and the secondary vent area 310. In the specific example depicted herein, the pocket groove 312 is generally triangular in shape. However, this needs not be so in every embodiments of the present invention and the shape of the pocket groove 312 can be implemented differently. In other words, the pocket groove 312 can be implemented in a different form factor. The general purpose for the pocket groove 312 is to provide a reservoir for rapid evacuation of fluid (such as air) from the molding cavity through the primary vent area 308.

Recalling that the neck ring 300 of FIG. 3A is depicted in the standard molding configuration, the primary vent area 308 is dimensioned for (i) allowing the passage of the evacuated fluid (such as air) from the molding cavity into the pocket groove 312 and (ii) not allowing any substantial amount of the molding material for passing therethrough. In a particular example of an implementation, the width of the primary vent area 308 can be between 0.03 and 0.04 mm, in case of the molding of PET preforms.

At the same time, the dimension of the secondary vent area 310 is such that it prevents the passage of any substantial amount of the molding material for passing therethrough. In the specific examples, the walls of the shut off face 700 defining the secondary vent area 310 can touch each other in order to prevent the passage of evacuated fluid (such as air) and to prevent the flow of molding material, in this standard molding configuration or, alternatively, they can define a gap there between, which gap allows for the flow of evacuated fluid (such as air) but prevents passage of the molding material.

Figure 3C:
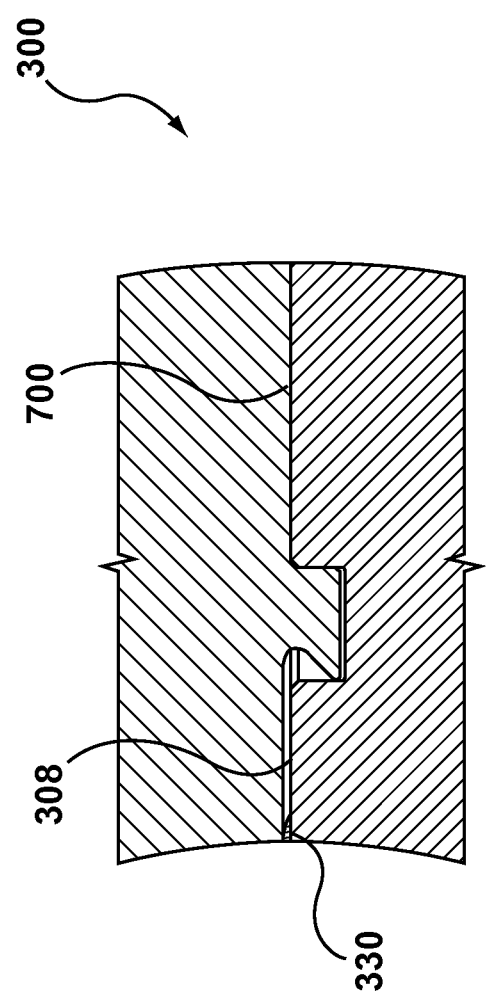
Figure 3E:
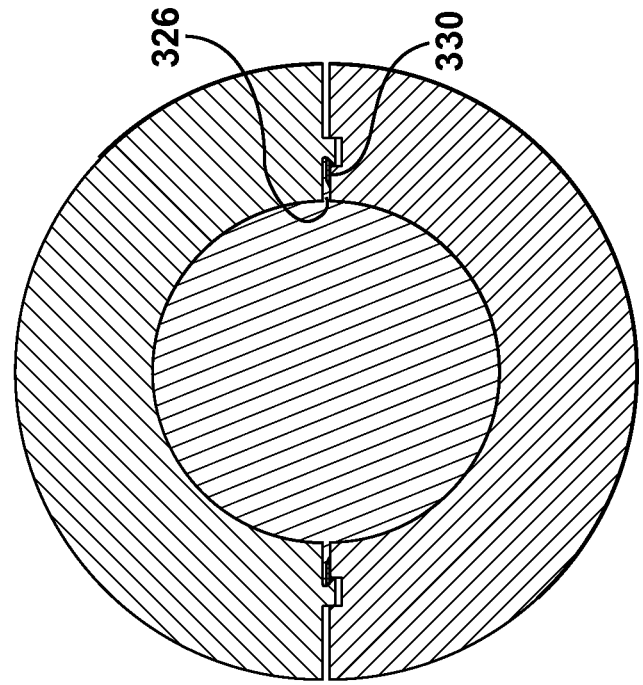
Figure 3D:
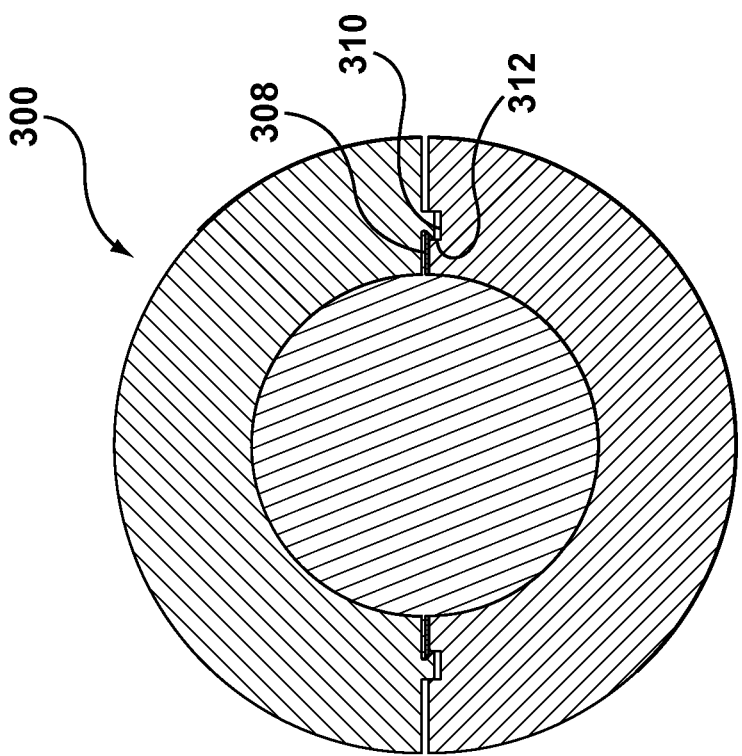
Figure 3F:
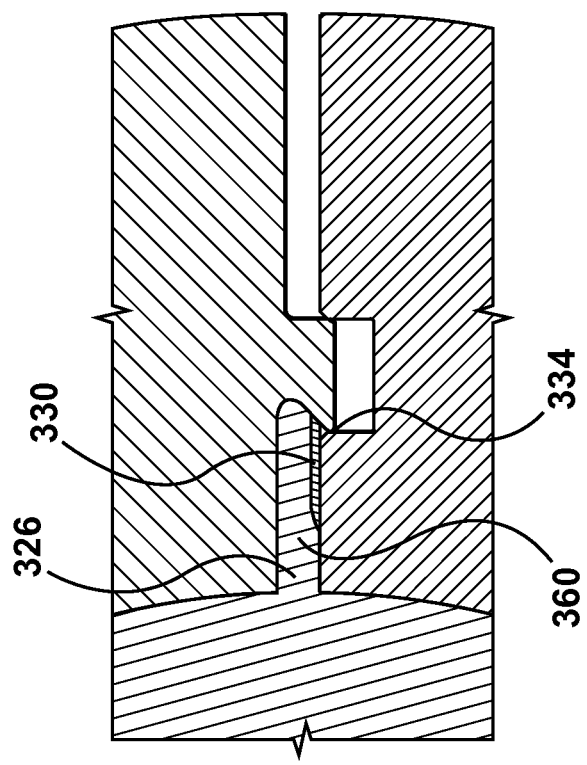
Figure 4:
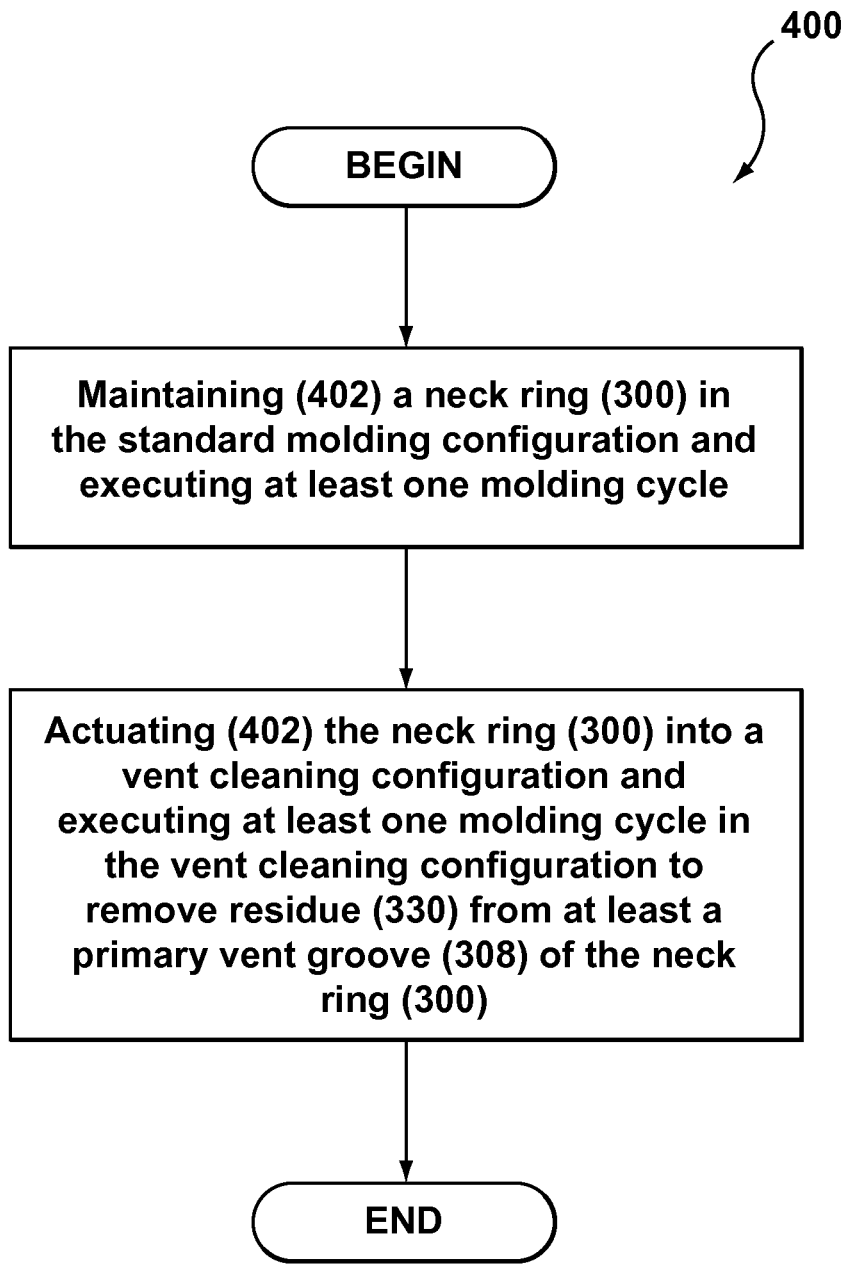
FIG. 4 depicts a flow chart of a method for molding and vent cleaning implemented in accordance with non-limiting embodiments of the present invention.

Within the configuration of FIG. 3D and as is more clearly visible in FIG. 3F, there is also provided an apex point 334. The apex point 334 is sized such as to provide the path for evacuated fluid (such as air) towards the secondary vent area 310 while preventing the flow of any substantial amount of molding material there through (in other words, the apex point 334 is the beginning portion of the secondary vent area 310, while the remainder of the secondary vent area 310 starts to act as a reservoir for the escaped air). It is noted that in some embodiments of the present invention, in the vent cleaning configuration, the apex point 334 provides a clearance of approximately 0.03 to 0.04 mm.

To complete the description of FIG. 3A and FIG. 3B, there are also depicted a molding surface 322 that cooperates with a portion of a core (not depicted), which define therebetween a portion of a molding cavity (not separately numbered) into which molding material flows to define a molded article.

With reference to FIG. 3C, after a certain number of molding cycles, there tends to accumulate some residue 330 along at least a portion of the primary venting groove 308 (such as material dust, contaminants or other undesirable particles or the like).

With reference to FIG. 3D, there is depicted a schematic representation of the top view of the neck ring 300 in a "vent cleaning configuration", the neck ring 300 being implemented in accordance with embodiments of the present invention. In embodiments of the present invention, this configuration can be thought of as "breathing mode" or "controlled flash molding" configuration. Accordingly and as means of an example, this vent cleaning configuration can be entered into by means of decreasing clamp pressure (by means of software adjustment, for example), compared to the standard molding configuration, depicted in FIG. 3A, for example.

In an example embodiment, it is contemplated that the clamp tonnage can be lowered by approximately ten to fifteen percent below the minimum injection pressure for the same mold. As an example, in a typical 72-cavity mold used for a water application with split at support ledge with diameter 34 mm, an operational tonnage (i.e. one applied in configuration of FIG. 3A) can be around 290 tons, with the minimum process tonnage of 230 tons, while the tonnage used for entering the vent cleaning configuration can be about 200 tons.

Recalling that the neck ring 300 of FIG. 3D is depicted in the vent cleaning configuration (or, more specifically in a configuration at the beginning of the vent cleaning process in accordance with embodiments of the present invention), the primary vent area 308 is dimensioned for allowing passage of the molding material therethrough. In a sense, in the vent cleaning configuration, the primary vent area 308 becomes part of the molding surface and allowing the molding material 326 to fill in the primary vent area 308 in the vent cleaning configuration. At the same time, the secondary vent area 310 is dimensioned for (i) allowance of the passage of the evacuated fluid (such as air) from the primary vent area 308 and (ii) not allowing any substantial amount of the molding material for passing therethrough. In a sense, within the vent cleaning configuration, the secondary vent area 310 "becomes" or executes the function of the primary vent area 308 as depicted in FIG. 3A (i.e. in the standard molding configuration).

With reference to FIG. 3E, the commencement of the vent cleaning phase is depicted, whereby molding material 326 starts to fill in the molding cavity defined between the neck ring 300 and the core 314. Eventually, the molding material 326 starts to fill the primary vent area 308, including or incorporating the residue 330. With reference to FIG. 3F, the molding material 326 continues to travel through the primary vent area 308, at this point fully incorporating the residue 330. As such, at the end of the vent cleaning cycle, the molding material 326 has fully filled the primary vent area 308 and has fully incorporated the residue 330. At this point, the molding material 326 allowed to cool down, in a standard manner.

After a sufficient period of time to allow the molding material 326 to cool down sufficiently to enable removal thereof from the neck ring 300 the molded article is ready for removal from the neck ring 300. As can be appreciated, the resultant molded article includes a molded appendix 360, which generally corresponds in shape to the shape of the primary vent area 308 incorporating the residue 330. As such, ejection of the molded article, including the molded appendix 360, results in effectively removing it from the neck ring 300.

In some embodiments of the present invention, the inner walls of either or both of the primary vent area 308 and the secondary vent area 310 can be coated with a coating to reduce sticking of the molding material 326 thereto.

Given the architecture described above with reference to FIGS. 3A-3F, it is possible to execute a method of molding and vent cleaning in accordance with embodiments of the present invention. Generally speaking, embodiments of the present invention allow to actuate the neck ring 300 between the standard molding configuration (in which a molded article, such as preform suitable for subsequent blow molding can be molded) and the vent cleaning configuration (in which residue 330 can be removed from the primary vent area 308). Furthermore, according to embodiments of the present invention, the controlled flash condition is used to clean the vent areas and to remove the undesired particles therefrom. More specifically, in the vent cleaning configuration, the melt is used to fill in the primary vent area 308 for incorporation and removal of the residue 330.

More specifically, a method 400 can be executed by a controller (not depicted) of a molding machine (not depicted), both can be executed in accordance with known prior art techniques. The molding machine including the neck ring(s) 300 in accordance with the number of molding cavities desirable.

Step 402

At step 402, the neck ring 300 is maintained in the standard molding configuration, as that of FIG. 3A. The neck ring 300 is maintained in the standard molding configuration by means, for example, of application of standard clamp force (such as a force that is sufficient to withstand molding pressure of the molding material and to maintain the mold in a closed configuration).

A molded article is molded. The molding cycle can be repeated until the method progresses to step 404, as will be described momentarily.

Step 404

At step 404, the configuration of the neck ring 300 is controlled into the vent cleaning configuration. Step 404 can be executed when it is determined that vent cleaning is required. This can be executed at a pre-determined interval, for example, every month or every n-number of molding cycles (such as fifty thousand, eighty thousand or hundred thousand molding cycles). Alternatively, this can be executed when the quality of the molded article falls under a pre-determined threshold. Alternatively, this can be executed in accordance with preventative maintenance schedule for a given operator of the molding machine (not depicted).

Step 404, as has been previously described, can be executed by means of decreasing clamp pressure, compared to the standard molding configuration and executing an injection cycle. In some embodiments of the present invention, step 404 can be repeated several times. It is noted that the molded articles molded during the vent cleaning operation are scrapped, as they include particles of the residue 330.

Once the vent cleaning operation is executed, the method 400 can return to execution of step 402, i.e. to the standard molding configuration.

Accordingly, it can be said that the method of vent cleaning in accordance with embodiments of the present invention includes, at a certain number of molding cycles where residue 330 has accumulates onto walls of the primary vent area 308, executing a vent cleaning operation by means of:
  entering the neck ring into the vent cleaning configuration (whereby the primary vent area 308 becomes part of the molding surface for allowing melt therein and the secondary vent area 310 becomes the primary venting structure);
  executing a molding cycle to fill in the primary vent area 308 with molding material for incorporation and removal of the residue 330 therefrom.

Generally speaking and considering the neck ring 300 as an example of implementation of a method for vent cleaning in a molding structure having a venting structure 306, one can say that the method of vent cleaning comprises:
  entering the mold structure housing the venting structure 306 into a vent cleaning configuration;
  performing a molding cycle to fill in at least a portion of the venting structure 306 with molding material for incorporation and removal of a residue 330 therefrom;
  while executing said performing, allowing for the fluid (such as air) to be evacuated from the at least a portion of the venting structure 306 through a secondary vent area 310.

It should be expressly understood that embodiments of the present invention described above with reference to the controllable primary and secondary vent areas are used just as examples of cleaning split line surfaces (such as the shut off face 700). It should be further understood that embodiments of the present invention can be used to clean other types of the split lines present in the mold.

As such, embodiments described above are implemented in a "neck-to-neck" vent configuration. It is also possible to execute the embodiments of the present invention in a "neck-to-lock" configuration. Example of such non-limiting embodiments is depicted with Reference to FIG. 5.

Figure 5:
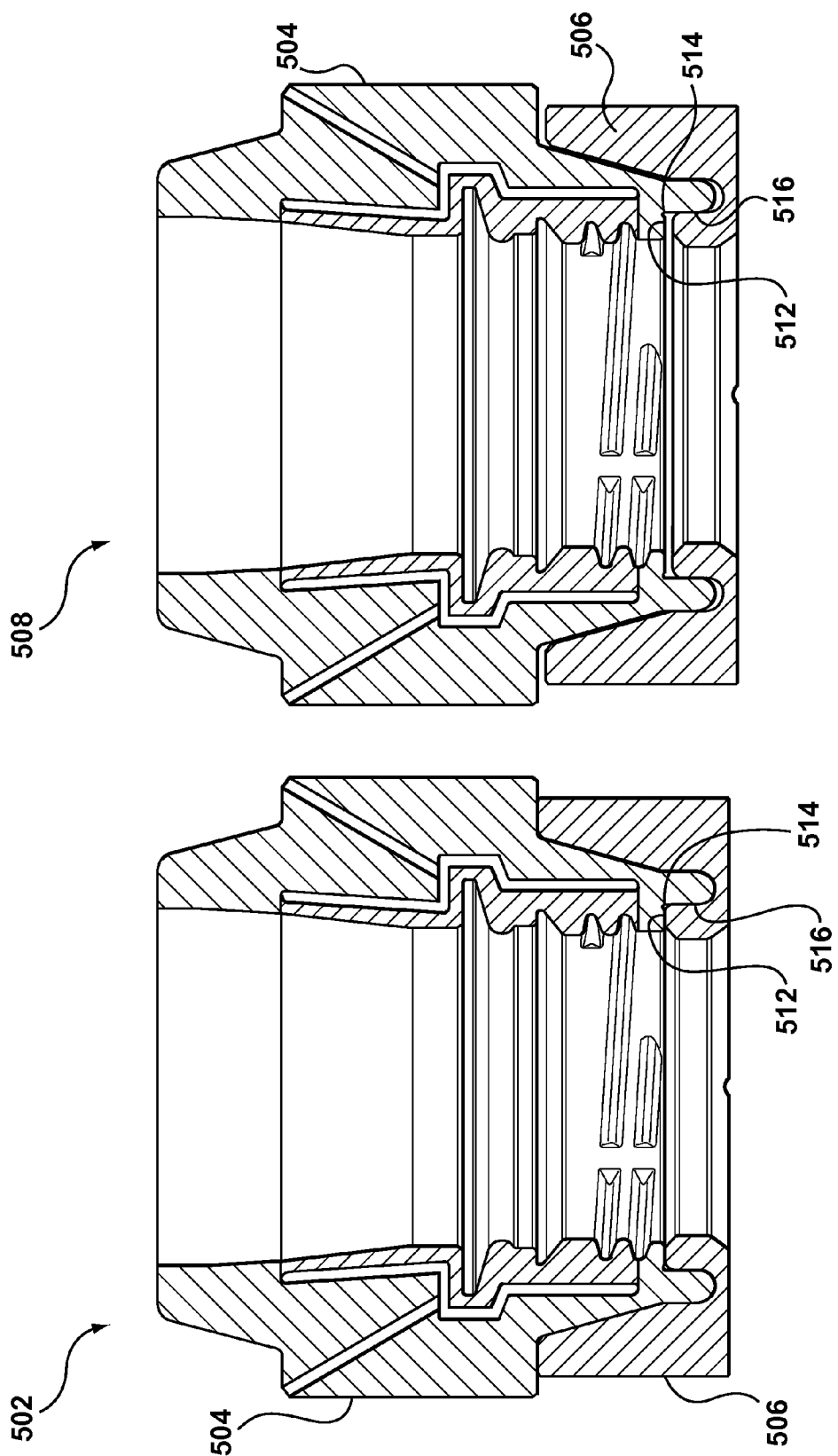
FIG. 5 depicts a front view of (i) a portion of a molding stack 502 that includes a neck ring 504 and a lock ring 506, the neck ring 504 being implemented in accordance with non-limiting embodiments of the present invention and being shown in the standard molding configuration; and (ii) a portion of a molding stack 508 that includes the neck ring 504 and the lock ring 506, the neck ring 504 being implemented in accordance with non-limiting embodiments of the present invention and being shown in the vent cleaning configuration.

FIG. 5 depicts a front view of (i) a portion of a molding stack 502 that includes a neck ring 504 and a lock ring 506, the neck ring 504 being implemented in accordance with non-limiting embodiments of the present invention and being shown in the standard molding configuration; and (ii) a portion of a molding stack 508 that includes the neck ring 504 and the lock ring 506, the neck ring 504 being implemented in accordance with non-limiting embodiments of the present invention and being shown in the vent cleaning configuration.

According to embodiments of the present invention, there is provided a primary vent area 512, a secondary vent area 516 and a pocket groove 514. Within the standard molding configuration of the molding stack 502, the primary venting groove and the secondary vent area 516 can be implemented as having the width of 0.03 mm and the pocket groove 514 can be implemented with the width of 0.05 mm.

Generally speaking, in the standard molding configuration, the primary vent area 512 is dimensioned for (i) allowance of the passage of the evacuated fluid (such as air) from the molding cavity into pocket groove 514 and (ii) not allowing any substantial amount of the molding material for passing therethrough. At the same time, the dimension of the secondary vent area 516 is such that it also prevents the passage of any substantial amount of the molding material for passing therethrough.

In the vent cleaning configuration of the molding stack 508, the primary vent area 512 can be implemented as having the width of 0.28 mm, and the secondary vent area 516 remains at 0.05 mm. More generally, the primary vent area 512 is dimensioned for allowing passage of the molding material therethrough. In a sense, in the vent cleaning configuration, the primary vent area 512 becomes part of the molding surface. At the same time, the secondary vent area 516 is dimensioned for (i) allowance of the passage of the evacuated fluid (such as air) from the primary vent area 308. In a sense, within the vent cleaning configuration, the secondary vent area 516 "becomes" or implements the function of the primary vent area 512 in the standard molding configuration, while the pocket groove 514 is configured for the rapid evacuation of fluid (such as air) from the molding cavity through the primary vent area 512.

This vent cleaning configuration can be entered into by means of decreasing clamp pressure (by means of software adjustment, for example), compared to the standard molding configuration. In an example embodiment, it is contemplated that the clamp tonnage can be lowered by approximately ten to fifteen percent below than the minimum injection pressure for the same mold. As an example, in a typical 72-cavity mold used for a water application, an operational tonnage can be around 290 tons, with the minimum process tonnage of 230 tons, while the tonnage used for entering the vent cleaning configuration can be about 200 tons.

A technical effect of embodiments of the present invention includes ability to execute vent cleaning operation without substantial interruption to the operation of the injection molding machine. Another technical effect of embodiments of the present invention includes ability to execute the injection molding machine without the need to stop the injection molding machine and without the need for the purging operation of the injection screw. Another technical effect of embodiments of the present invention includes ability to execute a vent cleaning operation that does take comparatively less time vis-à-vis existing solutions for vent cleaning. Another technical effect of embodiments of the present invention includes the ability to execute the vent cleaning operation without the uncontrolled dust transfer associated with the prior art solutions (such as blowing air, for example). It should be expressly understood that not each every technical effect needs to be present in each and every embodiment of the present invention.

It should be noted that the above described embodiment of the vent cleaning is just one example of a method of cleaning of a passage that is configured, in use, to allow for the passage of fluid (such as air and the like) and to prevent passage of the melt. Embodiments of the present invention allow for entering such passage into a cleaning configuration and to allow the passage to become part of the molding surface. Effectively, embodiments of the present invention contemplate flooding at least a portion of the passage with melt to remove residue 330 therefrom. It is noted that at least a portion of such passage that is wetted in use by the fluid (and therefore tends to accumulate residue 330) can be cleaned by using embodiments of the present invention. Other examples of such the passage can include TSS vent grooves, core/lock ring vent grooves, inner and outer core vent grooves in closure molds and the like.

Accordingly, it can be said that the method of cleaning of a passage that during a molding configuration (i.e. in use) allows the passage of fluid and prevents passage of melt, the passage associated with a mold component (an example of which is being the above-described neck ring 300, but not so limited) in accordance with embodiments of the present invention includes, at a certain number of molding cycles where residue 330 has accumulates onto at least a portion of the passage (such as a portion of the primary vent area 308 and the like, but not so limited), executing a cleaning operation by means of:

entering the mold component into a cleaning configuration, whereby a portion of the passage associated with the mold component that accumulates residue becomes part of the molding surface;

executing a molding cycle to fill in the portion of the passage with molding material for incorporation and removal of the residue 330 therefrom.

The method further includes, in some embodiments thereof, controlling a melt front of the melt entering the passage in the cleaning configuration. In some embodiments, as is the case in the above neck ring 300 embodiment, the control of a predefined point for the melt front stop in the vent cleaning configuration is executed by means of a physical stop, such as the above-described apex point 334. In other embodiments of the present invention, the predefined point for the melt front can be executed as a thermal implementation (i.e. by controlling the temperature or rate of a cooling fluid around the predefined point for the melt front stop to effectively freeze off the melt). Other embodiments and executions for the predefined point for the melt front stop are possible. Therefore, it can be said that in the cleaning configuration the melt flooding of the passage is executed in a "controlled manner" or, in other words, by controlling the predefined point for the melt front stop.

In some embodiments of the present invention, it may be beneficial while executing the molding cycle during the cleaning operation, to increase pressure between molding material and the residue 330. In the above example of the neck ring 300, the increased pressure between the molding material and the residue 330 is created by: (i) means of increasing the primary vent area 308 (to transform it into the molding surface) and (ii) creating the secondary vent area 310 with the apex point 334, which create a stop point for the material, thus increasing the pressure between the molding material and the residue 330.

Another alternative to increase the pressure between the molding material and the residue 330 would to create a smaller gap, or in other words, when entering the vent cleaning state, increasing the width of the primary vent area 308 by a smaller distance, this increasing the pressure between the molding material and the residue 330. Yet in other embodiments, it is conceivable to increase the pressure between the molding material and the residue 330 by introducing a counter-flow of a medium.

Figure 8A:
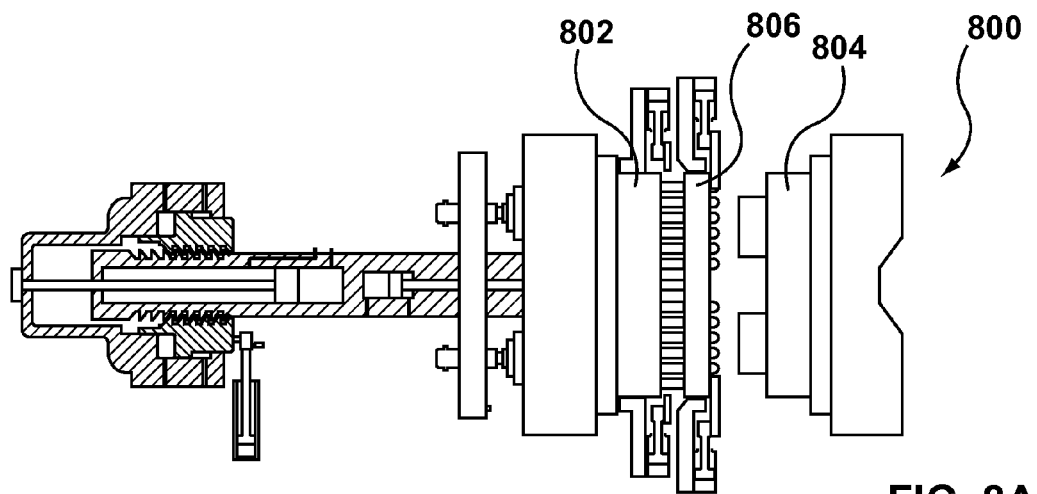
FIGS. 8A-8C depict a top view of a portion of an injection molding machine 800, implemented in accordance with embodiments of the present invention.
Figure 8B:
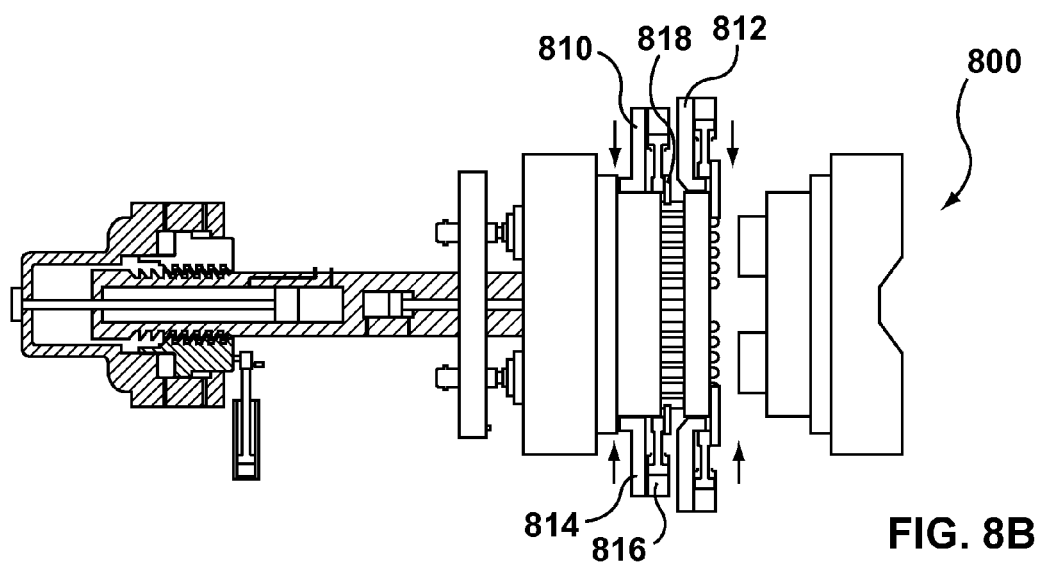
Figure 8C:
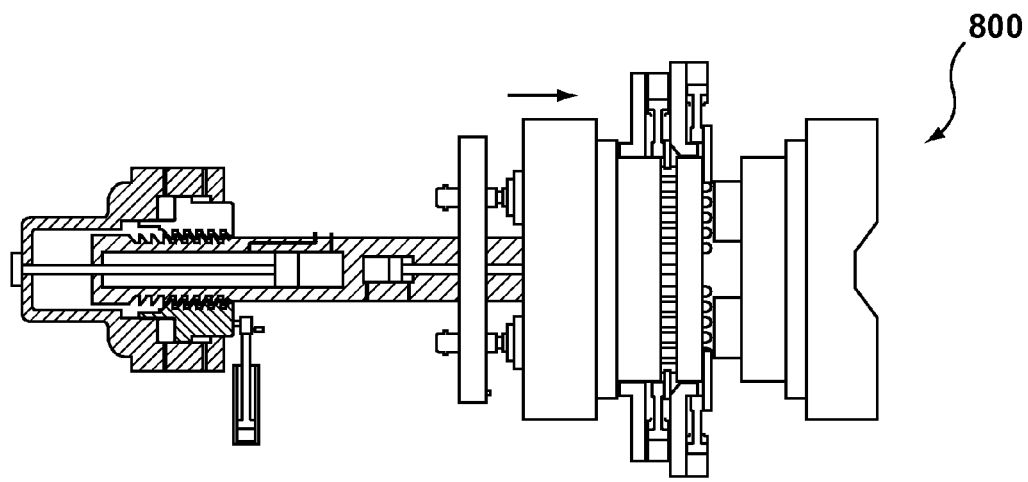

It should be noted that even though description above has used an example of decreased clamp tonnage to enter into the vent cleaning configuration, other implementations are possible. An example of such an alternative configuration is depicted with reference to FIGS. 8A-8C. FIGS. 8A-8C depict a top view of a portion of an injection molding machine 800, implemented in accordance with embodiments of the present invention. The injection molding machine 800 incorporates certain structures known to those of skill in the art, which structures will not be described here at any length. Description will follows will focus on specific modifications implemented in accordance with embodiments of the present invention The injection molding machine 800 comprises inter alia a first mold half 802, a second mold half 804, a stripper plate assembly 806, all of which can be implemented in accordance with known techniques. According to embodiments of the present invention, there is provided a first distance augmenting structure 810 and a second distance augmenting structure 812, which can be implemented substantially similar and, as such, just one will be described in greater details.

It is noted that the first distance augmenting structure 810 and the second distance augmenting structure 812 are operatively positioned between respective machine components. The first distance augmenting structure 810 is operatively positioned between the first mold half 802 and the stripper plate assembly 806, while the second distance augmenting structure 812 is operatively positioned between the stripper plate assembly 806 and the second mold half 804.

The first distance augmenting structure 810 comprises a base 814 operatively attachable to a side of the injection molding machine 800 and, more specifically, to the side of the first mold half 802. The first distance augmenting structure 810 further comprises an actuator 816, which in this example is implemented as a hydraulic actuator. However, other implementations for the actuator are possible, such as a servo motor or the like. There is also provided a distance adjustment insert 818. The distance adjustment insert 818 can be implemented as a piece of sheet metal or the like. The actuator 816 is operable to actuate the distance adjustment insert 818 between an outbound position (FIG. 8A) and an in-bound position (FIGS. 8B and 8C). In the outbound position, the first mold half 802, the second mold half 804 and the stripper plate assembly 806 will close into the standard molding configuration. In the in-bound position, as is depicted in FIG. 8C, the first mold half 802, the second mold half 804 and the stripper plate assembly 806 will close into a cleaning configuration with a pre-defined gap therebetween. The pre-defined gap being controlled by the width of the distance adjustment insert 818. In other words, in-bound position the distance adjustment insert 818 is positioned between the first machine component and the second machine component, in which inbound position the distance adjustment insert 818 is configured to increase distance between the first machine component and the second machine component.

Figure 9:
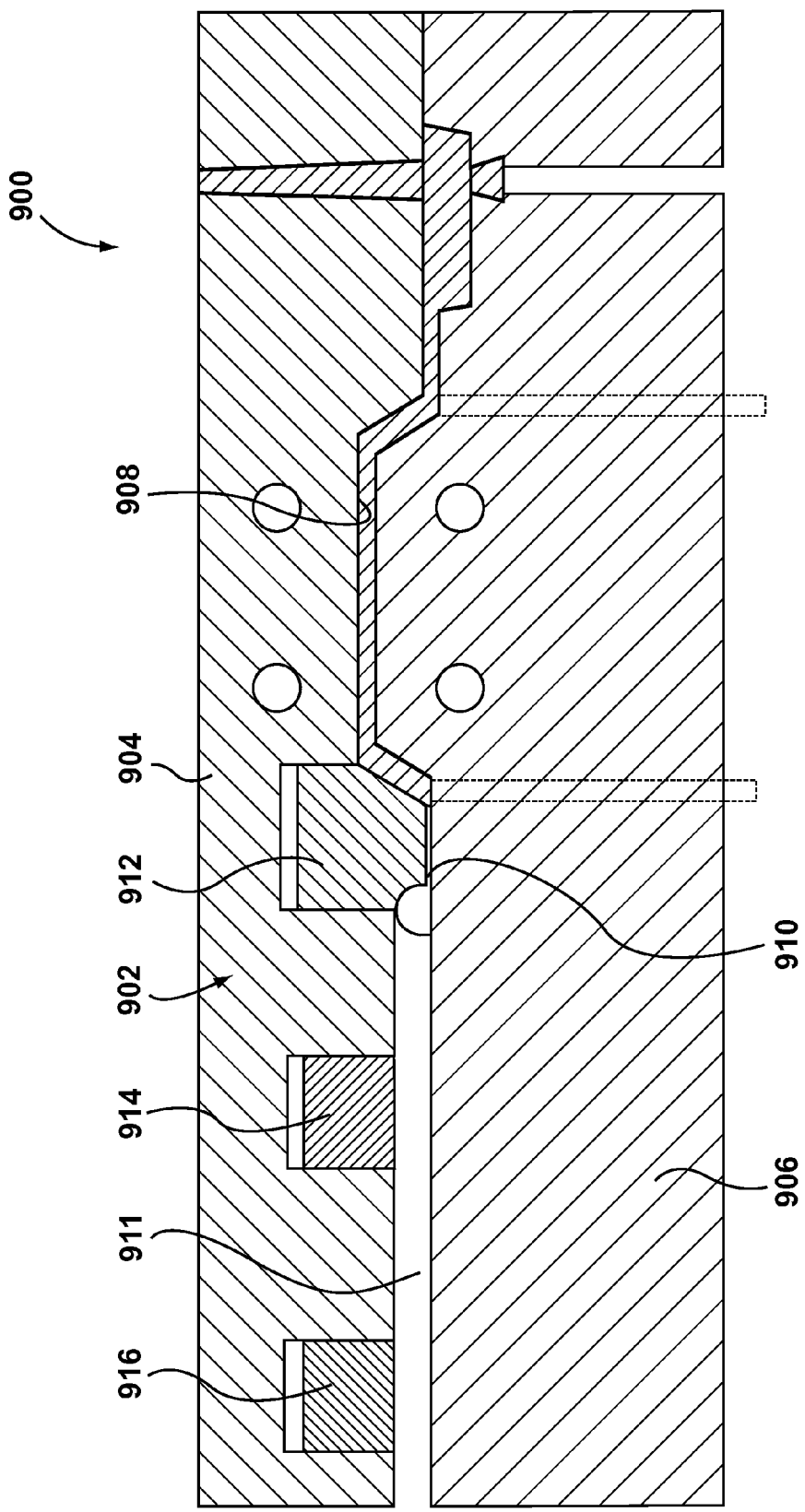
FIG. 9 depicts a section view of a mold in accordance with another embodiment of the present invention, the mold being in a standard molding configuration.

It should be expressly understood that the neck ring 300 described above is just but one example of embodiments of the present invention for executing a method of cleaning of a mold component from the residue 330. With reference to FIG. 9, there is depicted another embodiment of a mold component that can be used for implementing embodiments of the present invention. FIG. 9 depicts a section view of a mold 900. The mold 900 includes a mold component 902, which in this case is implemented as a first mold half 904 and a second mold half 906. The first mold half 904 and the second mold half 906 define therebetween a molding cavity 908 (defined by respective female and male members of the first mold half 904 and the second mold half 906). The mold 900 further includes a passage that, in use (i.e. during standard molding operation) allows for the passage of fluid out of the molding cavity 908 and prevents passage of melt, the passage being depicted in FIG. 9 at 910. The passage 910 is implemented as a vent area or a "primary vent area'. There is also provided a first passage control member 912, which first passage control member 912 is actuatable between a first configuration (where the passage 910 allows for the passage of fluid and prevents passage of the melt, as depicted in FIG. 9 in which the mold 900 is shown in a standard molding operation) and a second configuration, in which the passage 910 becomes part of the molding surface (depicted in FIG. 10, which depicts the mold 900 in a cleaning configuration). There is also provided a venting passage 911 in fluid communication with the passage 910 for venting the fluid therefrom.

Figure 10:
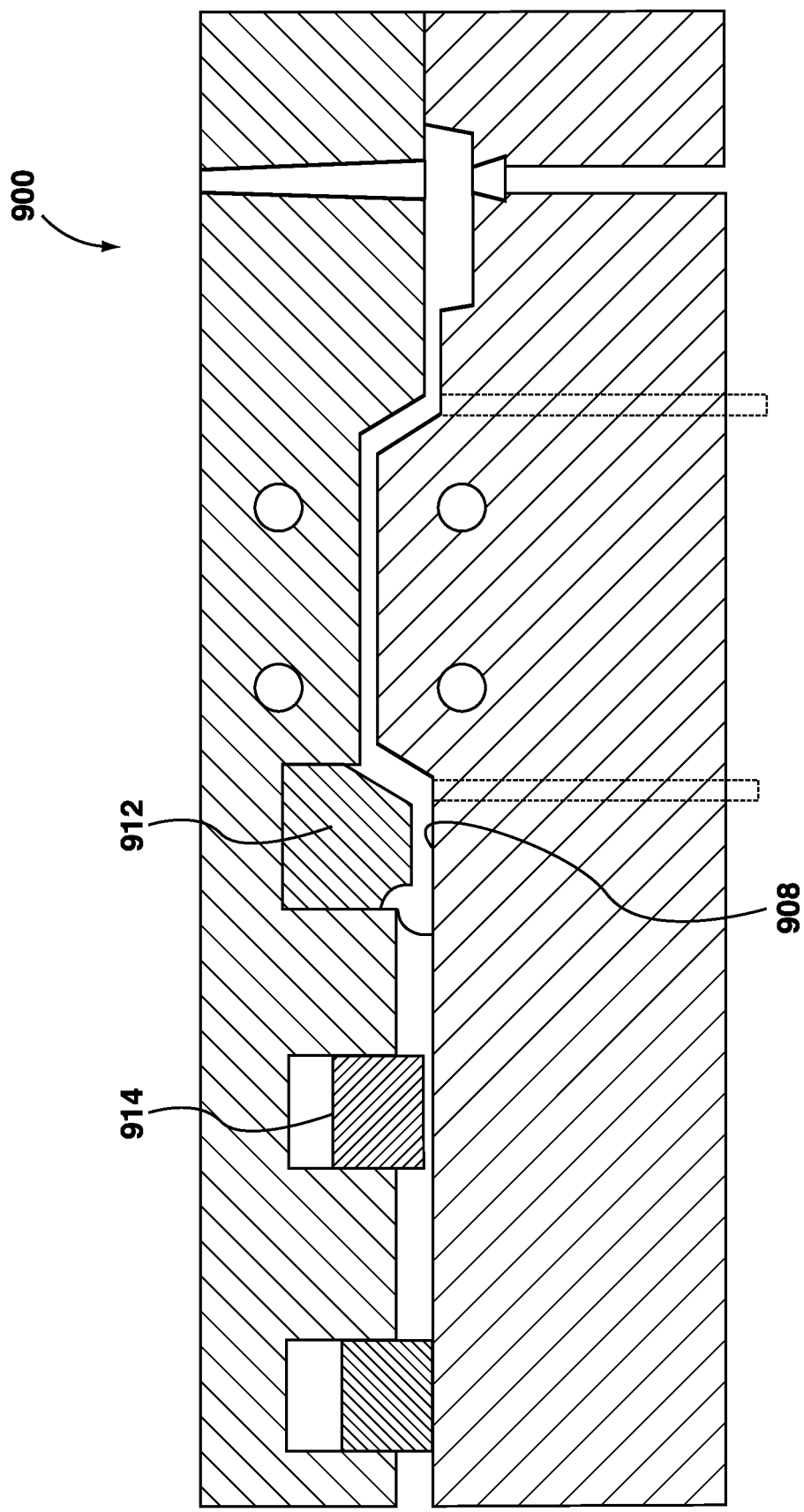
FIG. 10 depicts a section view of the mold of FIG. 9 in a cleaning configuration.

With continued reference to FIG. 9 and FIG. 10, the mold 900 also includes a second passage control member 914, which is shown in a retracted configuration in FIG. 9 and in an extended configuration in FIG. 10. In the retracted configuration, the second passage control member 914 un-obstructs the venting passage 911. In the extended configuration, the second passage control member 914 turns a portion of the venting passage 911 into the passage that allows passage of the fluid but not passage of the melt. Effectively, turning a portion of the venting passage 911 into a secondary vent area (as shown in FIG. 10). Optionally or additionally, there is provided a third passage control member 916, which can also be controlled similarly to the second passage control member 914 to either provide a venting passage or completely shut off the passage. In a sense, the second passage control member 914 and/or the third passage control member 916 can act to provide the pre-defined point for the melt front stop, as has been previously described.

The first passage control member 912 and/or second passage control member 914 and/or the third passage control member 916 can be actuated by any suitable means, such as hydraulic actuator, electric actuator and the like. In a specific embodiment, the actuator can be implemented as a piezzo-electric actuator, similar to the one disclosed in the co-owned U.S. Pat. No. 7,481,642 issued to Niewels on Jan. 27, 2009.

In additional non-limiting embodiments of the present invention, the first passage control member 912 and/or second passage control member 914 and/or the third passage control member 916 can be defined as part of the molding stack and as such can be "actuated" by the motion of the mold halves, without the need for separate actuator per se.

Figure 11:
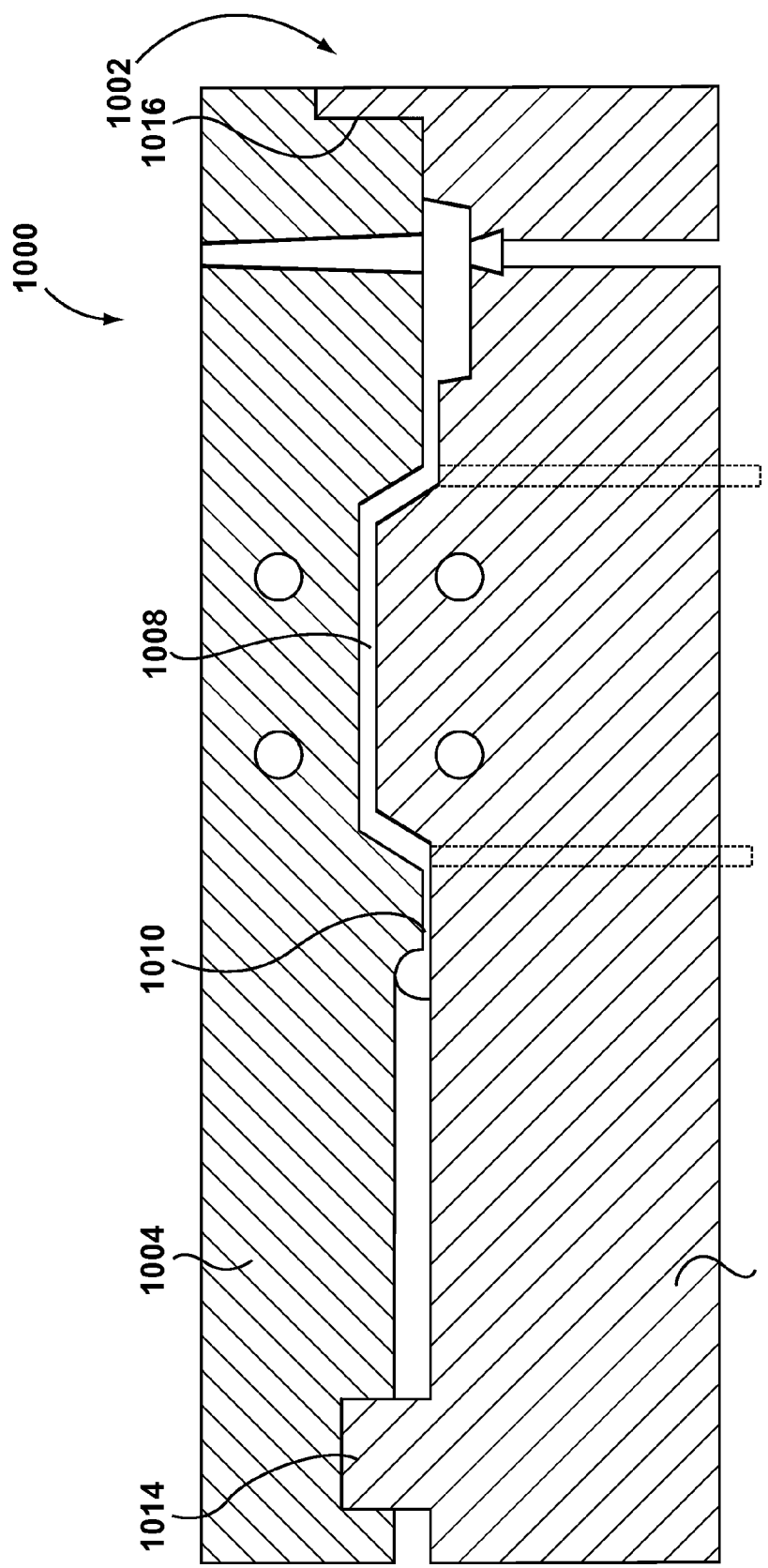
FIG. 11 depicts a section view of another mold in a standard molding configuration.
Figure 12:
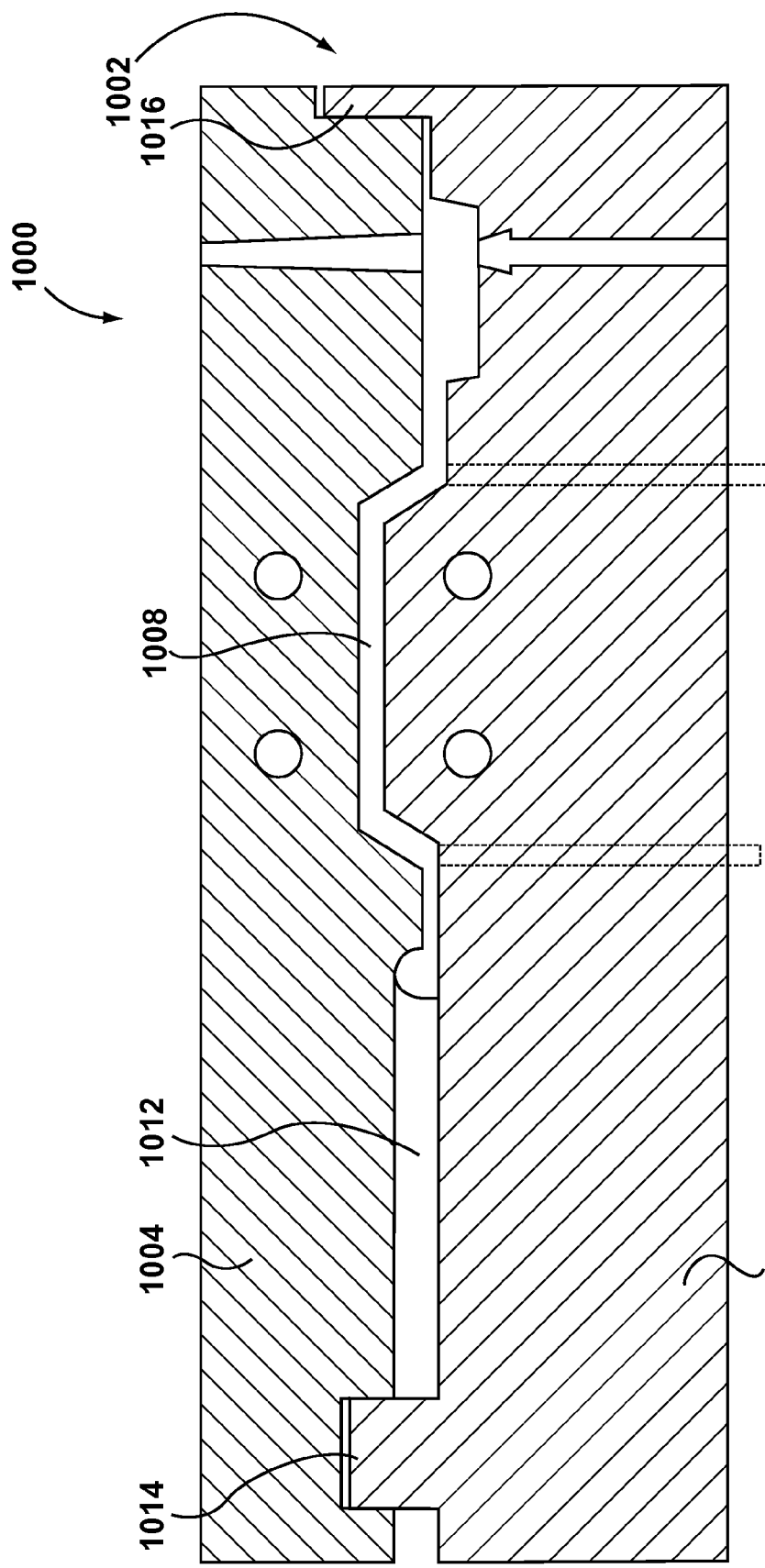
FIG. 12 depicts a section view of the mold of FIG. 11 in a cleaning configuration.

With reference to FIGS. 11 and 12, there is depicted another non-limiting embodiments of the present invention. FIG. 11 depicts a section view of a mold 1000. The mold 1000 includes a mold component 1002, which in this case is implemented as a first mold half 1004 and a second mold half 1006. The first mold half 1004 and the second mold half 1006 define therebetween a molding cavity 1008 (defined by respective female and male members of the first mold half 1004 and the second mold half 1006). The mold 1000 further includes a passage 1010 that, in use (i.e. during standard molding operation) allows for the evacuation of fluid out of the molding cavity 1008 and prevents passage of melt. The passage 1010 can be implemented as a vent area.

In the standard molding configuration depicted in FIG. 11, the mold 1000 is operated in a standard manner, with the molding cavity 1008 being filled with the molding material and the passage 1010 being used for allowing fluid (such as air) to be evacuated from the molding cavity 1008 as it is being filled with the molding material.

With reference FIG. 12, a passage cleaning configuration is shown. In this configuration the passage 1010, effectively, becomes the extension of the molding cavity 1008, which can assist in removing residue (not shown) potentially accumulated therein. There are also provided a first melt stop 1014 and a second melt stop 1016. The first melt stop 1014 and the second melt stop 1016 are points for stopping the melt front, in the passage cleaning configuration. As is best seen when comparing FIG. 11 and FIG. 12 illustrations, the first melt stop 1014 and the second melt stop 1016 are in a "closed configuration" in both the standard molding configuration and the passage cleaning configuration. While they are not used in the standard molding configuration per se, they are used as melt front stops in the passage cleaning configuration.

Figure 13:
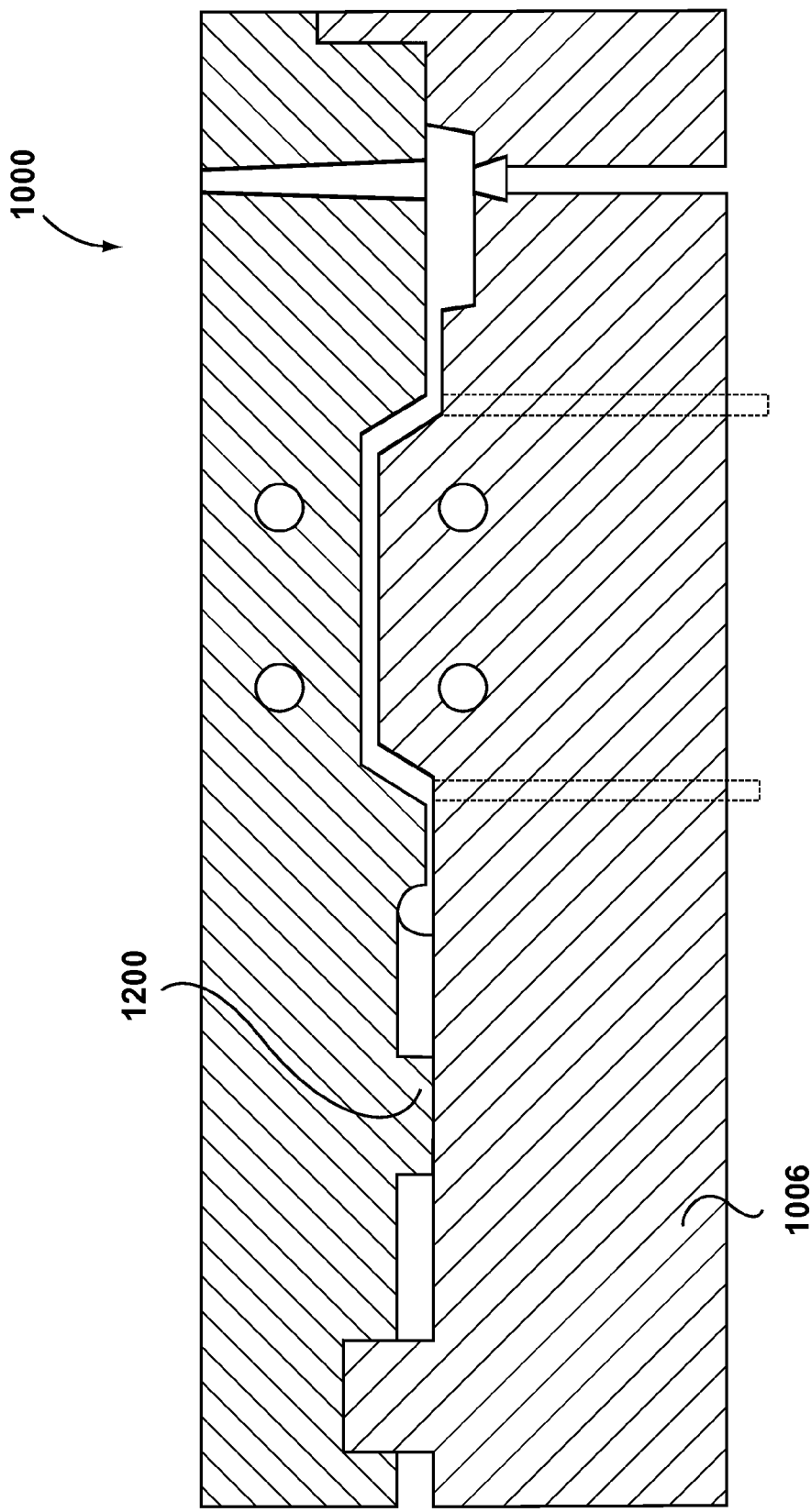
FIG. 13 depicts a section view of the mold of FIG. 11 in an alternate cleaning configuration.

Needless to say and as is depicted with reference to FIG. 13, the mold 1000 can be optionally provided with a passage control member 1200, which can be used to control a secondary vent area, much akin to the description of FIG. 9 and FIG. 10 above. The main difference being, however, that the passage control member 1200 is defined as part of the mold stack and not as a separate member, as is depicted with reference to FIG. 9 and FIG. 10.

Accordingly, it can be said that within the architecture of FIGS. 11 and 12, there is provided a method of operating a mold, the mold comprising a first mold half and a second mold half, the first mold half and the second mold half defining a passage configured, in use, to allow passage of fluid and to prevent passage of melt, the method comprising: maintaining the mold in a standard molding configuration and executing at least one molding cycle; actuating the first mold half and the second mold half into a cleaning configuration and executing at least one molding cycle in the cleaning configuration to remove residue from at least a portion of the passage.

Accordingly, it can be said that embodiments of the present invention provide for a mold component configured to be actuated between: (i) a first configuration in which the mold component comprises a passage that allows passage of fluid and prevents passage of the melt; and (ii) a second configuration in which the passage is actuated such as to become part of a molding surface.

Figure 14:
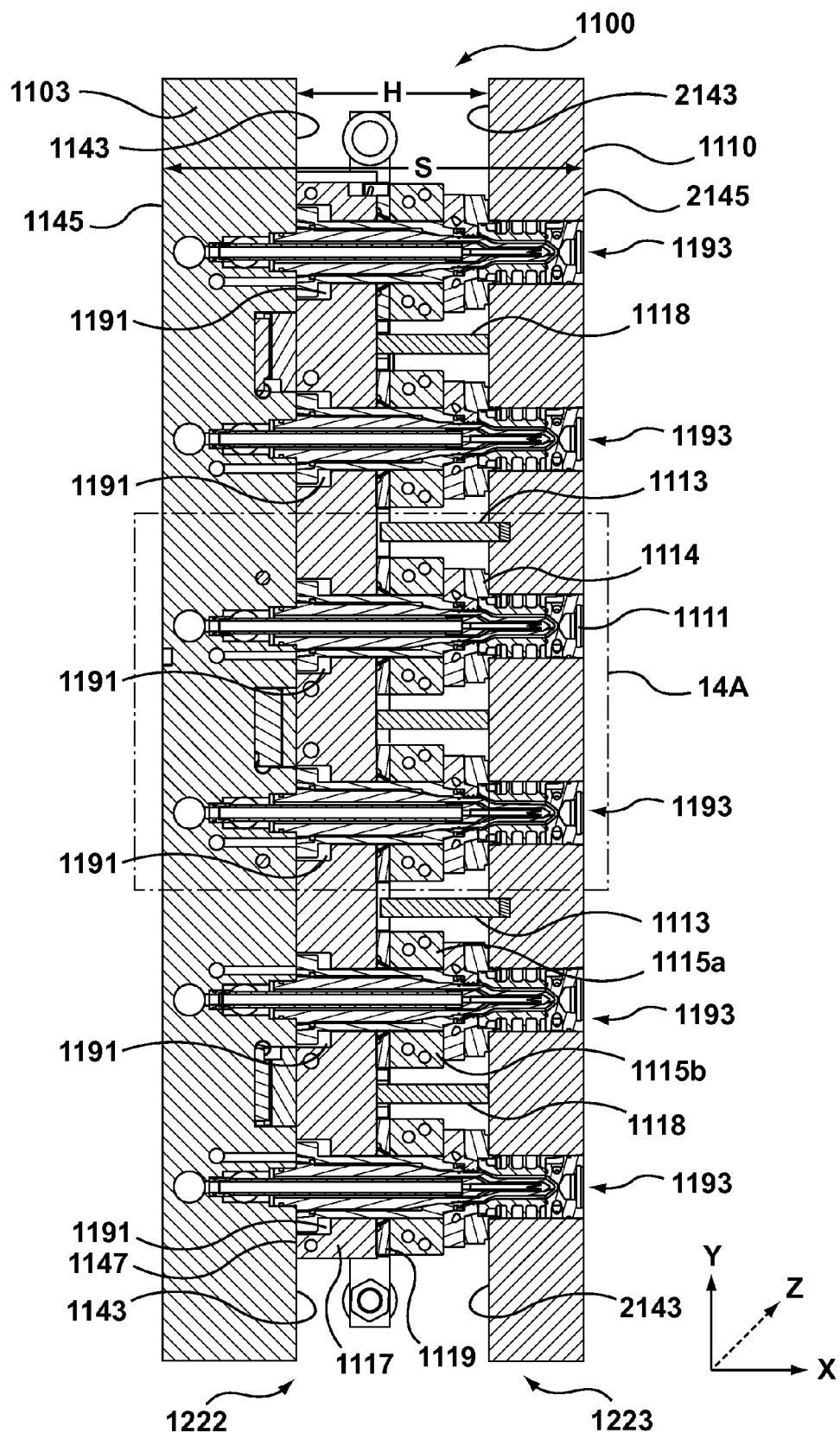
FIG. 14 is a cross-sectional view through part of a mold.
Figure 14A:
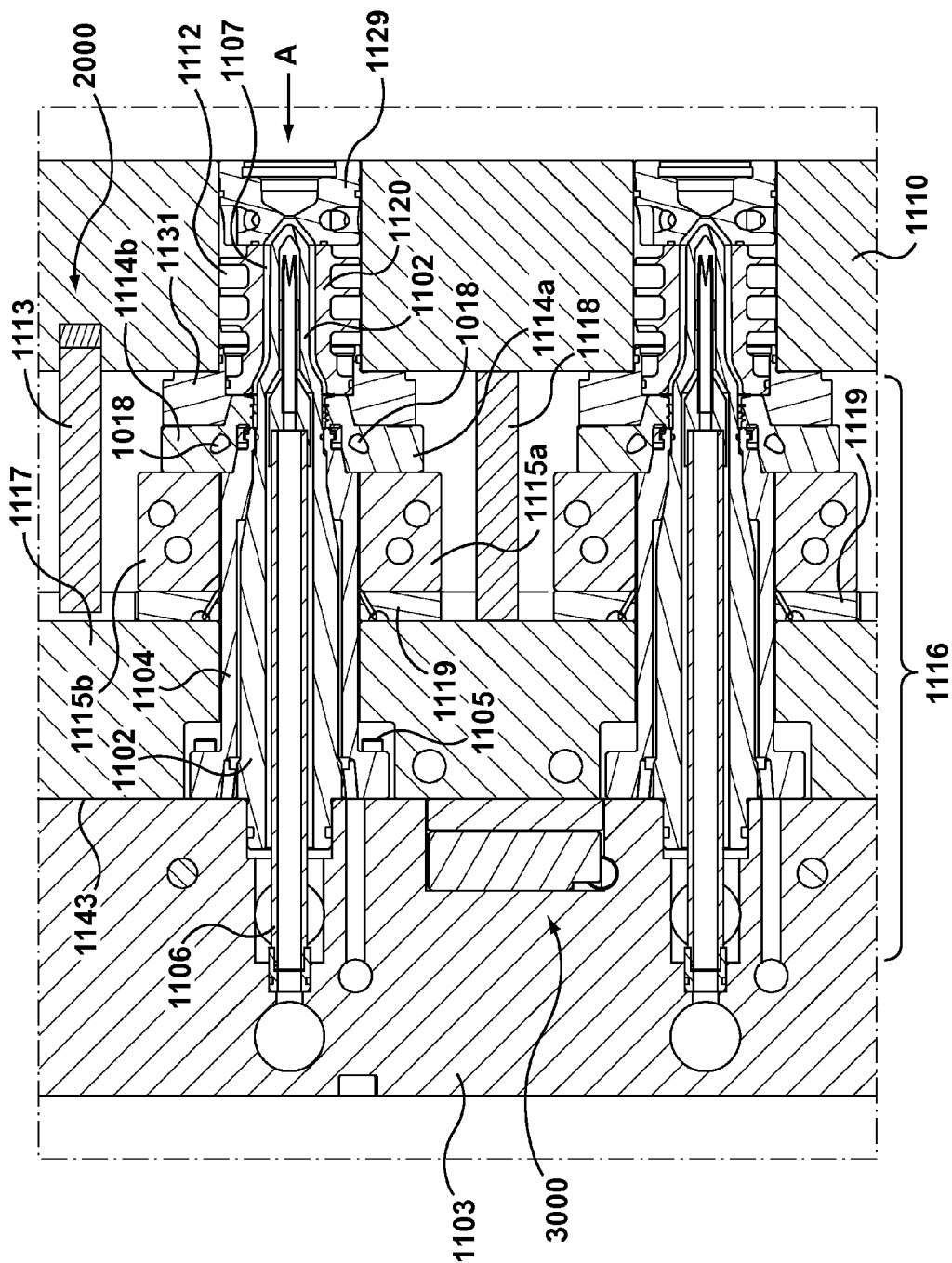
FIG. 14A is an enlarged view of the representative portion that is marked as 14A in FIG. 14 including one representative mold stack.

With reference now to FIGS. 14 and 14A, another embodiment is illustrated which includes alternate distance augmenting structures, similar to the distance augmenting structure illustrated in FIGS. 8A to 8C. FIG. 14 is a cross-sectional view through an injection mold 1100 forming part of an injection mold machine (not shown). FIG. 14A is an enlarged view of the portion marked 14A in FIG. 14. As will be explained hereinafter, the configuration of mold 1100 can be adjusted such that it is configured in a first normal operating mode or in a second alternate operational mode. In the second operational mode, mold 1100 may be configured for vent cleaning in a manner like that described above. Alternatively, the second mode may enable the injection mold 1100 to operate in another operational mode other than the normal operating mode or a vent cleaning mode.

Generally, mold 1100 may be part of an injection mold machine (not shown) and mold 1110 may include a first mold half generally designated 1222 and a second mold half generally designated 1223. First mold half 1222 may include a core plate 1103 and a stripper plate 1117, and second mold half 1223 may comprise a cavity plate 1110. The core plate 1103, stripper plate 1117, and cavity plate 1110 may all be appropriately supported on and movable relative to each other on a support frame (not shown) for normal operation of such a mold 1100, in any suitable manner as is well known in the art. A plurality of mold stacks 1111 may also be provided. The mold stacks 1111 may have components arranged in a stack configuration, including components installed in cavities 1191 which extend through the core plate 1103, stripper plate 1117 and wear plate 1119, and cavities 1193, which extend through the cavity plate 1110. All mold stacks 1111 in mold 1100 may be formed in an identical manner or in a substantially identical manner. Alternatively, in other embodiments more than one configuration of mold stack may be provided in the same mold.

It should be noted that while in many, if not most, operational molds like mold 1100 the orientation would be such that axis X would be oriented generally horizontally and longitudinally in space, axis Y horizontally and transversely in space, and axis Z vertically in space, these orientations are not necessary. Mutually orthogonal axes X, Y and Z may in other embodiments be arranged in other spatial orientations.

FIG. 14 shows the mold 1100 in a standard operating configuration with the mold in a closed position ready for injection of molding material such as a plastic into the mold and thus into the plurality of mold stacks 1111 to make production preforms. In FIG. 14, there is illustrated the distance (or height) H in a direction parallel to the X axis between the outward facing surface 1143 of core plate 1103 and the inward facing surface 2143 of the cavity plate 1110. In the injection molding industry, the distance S in a direction parallel to the X axis, as illustrated in FIG. 14, between the rear surface 1145 of core plate 1103 and the forward facing front surface 2145 of cavity plate 1110 is typically referred to as the mold shut height. It will be appreciated that as the height H changes, there is a corresponding change in the mold shut height S. In the first standard operating mode the height H will have a value H1 whereas in a second operating mode the height H will have a value H2 that will be different, and typically greater, than value H1. Thus, when the mold 1100 alternates between configurations corresponding to the first operating mode and the second operating mode, the height H will vary between H1 and H2 and their will be a corresponding change in the shut height S from S1 to S2.

Continuing with reference to FIGS. 14 and 14A, each mold stack 1111 may include a mold core 1102 fitted into the core plate 1103 and retained therein by a lock ring 1104. Bolts 1105 may fixedly secure the lock ring 1104 to core plate 1103. The position of lock ring 1104 relative to core plate 1103 remains fixed in the configurations corresponding to the first and second operating modes. The mold core 1102 may contain a cooling tube 1106 for the transmission of cooling fluid from a source within the core plate 1103 to remove heat from the injected material in the mold cavity 1107 and solidify the molded part in the mold cavity 1107.

Each mold stack 1111 may also include a cavity insert 1120 and an adjacent gate insert 1129 that are retained in the cavity plate 1110 by a cavity flange 1131. Bolts (not shown) may secure the cavity flange 1131 to the cavity plate 1110. Thus, cavity flange 1131 can be fixed relative to cavity plate 1100 and so there will be no relative movement of the cavity plate 1110 and the cavity flange 1131 as the mold 1100 is alternated between configurations for the first and second operational modes referenced above. Cooling channels 1112 may circulate cooling fluid from a source through the cavity insert 1120 and gate insert 1129 to remove heat from the injected material.

The mold 1100 may also include one or more pairs of slide bars 1115a and 1115b that may be slidably supported on a wear plate 1119. Wear plate 1119 of mold 1100 may comprise a single integrally formed piece of material with apertures formed therein, or separate sections or segments, and provide support material for slide bars 1115a, 1115b between the slide bars and the stripper plate 1117. The wear plate 1119 may thus be mounted on the stripper plate 1117. The apertures in the wear plate 1119 may be configured to at receive at least part of regular tonnage blocks 1118 and adaptive tonnage blocks 1113 extending from cavity place 1110 so that they are able to bear directly against the outward facing surface of stripper plate 1117, rather than bear against the wear plate 1119.

Figure 18:
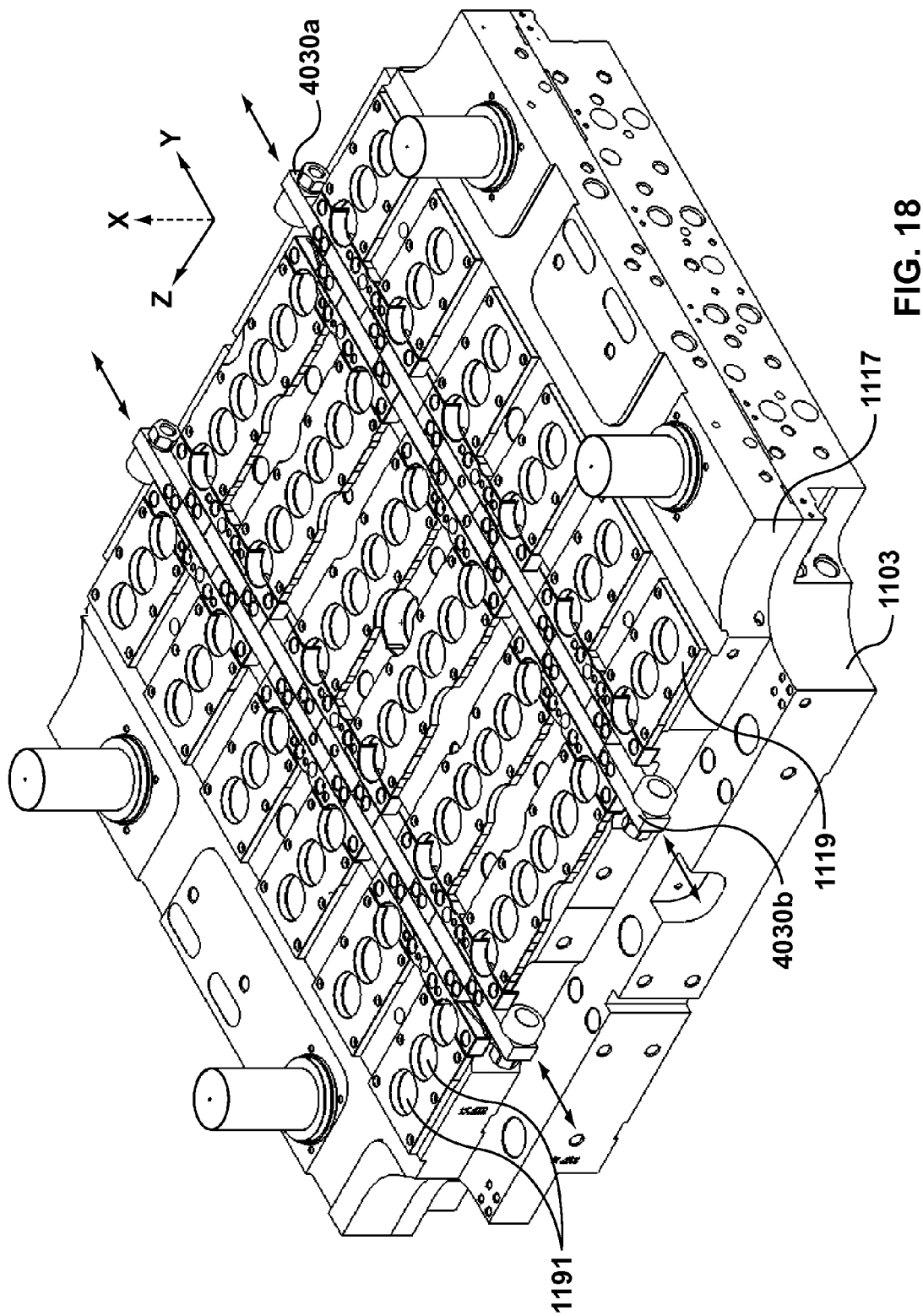
FIG. 18 is an isometric view of another sub-assembly of the injection mold part of FIG. 14.
Figure 19:
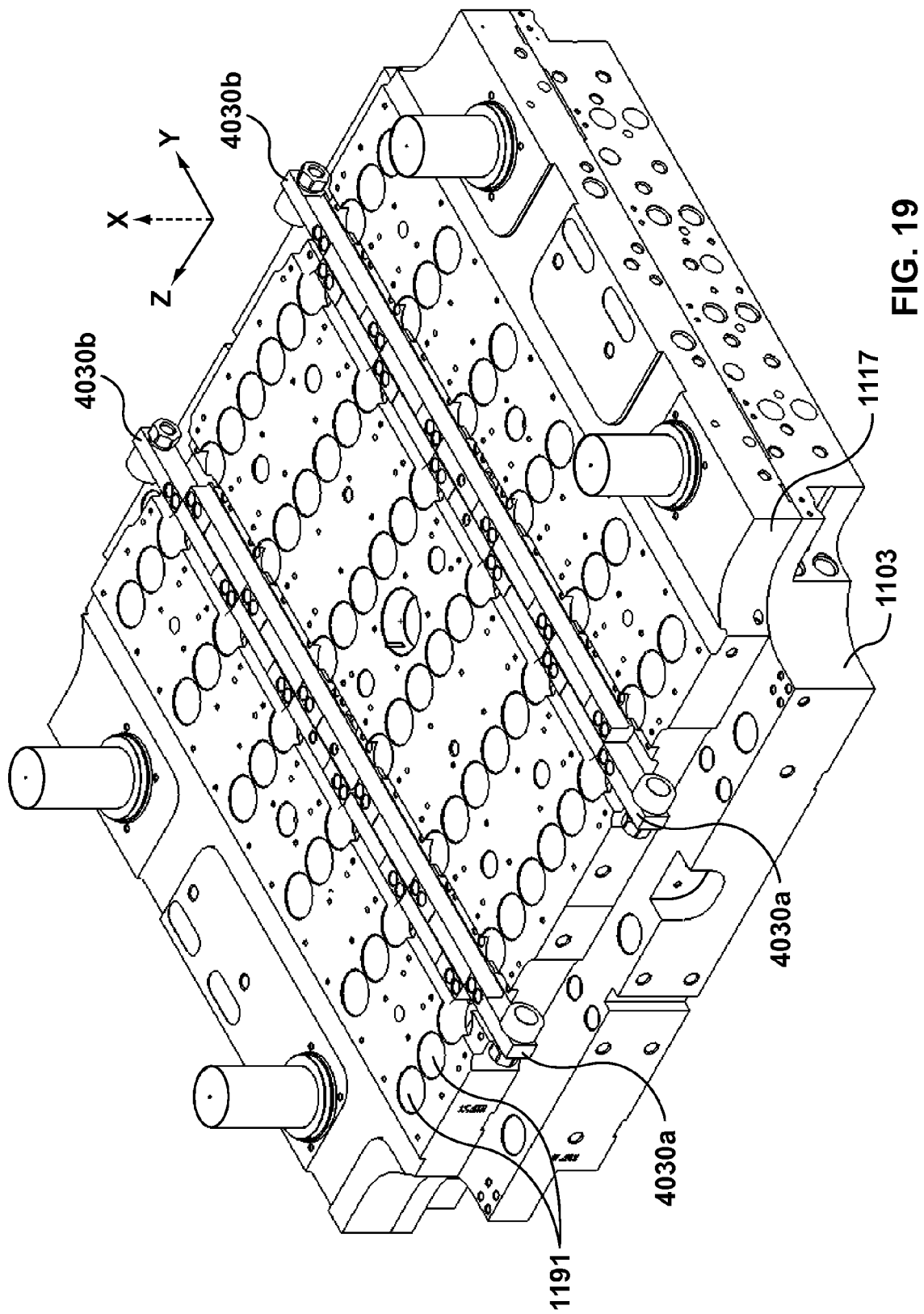
FIG. 19 is an isometric view of another sub-assembly of the mold part of FIG. 14.

The slide bars 1115a, 1115b can be configured for carrying a pair of neck ring halves 1114a and 1114b forming a neck ring associated with each mold stack 1111. The multiple neck ring halves 1114a, 1114b may commonly be fixedly attached such as with bolts (not shown) to respective slide bars 1115a, 1115b. The neck ring halves 1114a, 1114b, may be formed and configured like neck ring halves of neck ring 300 described above and illustrated in FIGS. 3A-3F. The neck ring halves 1114a, 1114b can slide with slide bars 1115a, 1115b respectively between an in-mold first position which corresponds to the "standard molding configuration" described above in relation to FIG. 3A and an out-mold second position where the neck ring halves are withdrawn sufficiently to allow the ejection process to take place so that an injected preform can be removed from the mold cavity 1107. Neck ring halves 1114a, 1114b, can be assembled onto and connected to respective slide bars 1115a, 1115b and this assembly can be moved by connecting bars (such as connecting bars 4030a, 4030b as shown in FIG. 18). Connecting bars can include a cam follower (such as rollers 4033 as shown in FIG. 18). These cam followers can be inserted into a cam track defined in a cam (not shown). Any forward (ejection) movement of stripper plate assembly activates a connecting bar movement. Further details of an example of such an arrangement can be found in Applicant's US published patent application, publication no. US-2008/0241309-A1 for a Cam System For A Mold published October 2008, the entire subject matter of which is hereby incorporated herein by reference. However, also as known in the art, movement of slide bars 1115a, 1115b and their respective neck ring halves 1114a, 1114b can be effected by mechanisms other than a cam track and roller. By way of example only, in other embodiments, an assembly incorporating a linear actuator might be employed. In this regard, Applicant's patent published US published patent application no. US2007/0059395 published Mar. 15, 2007, the entire contents of which is hereby incorporated herein by reference, discloses an example of such an alternative mechanism.

The neck ring halves 1114a, 1114b, like neck ring 300, also have at least one additional position and possibly more than one other position that may correspond with one or more other additional operational modes. For example, as illustrated, neck ring halves 1114a, 1114b may have a third position which corresponds to another operational mode such as a "vent cleaning mode" configuration as discussed above in relation to FIG. 3D in which the neck ring halves may have moved outwardly a relatively small distance. As will be explained hereinafter, in mold 1100, the height H between the cavity plate 1100 and the core plate 1103 (and thus the corresponding mold shut height S) can be adjusted to increase and decrease the height H and corresponding mold shut height and thereby enable the ring halves 1114a, 1114b to move between the standard mold operational configuration and a second operational configuration such as the vent cleaning mode configuration.

The wear plate 1119 is sacrificial material and reduces the wear on the stripper plate 1117 due to movement of the neck ring halves 1114a, 1114b by the slide bars 1115a, 1115b each time a molded part is released from the mold cavity 1107 and each time the slide bars and neck ring halves move between the first and second operational mode configurations. Cooling channels 1018 may be provided to circulate cooling fluid from a source through the neck ring halves 1114a and 1114b to remove heat from the injected material. Molten mold material may be conveyed to the mold cavity via a hot runner nozzle, hot runner manifold and hot runner stacks in a conventional manner known in the art.

It will be appreciated that when the plastic material is injected under pressure into the mold cavity 1107, outward pressure will be exerted upon the neck ring halves 1114a, 1114b. To resist this force associated with the injected plastic, a clamping (compressive) force A may be applied to the mold stack 1111 to retain the mold stack 1111 in an appropriate operational configuration, either during standard molding operation or during an alternate operation such as vent cleaning. It will be appreciated that applying a compressive load A causes reaction forces throughout the mold stack 1111. Thus, due to the inclined mating surfaces between cavity flange 1131 and neck ring halves 1114a, 1114b, a compressive force will act on neck ring halves 1114a, 1114b along the longitudinal (X) and transverse (Y) axes, urging the neck ring halves 1114a, 1114b, transversely inwards. In this way, by application of a suitable compression force, the relative positions of the neck ring halves 1114a, 1114b can be held at either the desired standard molding configuration or the vent cleaning configuration, which can be determined by the selection of the appropriate mold shut height S.

With the application of clamping force A to the mold stack 1111, little if any of this load will typically be carried through the slide bars 1115a, 1115b or wear plate 1119 or stripper plate 1117. In the normal operating configuration, additional load may be provided to compress the core plate 1103 and the cavity plate 1110 together and load may be transmitted also from the cavity plate 1110, through regular tonnage blocks 1118 (FIGS. 14 and 14A) into the stripper plate 1117 and to the core plate 1103. In a second operational configuration, such as a vent cleaning mode, the stack 1111 may be in an "open" configuration with substantially no compressive load being transmitted through the stack 1111. A compressive load may however still be provided to compress the core plate and the cavity plate together and may be transmitted also from the cavity plate 1110, through adaptive tonnage blocks 1113 (FIGS. 14 and 14A) into the stripper plate 1117 and to the core plate 1103 as will be described further below.

When the mold 1100 is in the standard operating configuration, the clamping force A being applied to the stack may be greater than the minimum load which would be required to resist injection pressure and hold the mold stack components in position. Additional compressive loading provides safety in case of processing or melt quality fluctuations which would result in preform flash during normal operation. Thus, the conventional or regular tonnage blocks 1118 may bear additional load in co-operation with cavity plate 1110, stripper plate 1117 and core plate 1103. The height of the regular tonnage blocks can be selected to provide an appropriate/desired distance between the cavity plate 1110 and the stripper plate 1117. Thus, in most normal operating configurations, the tonnage blocks 1118 are positioned between and space the cavity plate 1110 and stripper plate 1117, and thus provide a height H and shut height S of distances required for the standard operational configuration for producing performs. As noted above, regular tonnage blocks 1118 are received in apertures in the wear plate 1119, so that load borne by the regular tonnage blocks 1118 is transferred to the stripper plate 1117. It would only be in an exceptional situation where a wear plate 1119 would be used to transmit compressive loads between the cavity plate and the core plate with the tonnage blocks engaging the wear plate.

As will be described further below, adaptive tonnage blocks 1113 may also be provided and the position of the engaging surface of the adaptive tonnage blocks can be selected to provide an increased distance between the cavity plate 1110 and the stripper plate 1117 providing a height H (and corresponding shut height S) of a distance required for the alternate operational configuration.

Mold 1100 may be provided with a mold shut height adjustment apparatus that may comprise one or more distance augmenting structures. In particular, the mold shut height adjustment apparatus may comprise one or more of three separate mechanisms to cause an adjustment of the height H (and thus also an adjustment of the mold shut height S) and/or an adjustment of the configuration of the neck ring halves between the standard molding configuration and a second operational mode configuration such as the vent cleaning configuration. The mold shut height adjustment mechanisms may be integrated and at least partially embedded within one or both of the mold halves 1222, 1223. Three such mechanisms can be characterized as: (1) a cavity plate adjustment mechanism 2000; (2) a neck ring adjustment mechanism 4000; and (3) a core plate adjustment mechanism 3000. Of these, the cavity plate adjustment mechanism 2000 and core plate adjustment mechanism 3000 may cause an adjustment of mold shut height, and this may indirectly during operation result in an adjustment of the configuration of the neck ring halves 1114a, 1114b.

With respect to core plate adjustment mechanism 3000, its function is to adjust the distance between core plate 1103 and stripper plate 1117. By increasing the space between the core plate 1103 and stripper plate 1117, the position of lock ring 1104 relative to neck ring halves 1114a, 1114b can be adjusted. Specifically, the neck ring halves 1114a, 1114b can move longitudinally away from lock ring 1104. As will be described later, a corresponding adjustment of a distance between cavity plate 1110 relative to stripper plate 1117 can allow cavity flange 1131 to move (longitudinally) relative to the inclined surface of the neck ring halves 1114a, 1114b. This movement can be facilitated by cavity plate adjustment mechanism 2000, to allow neck ring halves 1114a, 1114b to move outwardly from the standard molding configuration to a vent cleaning configuration as described above.

Figure 28:
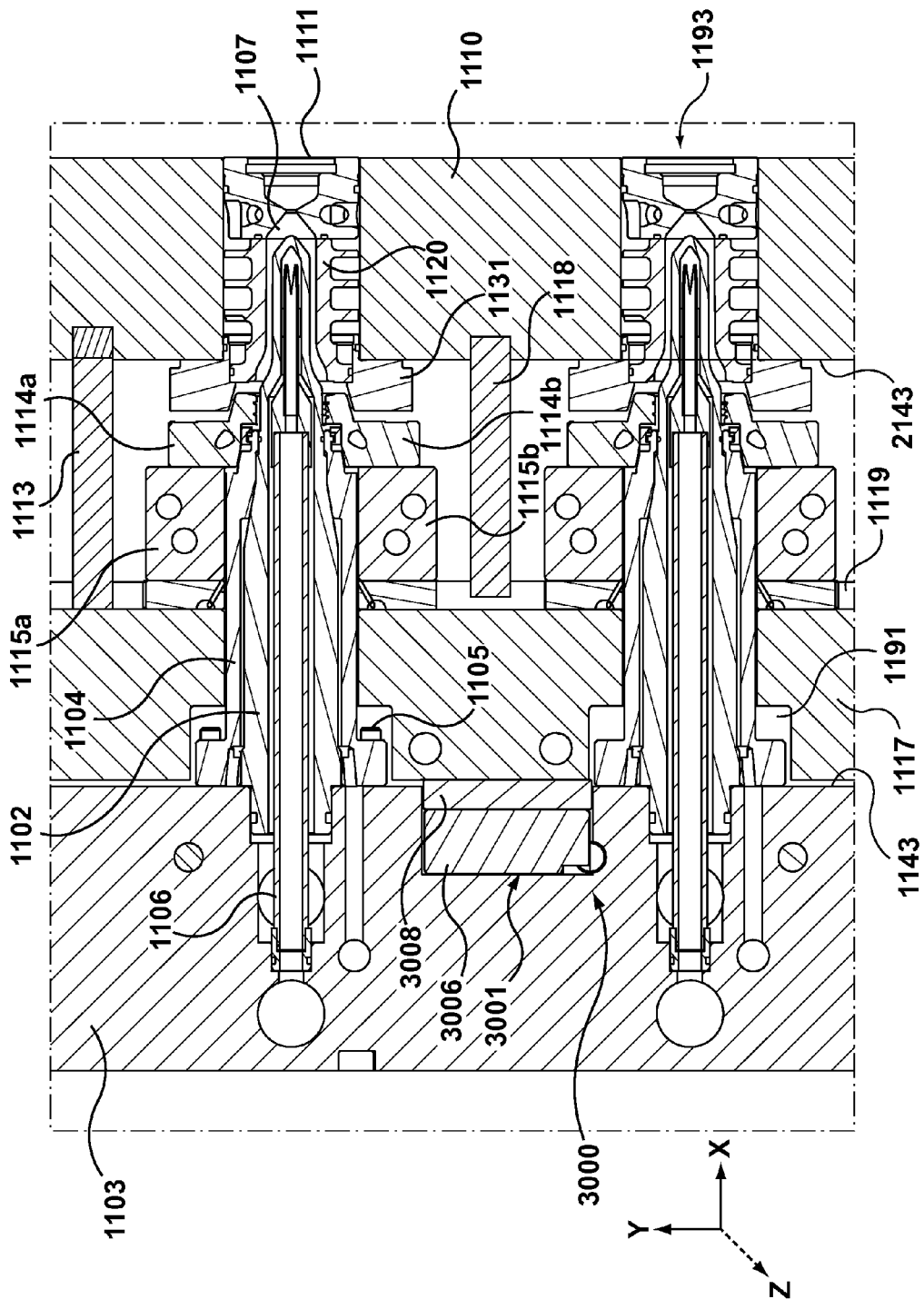
FIG. 28 is a cross-sectional view through part of the mold part of FIG. 14 with the injection mold in an alternate configuration.

With particular reference to FIGS. 15, 16 and 16A to 16I, core plate adjustment mechanism 3000 comprises a plurality of core plate adjustment devices 3001 that may be referred to herein as back up pads. The back up pads 3001 may be received in recesses or apertures 3016 defined in the core plate 1103. As is best shown in FIG. 28, and as will be more fully described hereinafter, in an alternate operational configuration, the back up pads 3001 may be extended to space stripper plate 1117 apart from core plate 1103. Accordingly, the plurality of back up pads 3001 may be spaced in appropriate locations about core plate 1103 to provide for a proper or appropriate loading distribution between the core plate and stripper plate 1117 when the back up pads 3001 are engaged to provide a separation of the core plate 1103 from the stripper plate 1117 (the stripper plate not being shown in FIG. 15 and FIGS. 16A-16G).

Figure 15:
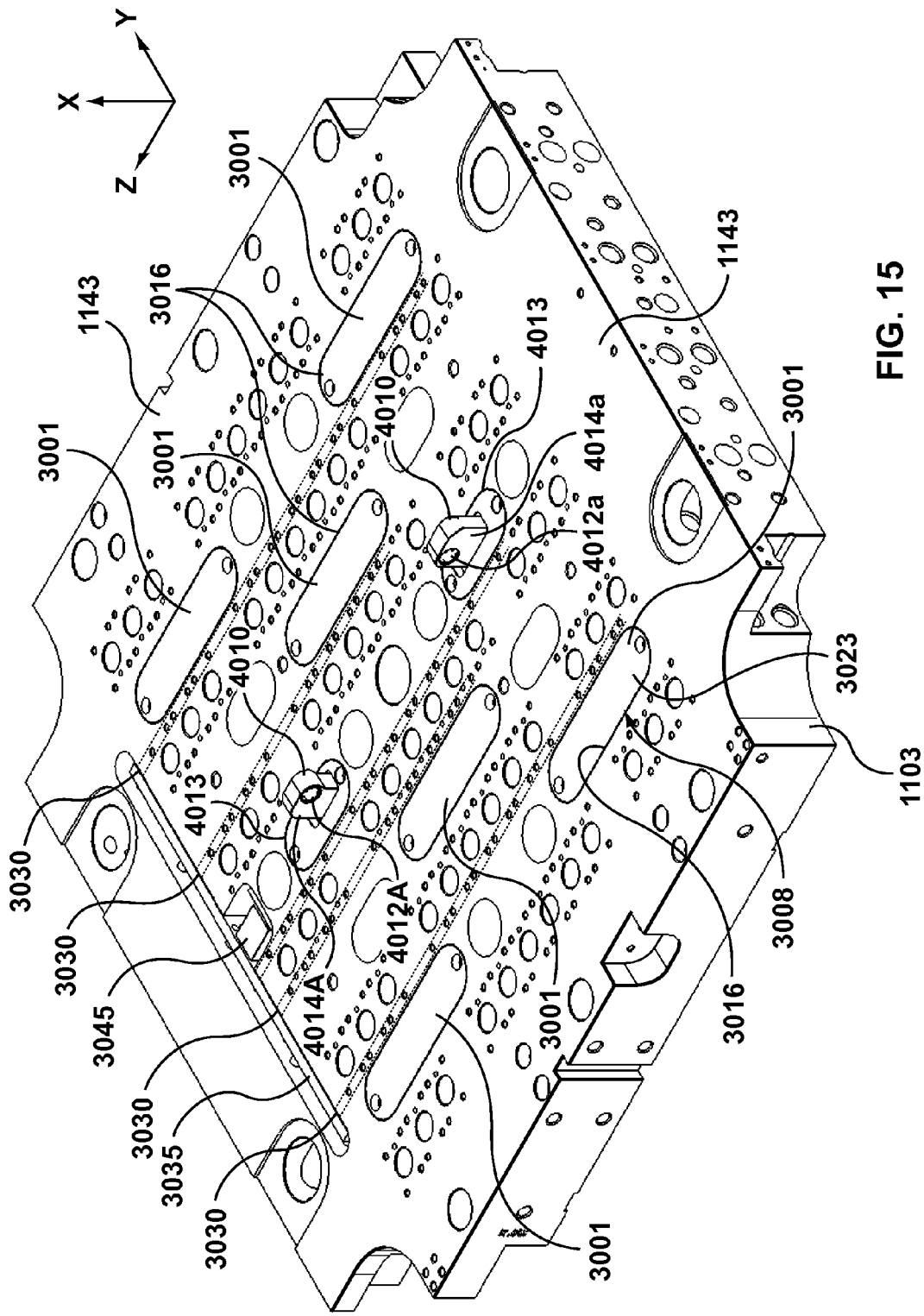
FIG. 15 is an isometric view of a core plate of the mold of FIG. 14.
Figure 16C:
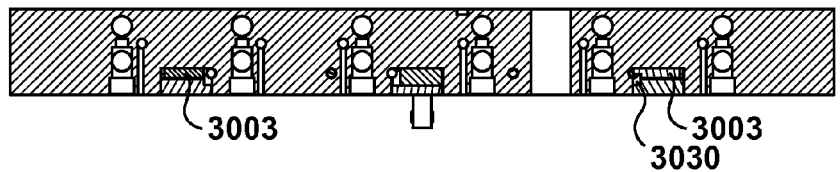
FIGS. 16B and 16C are cross-sectional views of the core plate of FIG. 16A, along sections 16B-16B and 16C-16C, respectively.
Figures 16A, 16B:
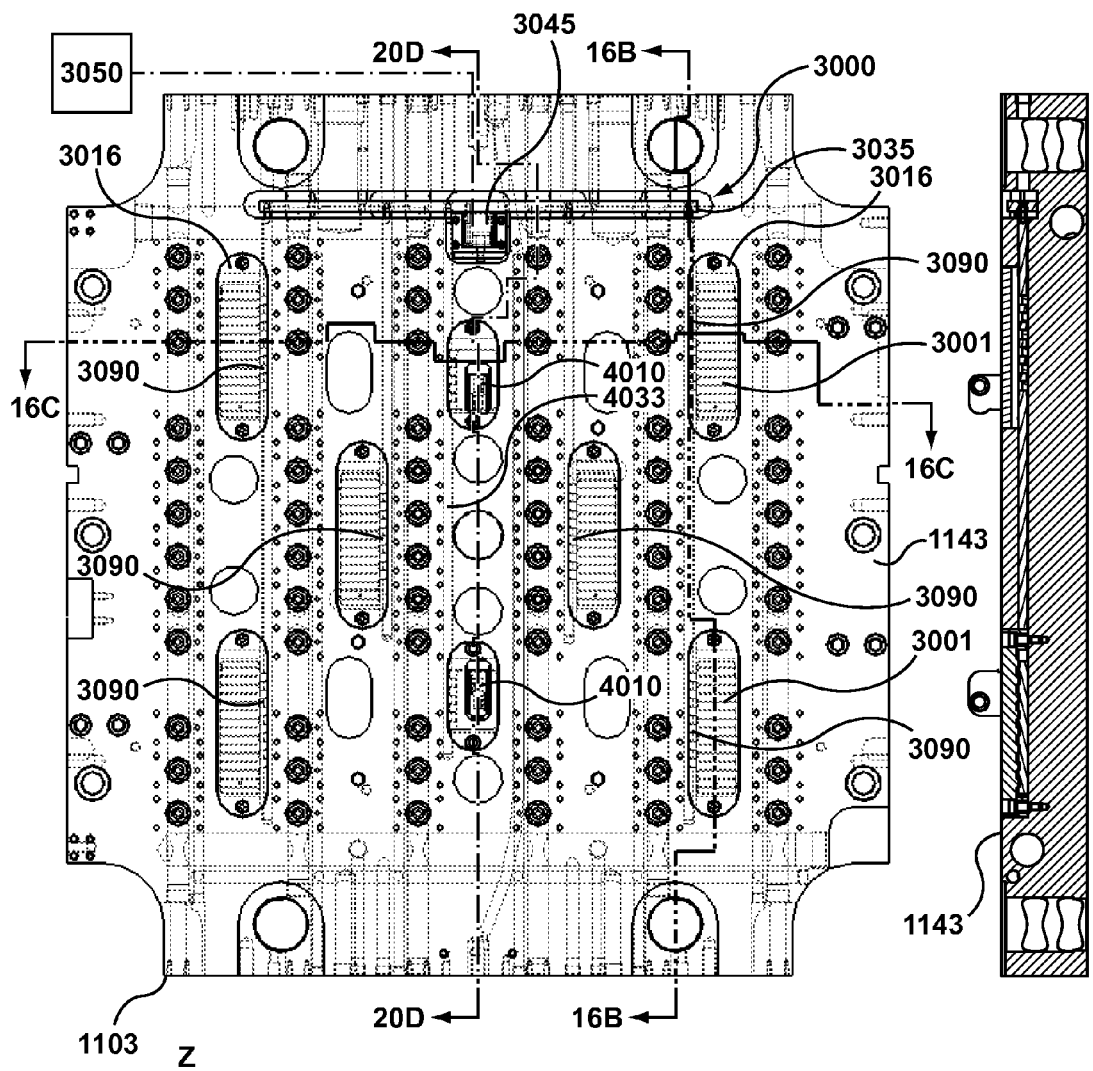
FIG. 16A is a front elevation view of the core plate of FIG. 15.
Figure 16D:
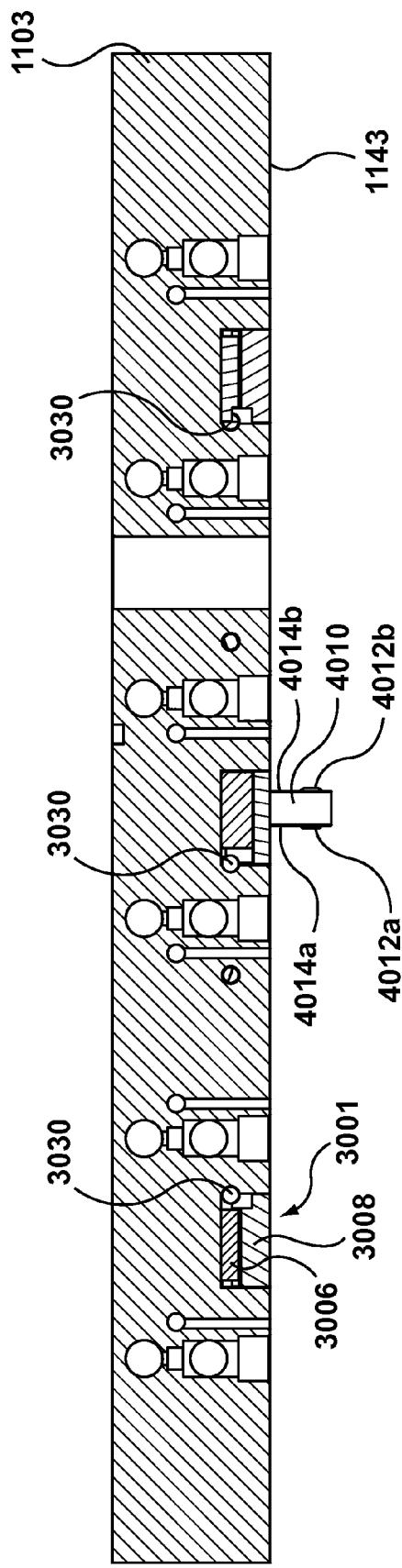
FIG. 16D is an enlarged view of the cross-section shown in FIG. 16C.
Figure 16E:
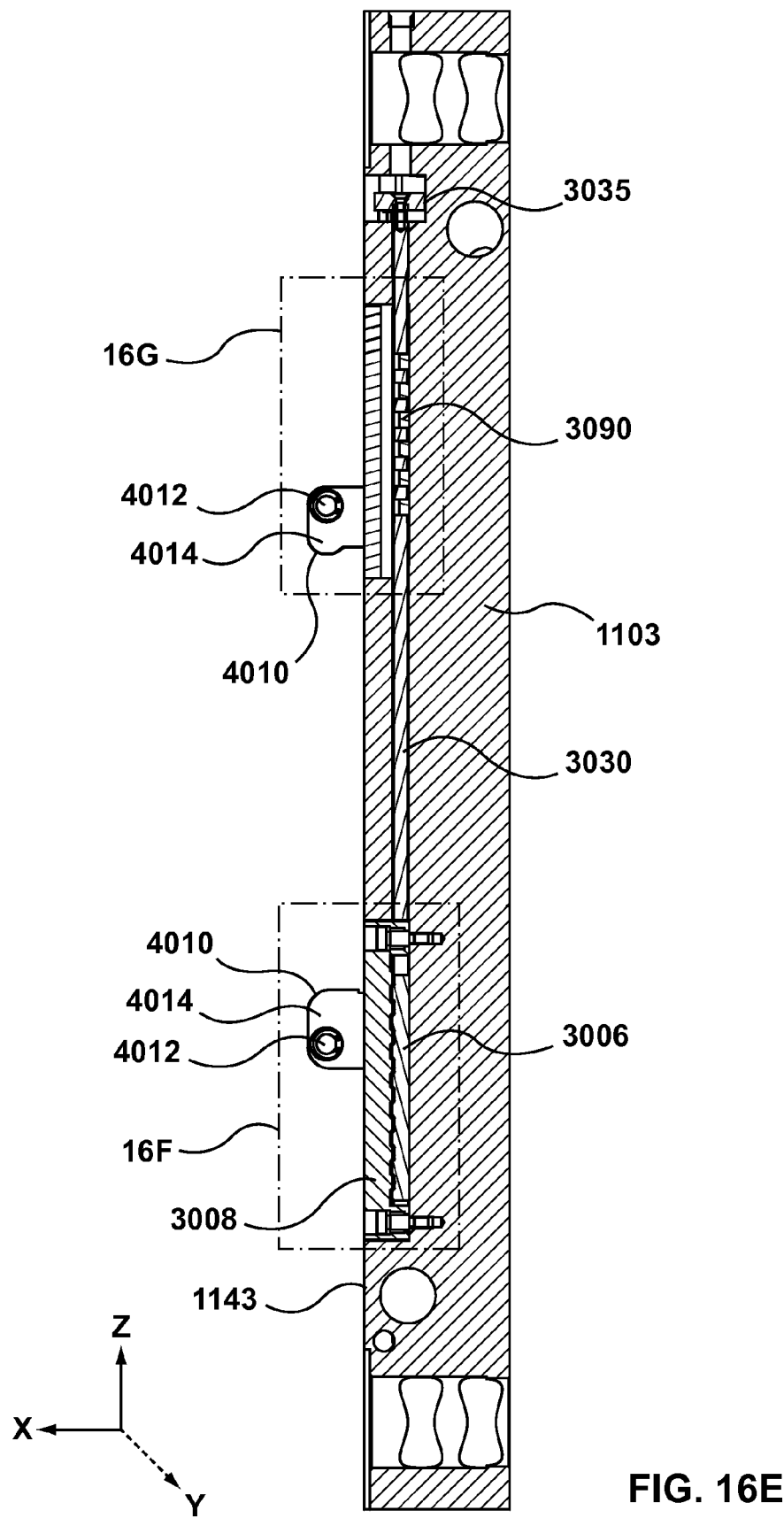
FIG. 16E is an enlarged view of the cross-section shown in FIG. 16B.
Figure 16F:
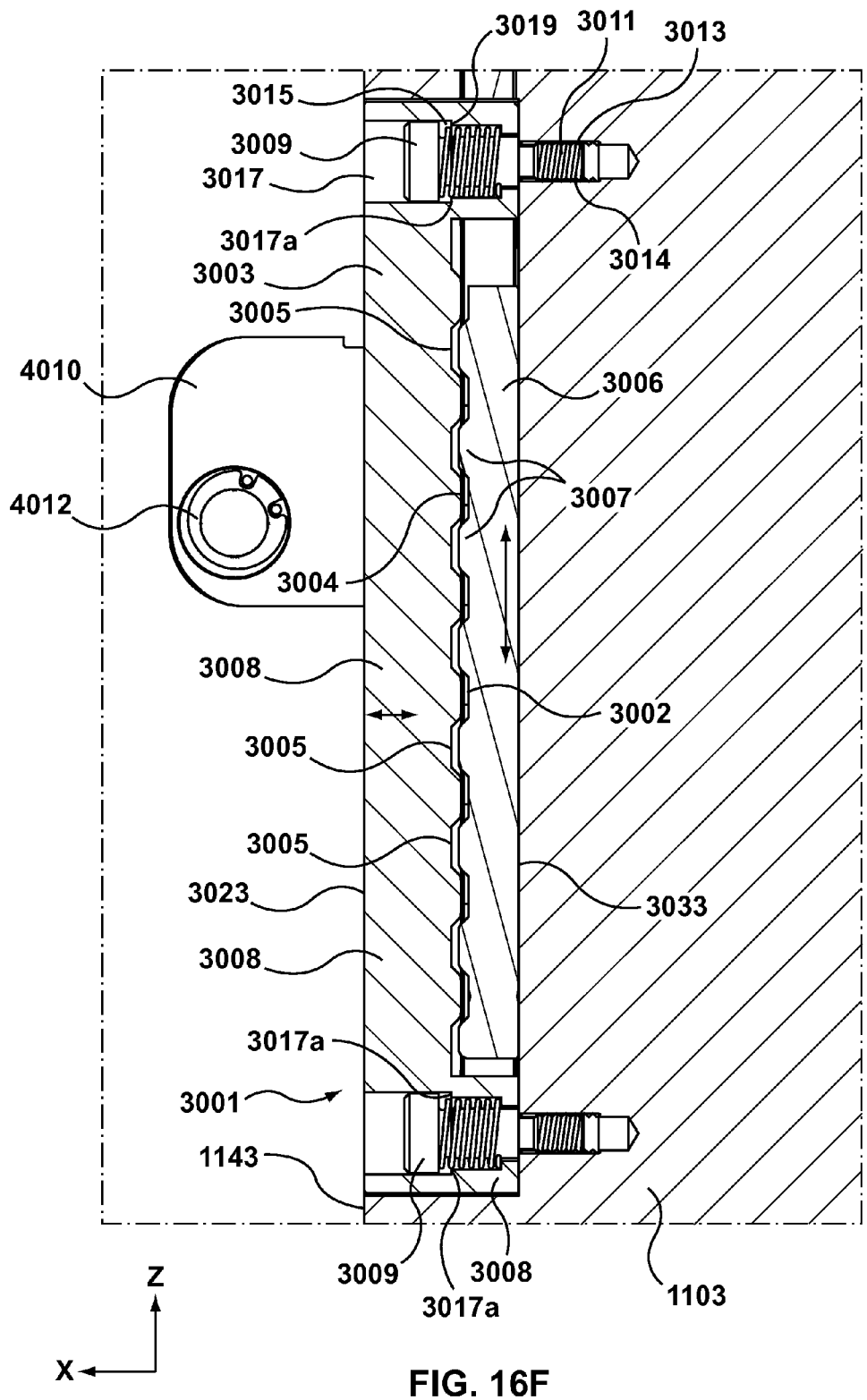
FIG. 16F is an enlarged view of the portion 16F in FIG. 16E, with a further enlarged portion thereof.

As is best shown in FIGS. 15 and 16F, each back up pad 3001 may integrated within and be partially embedded in core plate 1103. Each back up pad 3001 may include an engagement portion 3008 having an engagement surface 3023. Engagement portion 3008 is moveable in a direction parallel to axis X from a first, retracted position where the engagement surface 3023 is generally flush with, or reset behind, the surface 1143 of the core plate 1103 to a second, extended position where the engagement surface 3023 extends past surface 1143 of core plate 1103. When the engagement surface 3023 is at the first (retracted) position generally flush with, or reset behind, surface 1143 of the core plate 1103, the mold 1100 may be in its standard mold operating configuration. When the engagement surface is in its second (extended) position, the injection mold 1100 may be in an alternate operational configuration such as a vent cleaning configuration.

With particular reference to FIGS. 16E and 16F, in addition to engagement portions 3008, each back up pad 3001 may have a driving portion 3006 which is moveable with a sliding motion between first and second positions. Driving portion 3006 may have a flat surface 3033 which rests against an adjacent surface of the core plate 1103 in the aperture 3016 in the core plate. Thus, a load on the driving portion 3006 acting in the direction parallel to axis X towards the core plate 1103 can be transmitted to the core plate 1103. In a first position (shown in FIGS. 16F and 16H) the driving portion 3006 is in a first position where protrusions 3007 on its surface are received in corresponding recesses 3005 on the surface of the engagement portion 3008.

Similarly, in such a first position, protrusions 3004 on the engagement portion may be received by corresponding recesses 3002 on driving portion 3006. Driving portion 3006 may be moved from the position (shown in FIGS. 16F and 16H) in a direction parallel to axis Z to a second position (as shown in FIG. 16I) where protrusions 3007 on the surface of driving portion 3006 push and cam against the protrusions 3004 on the surface of the engagement portion 3008 and move to a position where the protrusions 3007 are generally aligned with protrusions 3004 in the Z direction. This has the effect of causing the engagement portions 3008 of back up pads 3001 to move away from core plate 1103 in a direction parallel to the X axis. In this position a space can be created between the adjacent surface 1143 of core plate 1103 and the adjacent surface 1147 of stripper plate 1117. The engagement portion 3008 and the driving portion 3006 of each back up pad device 3001 may be made from any suitable material such as by way of example stainless steel.

The movement of engagement portion 3008 is limited to the aforementioned sliding movement parallel to the X axis. This limited movement may be accomplished in many ways. For example, as is best shown in FIG. 16F, a pair of spaced bolts 3011 may be provided proximate opposed ends of the driving portion 3006, the bolts having shafts that are generally axially aligned with axis X. The shafts of bolts 3011 may have bottom threaded end portions 3014 that are received in corresponding threaded apertures 3013 in the core plate 1103. Shafts of bolts 3011 may also have upper portions that at their upper end are integrally connected with bolt heads 3009. Each bolt 3011 may be received in a generally cylindrical pad aperture 3017 that passes entirely through engagement portion 3008. The movement within the pad apertures 3017 will be guided by the contact with the outer side surfaces of the bolt heads. Each pad aperture 3017 may have a shoulder portion 3017a. Between the bottom surface of bolt 3011 and the upper surface of shoulder portion 3017a is a gap 3015. It will be appreciated that the engagement portion 3008 of back up pad 3003 may move in a direction parallel to axis X as the bolt heads 3009 move within their respective apertures 3017 between an extended outward position where the shoulders 3017a abuts the lower surfaces of the bolt heads 3009, and an inward retracted position where the protrusions 3004 of the engagement portion 3008 are transversely aligned and in abutment with the recesses 3002 of the driving portion 3006 (i.e. the engagement portion 3008 is fully retracted).

Optionally, the engagement portion 3008 may be force biased to the retracted position by a biasing mechanism. For example, the driving portion 3008 may biased to the retracted position by a spring mechanism. The spring mechanism may include a coil spring 3018 retained under compression between each one of bolt heads 3009 and the upper surface of the corresponding shoulder portion 3017a as shown in FIG. 16F.

Figure 16G:
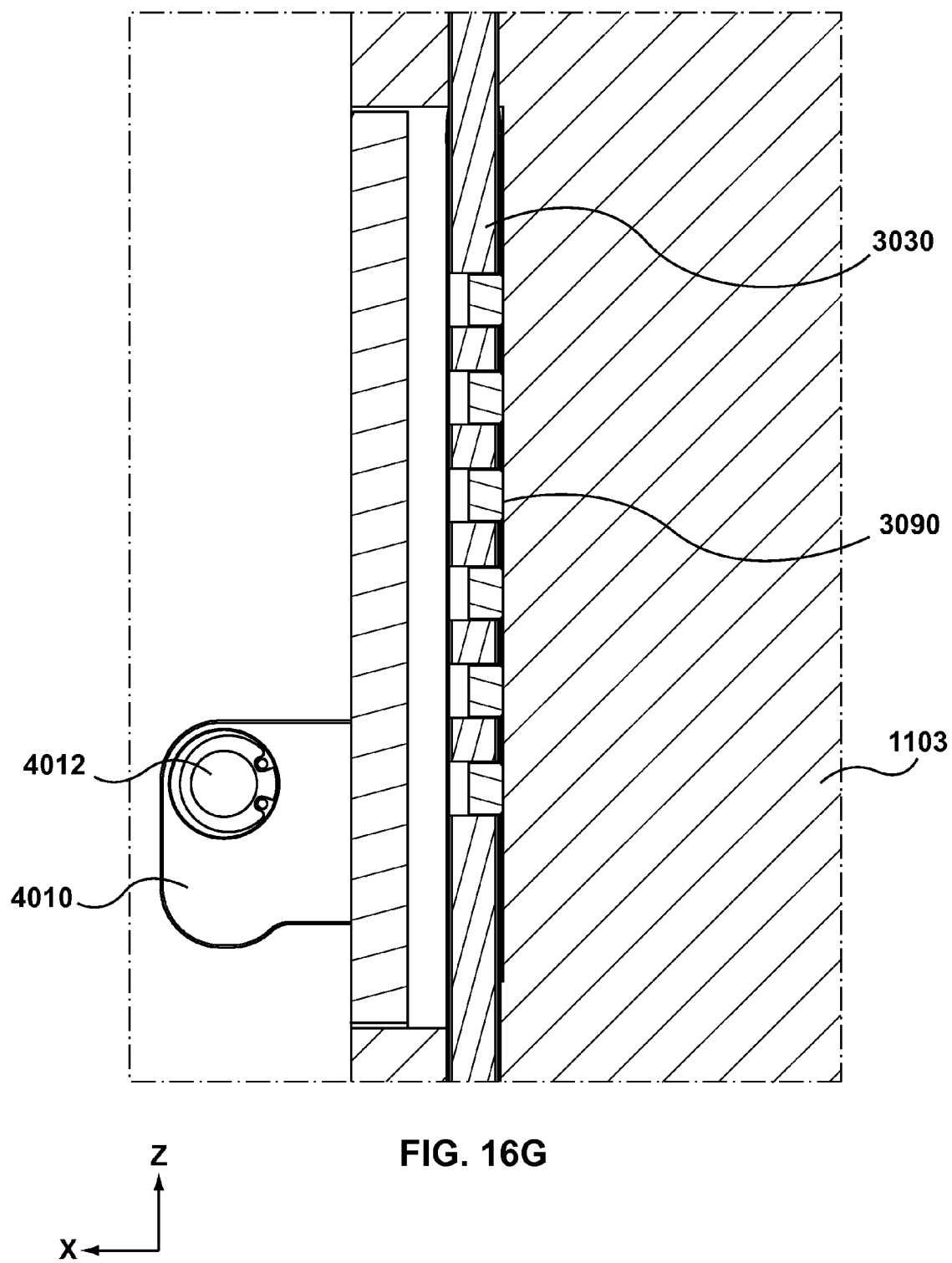
FIG. 16G is an enlarged view of the portion 16G in FIG. 16E.
Figure 16H:
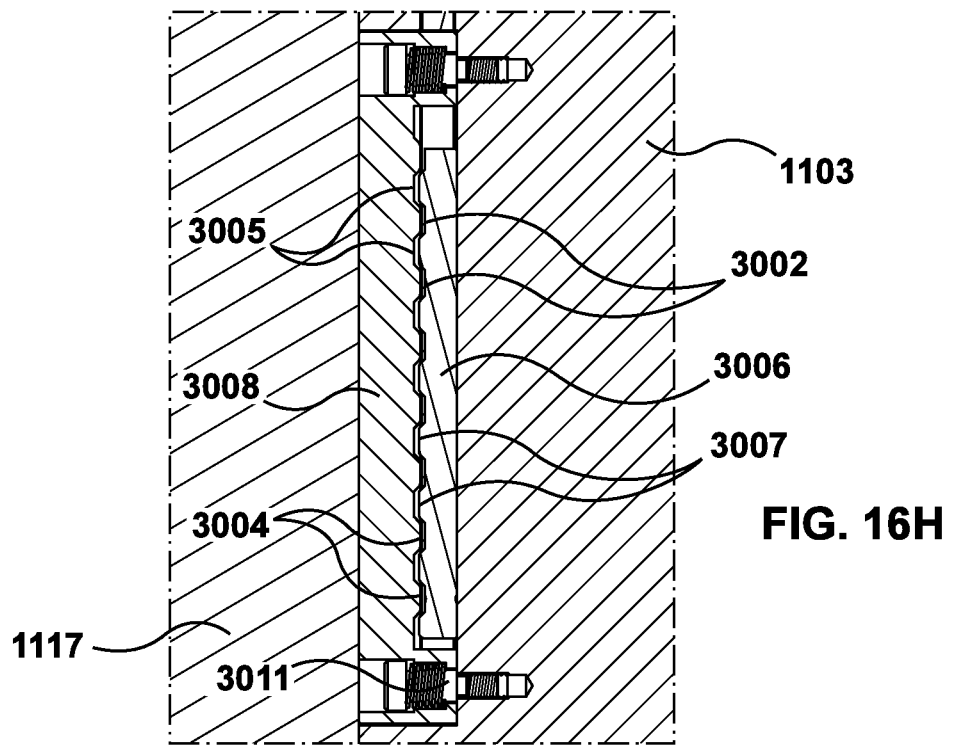
FIG. 16H is a view of part of the portion 16F in FIG. 16E shown in a retracted position, with a portion of a stripper plate of the mold.
Figure 16I:
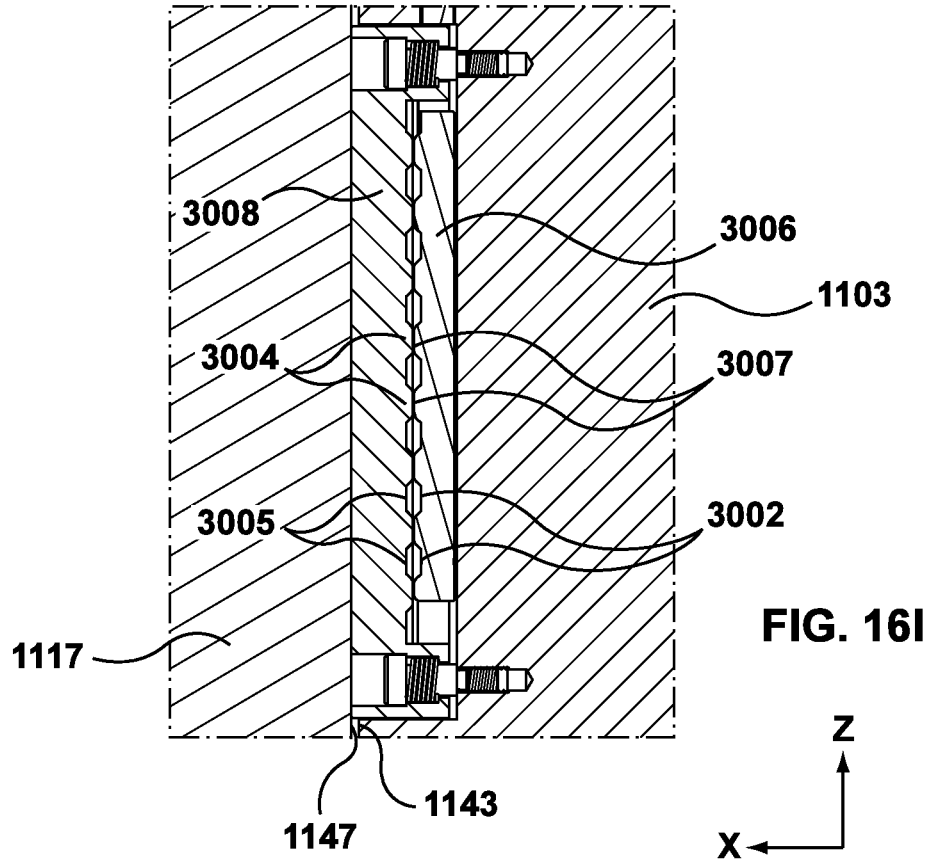
FIG. 16I is a view of the part of FIG. 16H but shown in an extended position, with a portion of a stripper plate of the mold.

With particular reference now to FIGS. 16A, 16E and 16G, it can be observed that to cause driving portion 3006 to be driven in reciprocating movement in a direction parallel to axis Z, driving portion 3006 may be secured to a connecting rod 3030 that generally runs in a direction parallel to axis Z. Connecting rod 3030 may be attached to driving portion 3006 by, for example, a series of interlocking teeth 3090 (FIG. 16E) on both the driving portion and connecting rod. However, other suitable attachment modes will be apparent to skilled persons, such as by way of example only welding or bolts. Connecting rods 3030 may be made from any suitable material, such as by way of example only heat-treated steel. A single rod 3030 may be attached to driving portions 3006 of one or more back up pad devices 3001. For example, the rod 3030 depicted in the cross sectional view of FIGS. 16B and 16E is attached to two driving portions 3006 of separate and aligned back up pad devices 3001.

With particular reference again to FIG. 16A, a plurality of connecting rods 3030 may be provided so that the driving portion 3006 of each back up pad device 3001 in the core plate 1103 may be connected to at least one connecting rod 3030. The plurality of connecting rods 3030, which all may extend and be aligned in a direction parallel to axis Z, may be themselves be all interconnected by any known and suitable attachment mechanism such as for example bolting, welding etc. to a common actuator cross bar 3035 that may be made from any suitable material such as by way of example only stainless steel. Actuator cross bar 3035 may be oriented in a direction generally orthogonal to the connecting rods and extend generally in a direction parallel to axis Y. Connecting rods 3030 may in some embodiments such as is illustrated in FIGS. 15-16G, be housed and moveable within enclosed channels that extend within the body of the core plate 1103, and thus will be generally not be visible when looking at the core plate such as in the view shown in FIG. 15. Thus connecting rods 3030 and actuating bar 3035 may together constitute a connection mechanism to connect the driving portion 3006 with an actuator. In other embodiments, the connecting rods 3030 may be housed and moveable within open channels where the channels are formed as longitudinally extending grooves defined in the core plate 1103 at the outward facing surface 1143 of core plate 1103

Actuator cross bar 3035 may in turn be secured in a suitable manner to an actuating device 3045 (FIG. 16A) such as a drive shaft of a servo motor or a pneumatic piston. The actuating device 3045 may be operated under the control of a controller 3050, such as, for example, a programmable logic controller (PLC) or industrial computer. Actuating device 3045 may thus have a communication link to the controller 3050 which may be wired or wireless. Actuating device 3045 may be mounted within the core plate with screws connecting it to the core plate. Actuating device 3045 may have an actuating shaft (not shown) operable for intermittent, controlled, reciprocating movement back and forth in directions that are generally parallel to axis Z. Thus actuating device 3045 and its reciprocating shaft is interconnected to actuator cross bar 3035, which in turn is connected to each of the connecting rods 3030. The connecting rods 3030 are in turn are interconnected to driving portions 3006 of back up pad devices 3001. Thus, cyclical, intermittent backward and forward movement of the actuating shaft of the actuating device 3045 can result in synchronized movement of each driving portions 3006 of all back up pad devices in a direction parallel to axis Z, and thus the synchronized extension of all engagement portions 3008 in the direction parallel to axis X. By way of example only, actuator shaft of actuating device 3045 may be moved about 10 mm in a direction parallel to axis Z, resulting in a corresponding movement parallel to the Z axis of the connecting rods 3030 and the driving portions 3006 of the back up pad devices 3001. The engagement of driving portions 3006 with engagement portions 3008 may translate into 0.5 mm movement of the engagement portions 3008 in a direction parallel to axis X to result in a 0.5 mm separation between the adjacent surfaces of the core plate 1103 and the stripper plate 1117.

It will be appreciated that this movement of the engagement portions 3008 of back up pad devices 3001 will typically be carried out when the mold stack 1111 is not under a clamping force A and when most if not all compressive forces acting on the core plate 1103 and stripper plate 1117 have been removed, allowing the stripper plate 1117 to be displaced in a direction parallel to the X-axis. For example, movement of engagement portions 3008 may typically be effected with the mold 1100 fully open for ejection of performs or other parts. Once the extended position of the engagement portions 3008 has been reached, however, the engagement portions 3008 will be able to maintain their extended position once the compressive loads are re-applied, during operation in the second mode such as vent cleaning, and load will be transmitted through the driving portions 3006 to the core plate 1103.

It will be appreciated that other alternate mechanisms may be provided to effect movement of the engagement portion 3008 of each back up pad device 3001 between the retracted and extended positions.

In the embodiment of FIGS. 15 and 16A-16G, some parts of neck ring adjustment mechanism 4000 are also shown. In particular, a pair of spaced, generally L-shaped, actuating blocks 4010 are integrated with and at least partially embedded and received within apertures 4013 in the outer surface 1143 of core plate 1103 (see also FIGS. 20A-G). Each actuating block 4010 has opposed engagement faces 4014a, 4014b. Each engagement face 4014a, 4014b, may contain a spring-loaded thrust pad device 4012a, 4012b that may be in the form of a thrust pad have a generally semi-spherical surface for engaging one of a dowel or other member 4032a, 4032b (FIGS. 20B-20C; the position of thrust pads 4012a, 4012b is also shown in broken line in FIG. 20D), on a slide bar connecting bar 4030a, 4030b as will be explained further hereafter. Thrust pad portions 4012a, 4012b may be resiliently displaceable in directions parallel to axis Y relative to the remaining parts of block 4013. For example the thrust pad portions 4012a, 4012b, may be received in opposed channels in block 4013 and be spring loaded providing a spring force created by a spring (not shown) that on each thrust pad portion, tends to exert an outwardly directed force. The thrust pad portions 4012A, 4012B may be held in the channel by a retaining ring (not shown)

Each actuating block 4010 is adapted to be able to slide in back and forth in directions parallel to axis Z within the core plate aperture 4013. Each actuating block 4010 may be supported for such sliding movement within the aperture 4013 by having a base leg 4019 of the actuating block supported upon a base 4015 surface within the aperture 4013. The aperture 4013 may also be provided with a cover 4017 (FIGS. 20B-

20C) which can be releasably attached to the core plate 1103 with bolts 4035 (FIG. 20E) that may be received in threaded apertures 4037 in core plate 1103. The base leg 4019 of the actuating block 4010 may thus move in sliding movement in the channel provided by aperture 4013 and top cover 4017

Each actuating block 4010 may be also secured to one of the connecting rods 3030. Actuating blocks 4010 may be attached to the same connecting rods that are also connected to driving portions 3006 of back up pad devices 3001. The connection of the actuating blocks 4010 to the connecting rods can be effected in the same way as driving portions 3006 of back up pads 3001, for example, using interlocking teeth, or in any other suitable manner such as for example welding or bolting. Alternatively, a separate driving mechanism, such as for example including separate connecting rods, may be provided for actuating blocks 4010. Thus, actuating blocks 4010 may also be moved in reciprocating, intermittent movement in directions parallel to axis Z. This movement can cause the thrust pad devices 4012a, 4012b to engage with respective dowels 4032a, 4032b depending from slide bar connecting bars 4030a, 4030b respectively, causing a cam effect that translates into driving the slide bar connecting bars 4030a, 4030b respectively to move in opposite outward directions parallel to axis Y Similarly, a movement in an opposite direction can cause thrust pad devices 4012a, 4012b, to disengage from respective dowels 4032a, 4032b allowing the slide bars to move in opposite inward directions parallel to axis Y. When the thrust pad devices 4012a, 4012b disengage, the slide bar connecting bars 4030a, 4030b move in the opposite direction and can return to their standard operational configuration. Because in such configuration, the stack will be closed, the tapered surface on the neck ring halves 1114a, 1114b, engaged with the opposed tapered surface on lock ring or cavity flange can create a force to drive the slide bar connecting bars 4030a, 4030b in the opposite direction. The restoring force results from the clamping force applied to the stack and onto the neck ring halves 1114a, 1114b and thus the slide bars 1115a, 1115b.

Figure 17:
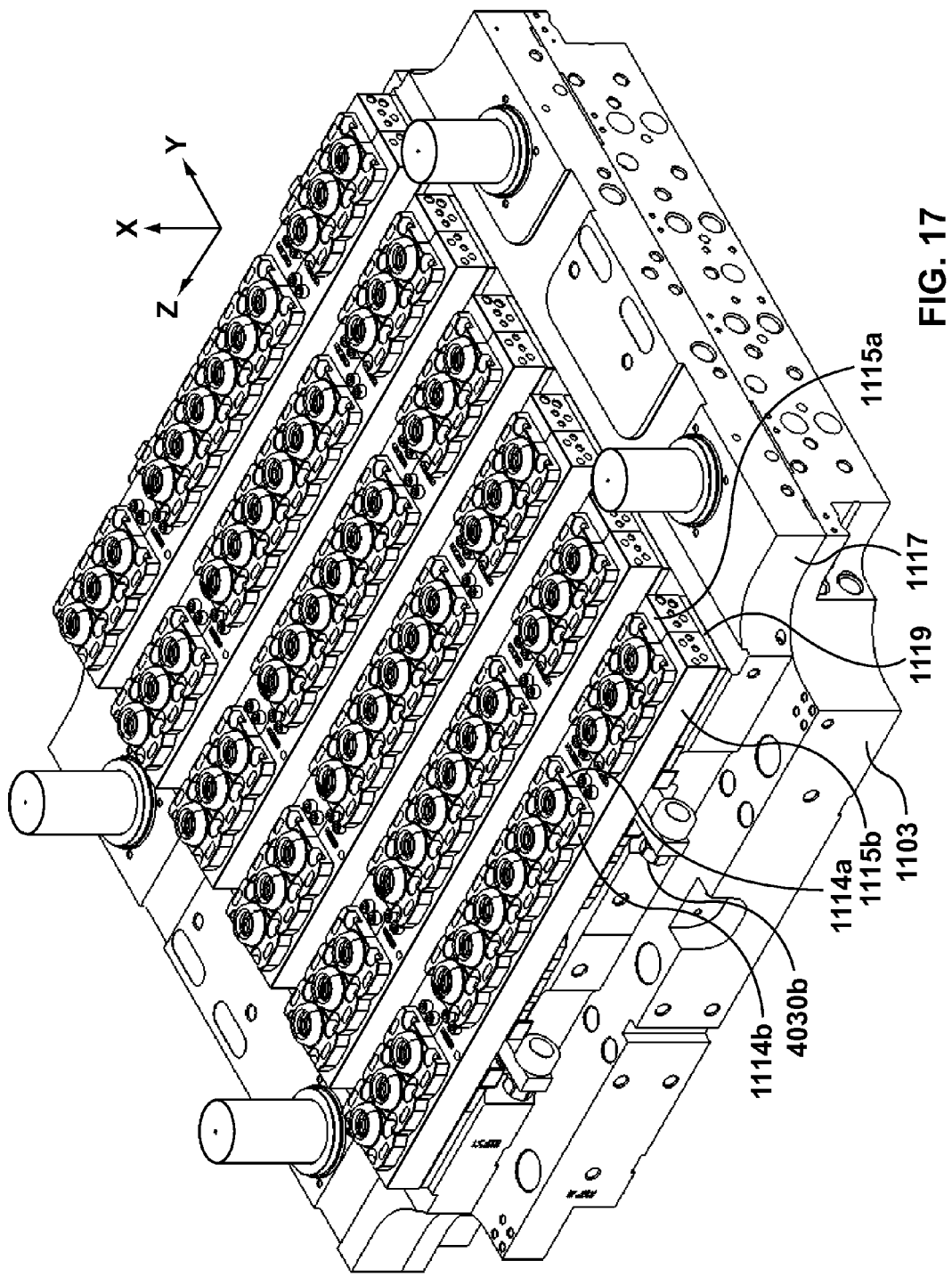
FIG. 17 is an isometric view of a sub-assembly of the injection mold part of FIG. 14.

Turning now to FIGS. 17, 18, 19, and 20A, various perspective views are shown of different sub-assemblies comprising components of mold 1100, with each of these views showing a different number of components than the other views. In FIG. 17, core plate 1103 is shown with stripper plate 1117 mounted above it, and wear plate 1119 mounted above the stripper plate. The sliding bar connecting bars 4030a, 4030b are received in channels formed through stripper plate 1117 and wear plate 1119 (see in particular FIGS. 15 and 16). These channels are oriented in a direction generally parallel to axis Y. The slide bar connecting bars 4030a, 4030b can each be joined to one of slide bars 1115a, 1115b such as with bolts (not shown). Each of the plurality of neck ring halves 1114a, 1114b is mounted to one of slide bars 1115a, 1115b. It will be appreciated that the plurality of neck ring halves 1114a, will move with slide bar 1115a in reciprocating movements in a direction parallel with axis Y. Similarly, the plurality of neck ring halves 1114b, will move with slide bar 1115b in opposite reciprocating movements but still in directions parallel with axis Y. Thus the neck ring halves 1114a, 1114b may be moved towards each other or away from each other, as required by the particular mode in which the injection mold 1100 is operating.

Figure 20A:
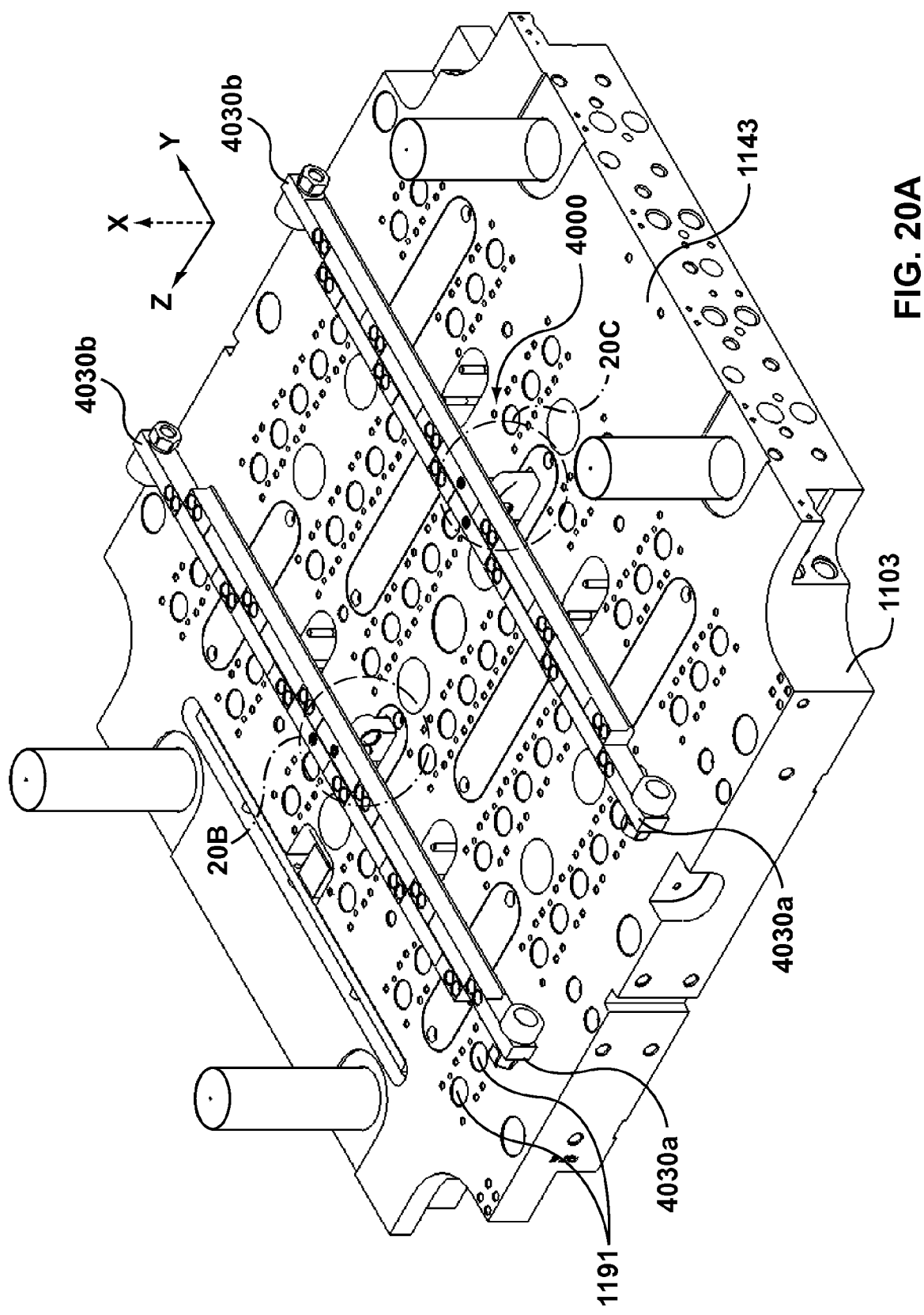
FIG. 20A is an isometric view of another sub-assembly of the mold part of FIG. 14
Figure 20C:
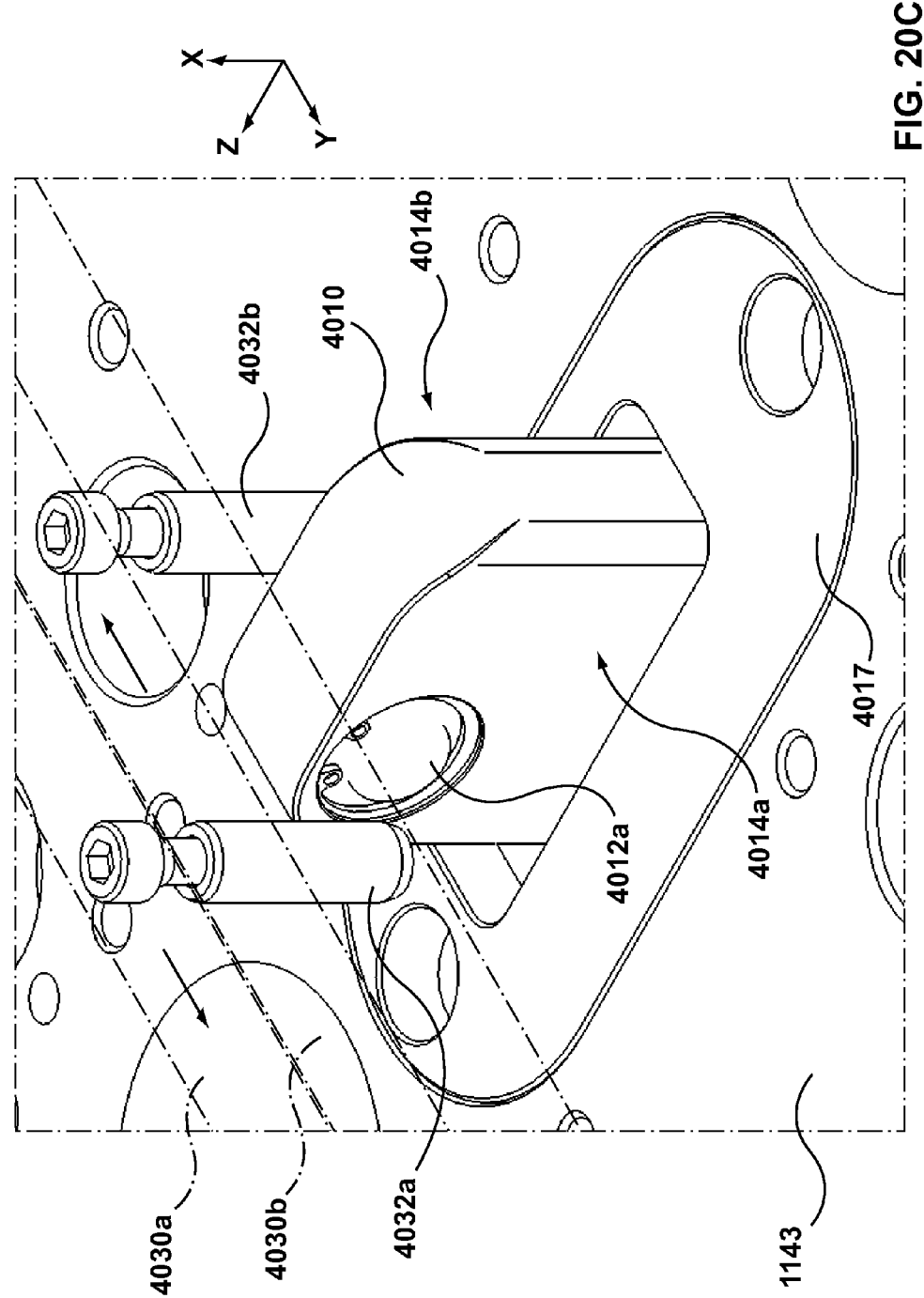
Figure 20D:
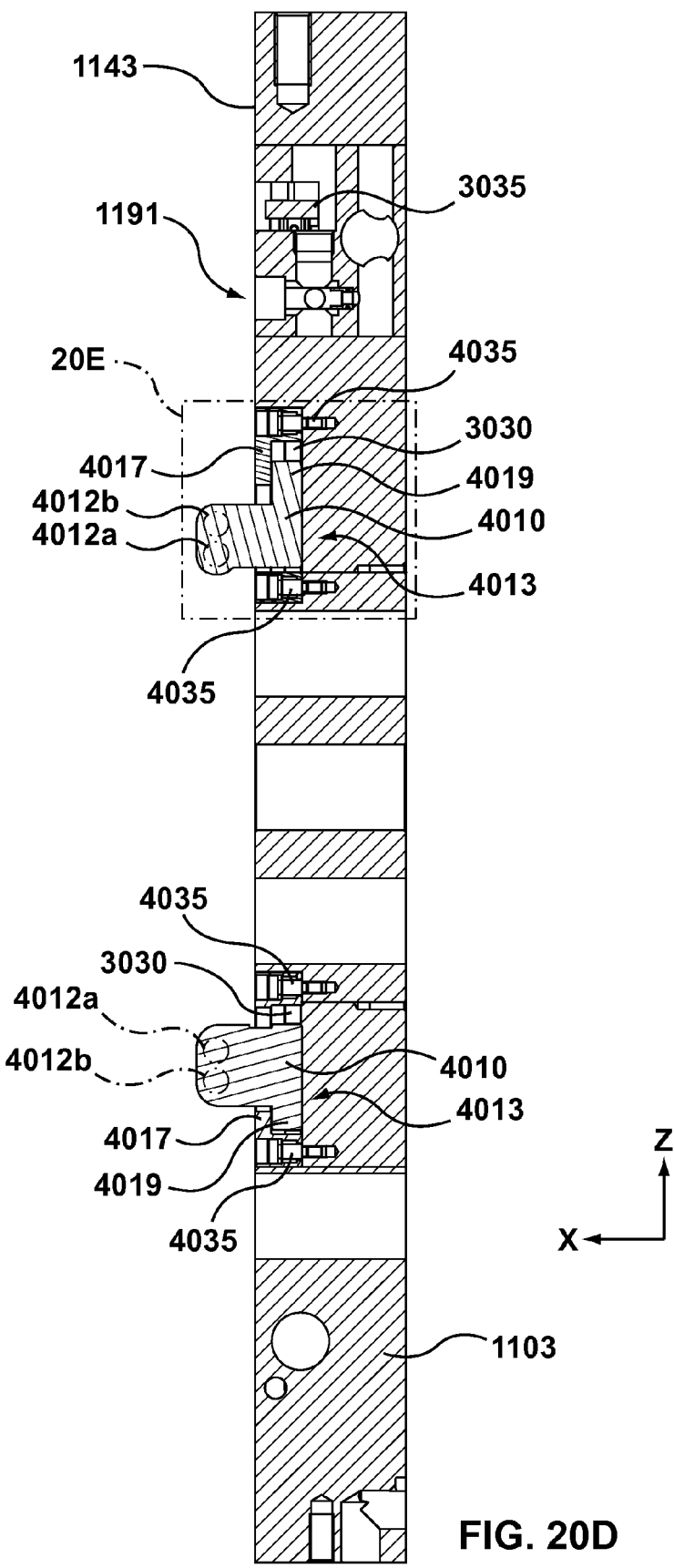
FIG. 20D is a cross-sectional view at section 20D-20D in FIG. 16A.
Figure 20E:
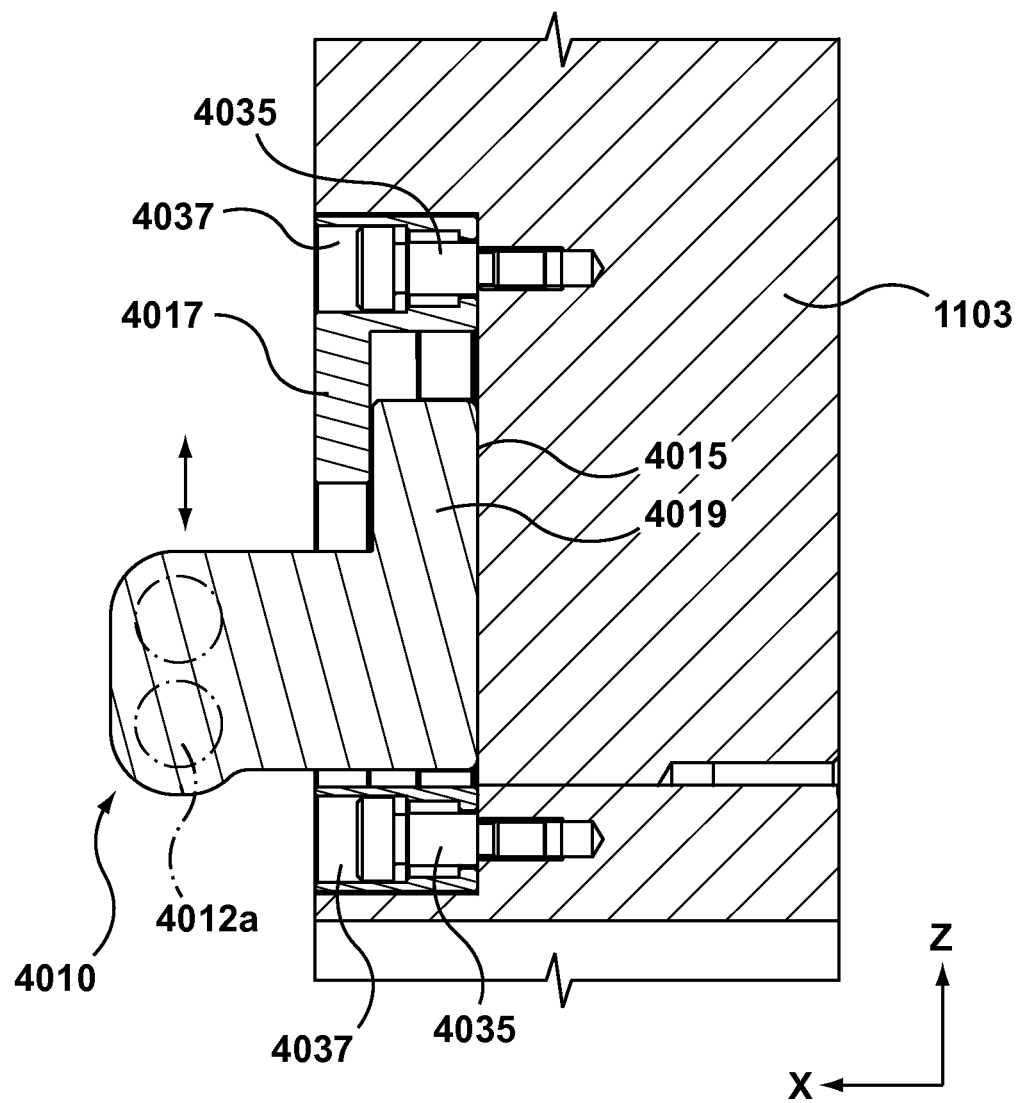
FIG. 20E is an enlarged view of portion marked 20E in FIG. 20D.

With particular reference now to FIGS. 20A, 20B and 20C, neck ring adjustment mechanism 4000 may be operated as follows. Each actuating block 4010 being secured to one of the connecting rods 3030 may be moved by the actuator bar 3035 connected to actuating device 3045 (see FIG. 16A), in reciprocating, intermittent movement in directions parallel to axis Z. This movement (which will move in synchronized operation with core plate adjustment mechanism 3000) can cause the thrust pad devices 4012a, 4012b to engage with the respective dowels 4032a, 4032b on slide bar connecting bars 4030a, 4030b respectively, causing a cam effect that translates into driving the slide bar connecting bars 4030a, 4030b respectively to move in opposite outward directions, but in directions parallel to axis Y. With particular reference now to FIGS. 17 and 18, when connecting bars 4030a are moved in an outward direction parallel to axis Y, this will move slide bars 1115a, and the neck ring halves 1114a attached thereto, in the same direction. Similarly when connecting bars 4030b are moved in an outward direction parallel to axis Y, but opposite to connecting bars 4030a, this will move slide bars 1115b, and the neck ring halves 1114b attached thereto, in the opposite direction to neck ring halves 1114a, and slide bars 1115b. Thus, neck ring halves 1114a, 1114b can be moved outwards away from each other to a position where they are configured for operation of the injection mold 1100 in the alterative operational mode such as the vent cleaning mode configuration. This movement will occur in synchronization with the separation of stripper plate 1117 from core plate 1103 by core plate adjustment mechanism 3000 as described above and as particularly illustrated in FIGS. 16H and 16I. Thus, actuating device 3045 under control of CONTROLLER 3050 can serve as the actuating driver for both core plate adjustment mechanism 3000 and neck ring adjustment mechanism 4000. Neck ring adjustment mechanism 4000 can be suitably configured to work co-operatively with the core plate adjustment mechanism 3000 as described above.

Turning now to cavity plate adjustment mechanism 2000 (FIG. 23A), its purpose is to adjust the spacing between the cavity plate 1110 and the stripper plate 1117 and thus can also modify the height H and corresponding mold shut height S. This will allow for adjustment in the distance in the X direction between the cavity flange 1131 relative to the neck ring halves 1114a, 1114b.

With particular reference to FIGS. 22, 23A-C, 24 and 25 cavity plate adjustment mechanism 2000 may comprise a plurality of cavity plate adjustment devices 2001 that may be referred to herein as adaptive tonnage blocks 1113. The adaptive tonnage blocks 1113 may be integrated with and at least partially embedded within cavity plate 1110. In this embodiment adaptive tonnage blocks 1113 are arranged in two rows, each row having four aligned adaptive tonnage blocks 1113. The plurality of adaptive tonnage blocks 1113 may be spaced in any appropriate locations about cavity plate 1110 to provide for a proper loading distribution on the cavity plate 1110 and stripper plate 1117 when the adaptive tonnage blocks 1113 are engaged to provide an additional distance separation of the cavity plate 1110 from the wear plate 1119.

Figure 22:
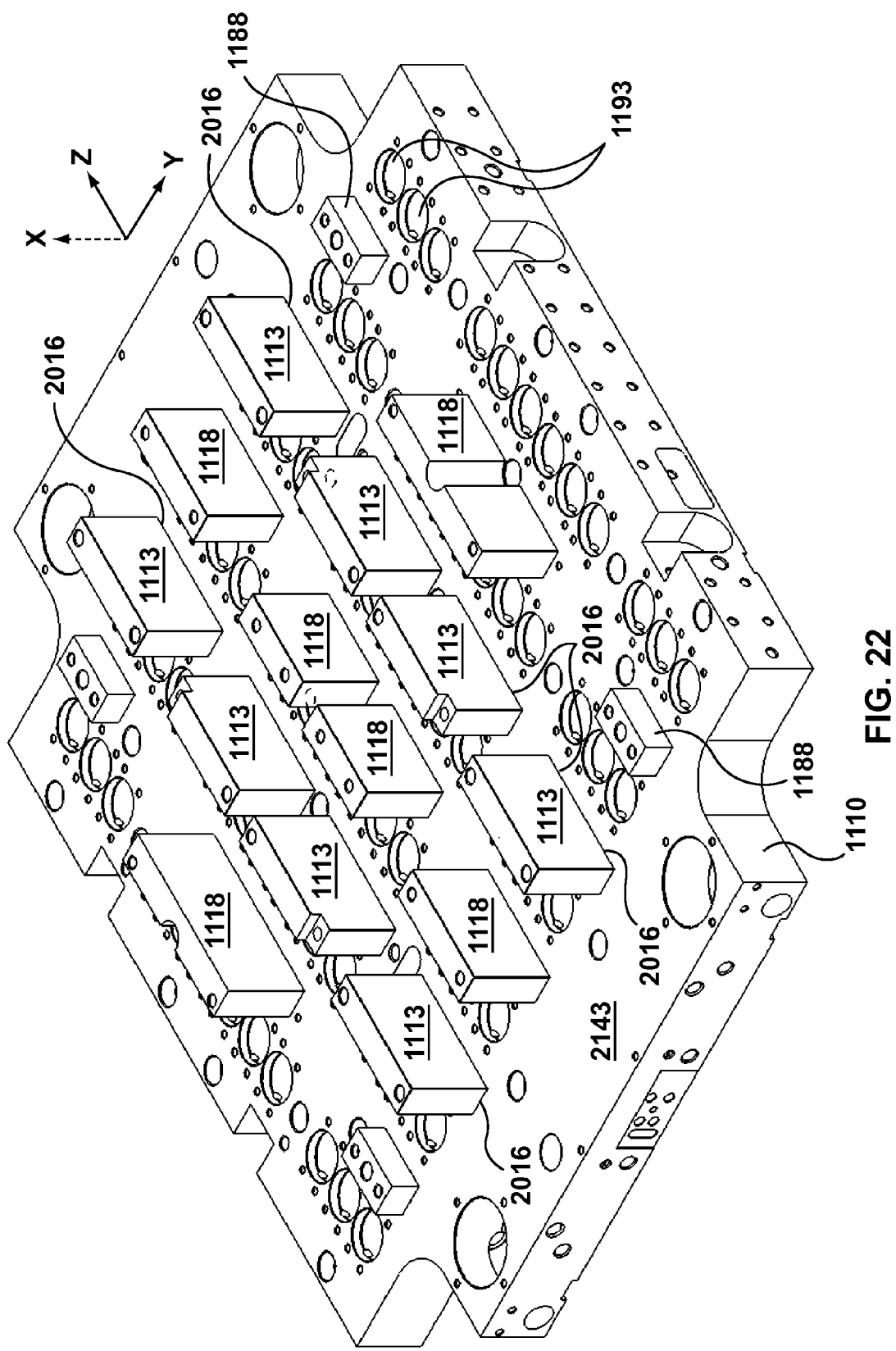
FIG. 22 is an isometric view of a cavity plate of the mold part of FIG. 14.
Figure 23B:
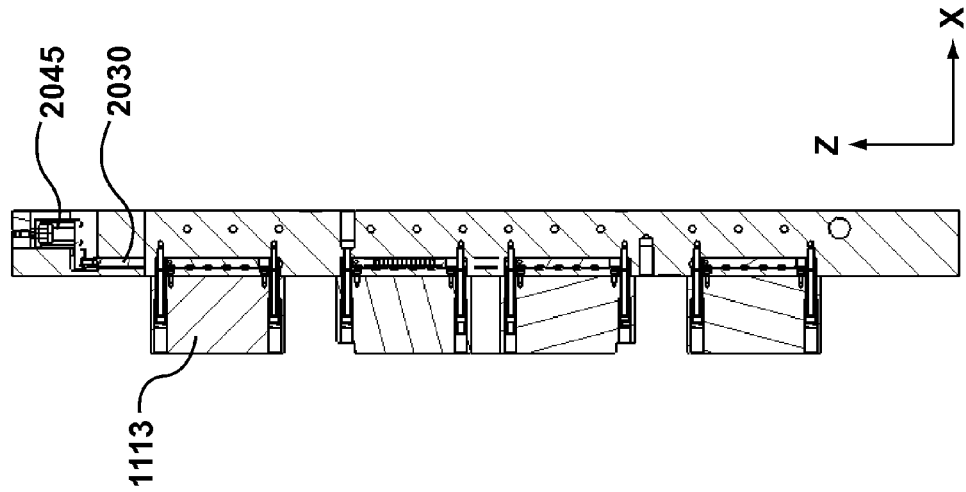
FIG. 23B is a cross-sectional view of the cavity plate of FIG. 23A at section 23B-23B in FIG. 23A.
Figure 23A:
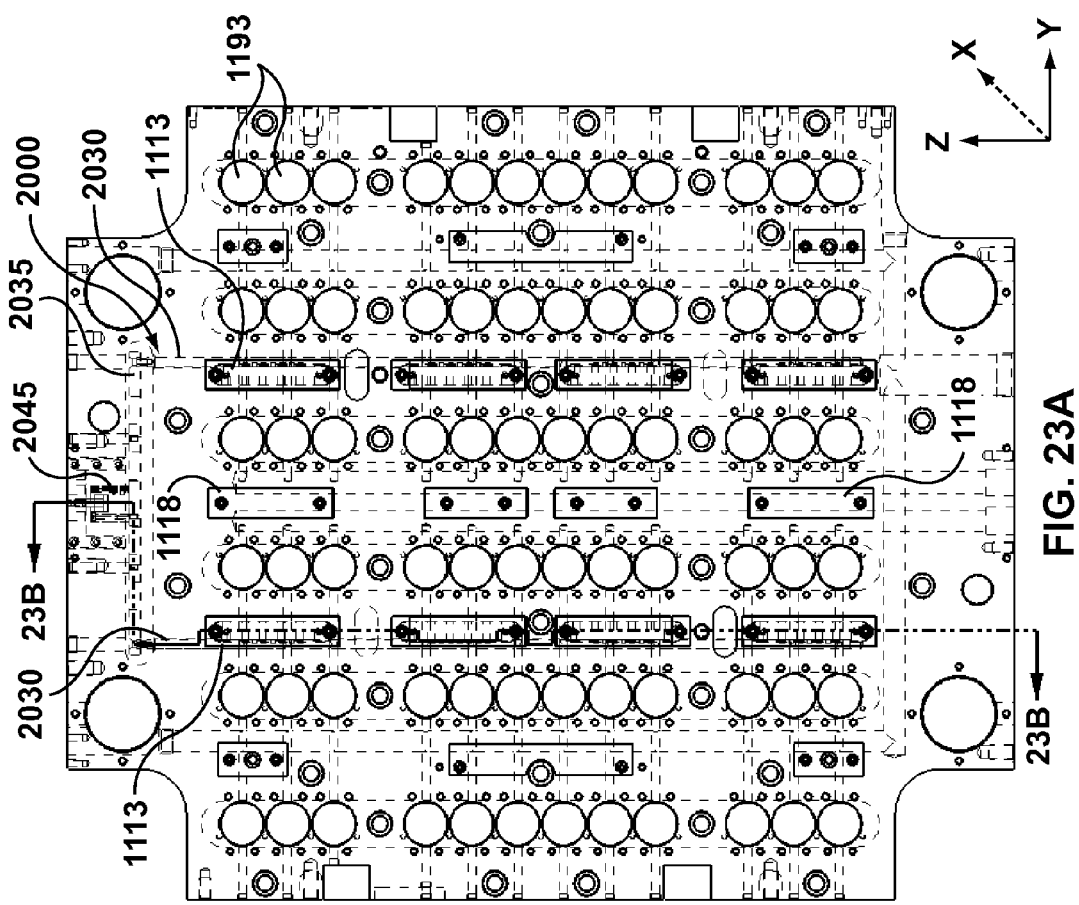
FIG. 23A is a front elevation view of the cavity plate of FIG. 22.
Figure 23C:
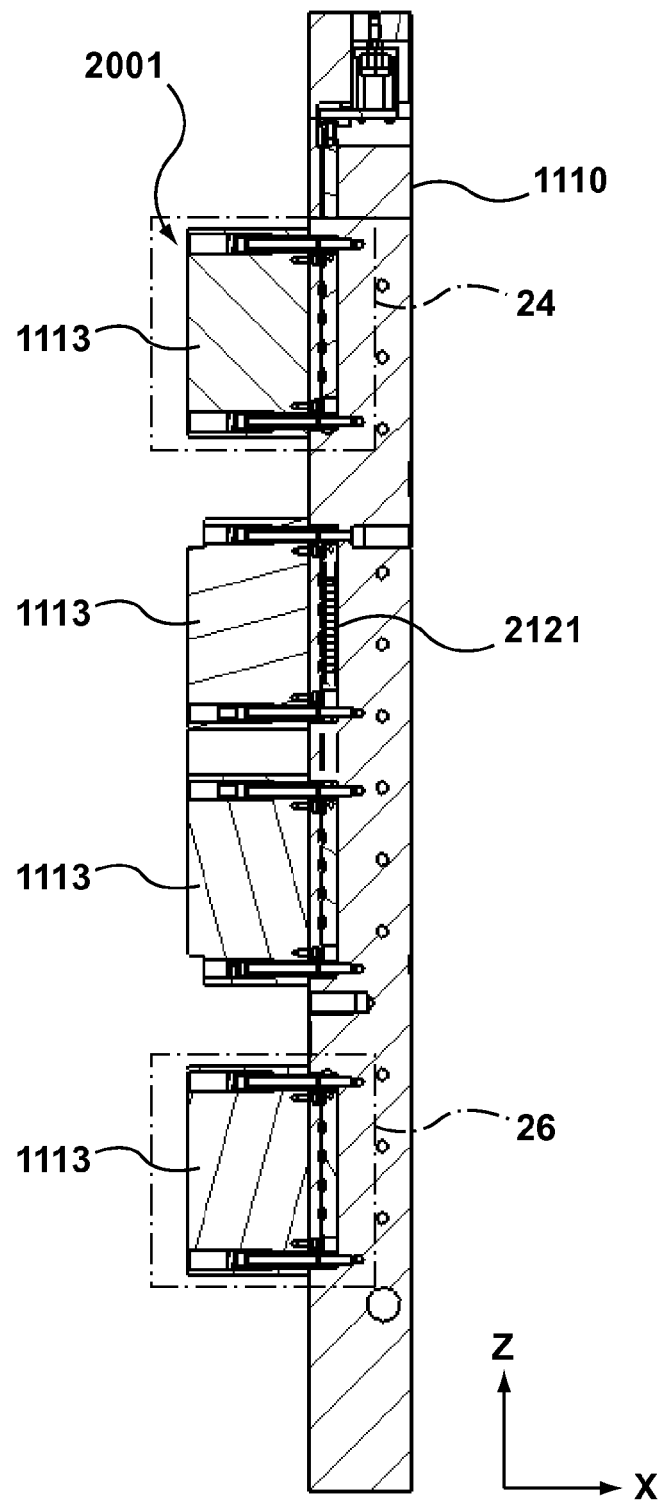
FIG. 23C is an enlarged view of the cross-section shown in FIG. 23B.

In addition to the adaptive tonnage blocks 1113, regular tonnage blocks 1118 as referenced above, may also be provided as shown in FIGS. 22 and 23A. Additionally, four reflex tonnage blocks 1188 (also referred to as a regulating tonnage structures) may optionally be provided, with one reflex tonnage block being positioned at each one of the four corners of the cavity plate 1110. Applicant's own U.S. Pat. No. 8,348, 657 issued Jan. 8, 2013 discloses examples of such structures that may be employed.

Figure 24:
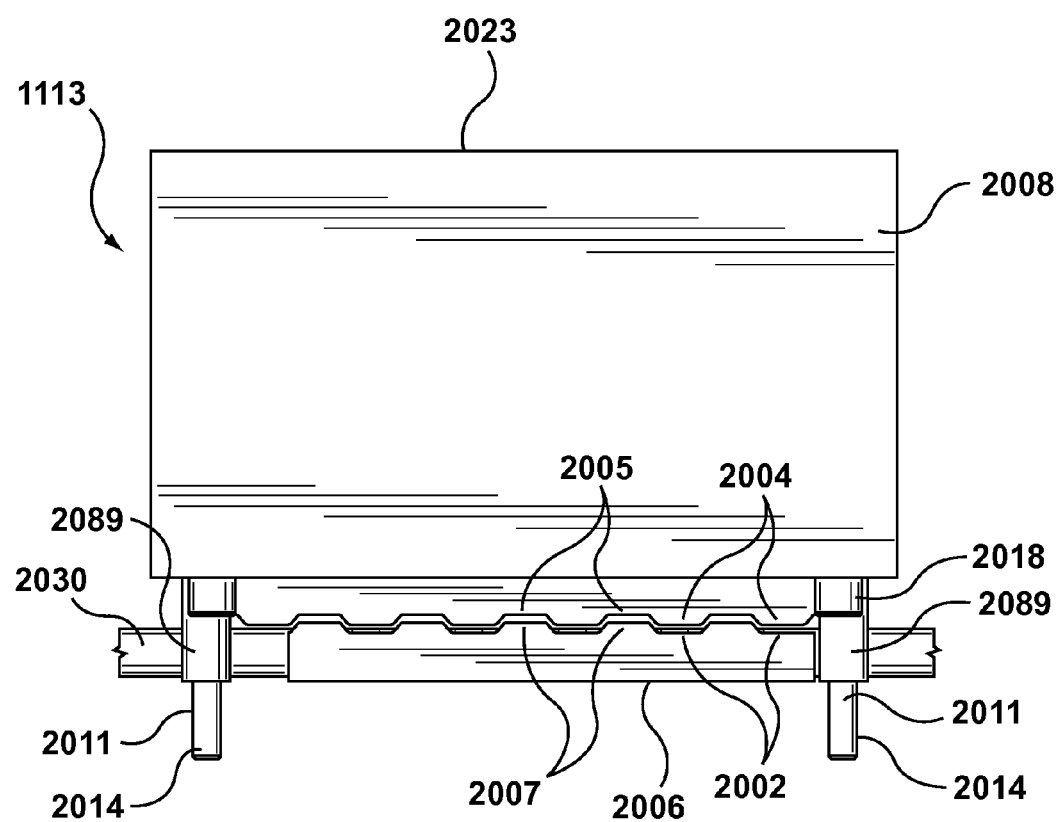
FIG. 24 is an enlarged view of the portion marked 24 in FIG. 23C.
Figure 25:
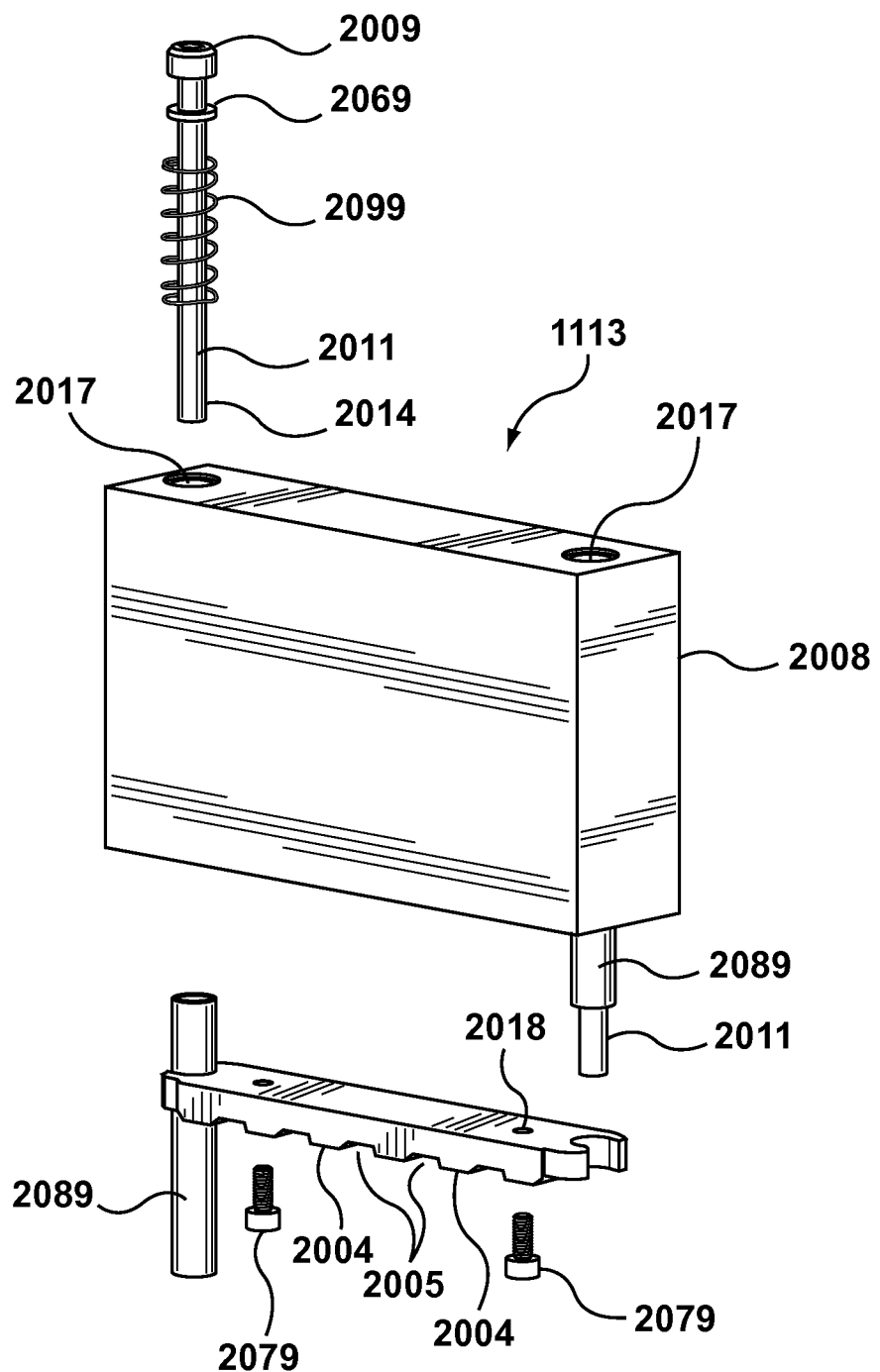
FIG. 25 is an exploded view of a part shown in FIG. 24.

Each of the adaptive tonnage blocks 1113 extends in the X and Z directions and may be received in a respective recess or aperture 2016 in the inward surface 2143 of cavity plate 1110. Each adaptive tonnage block 1113 may include an engagement portion 2008 having an engagement surface 2023 (FIG. 24). Engagement portion 2008 may have a separation block 2018 fixedly secured thereto with bolts 2079 (FIG. 25) passing thorough apertures in separation block 2018 and received into threaded apertures in the bottom surface of each engagement portion 2008. Thus, separation block 2018 can be configured for movement with engagement portion 2008. In some embodiments engagement portion 2008 and separation block 2018 may be integrally formed as a combined unitary portion of a tonnage block 1113.

Figure 26A:
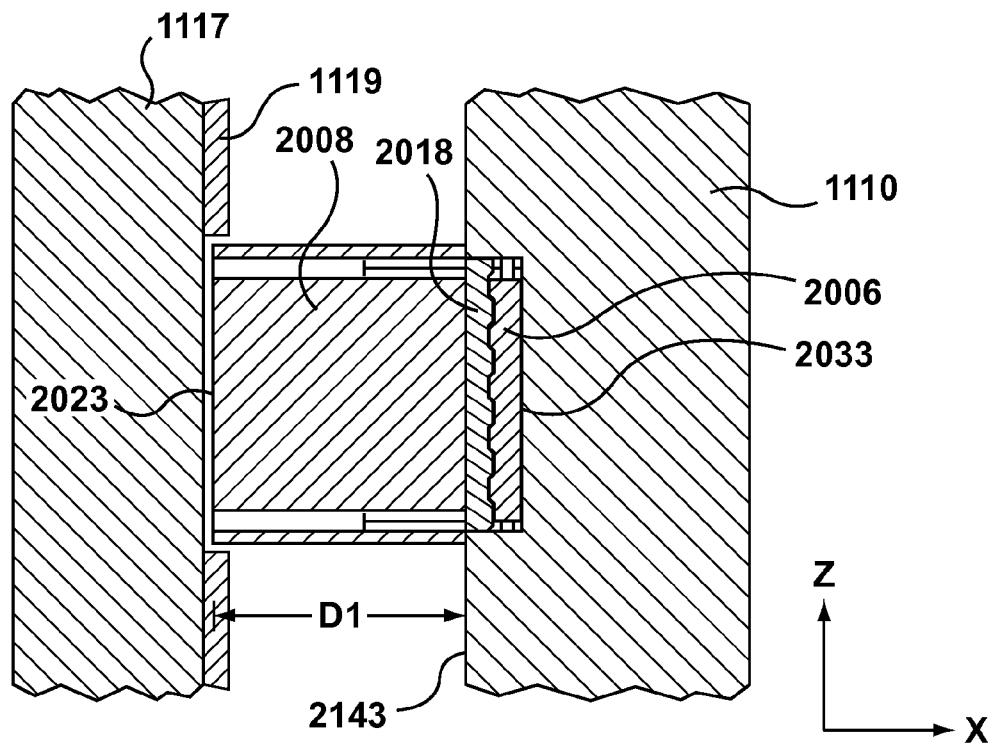
FIG. 26A is enlarged view of the portion marked 26 in FIG. 23C in one operational position.
Figure 26B:
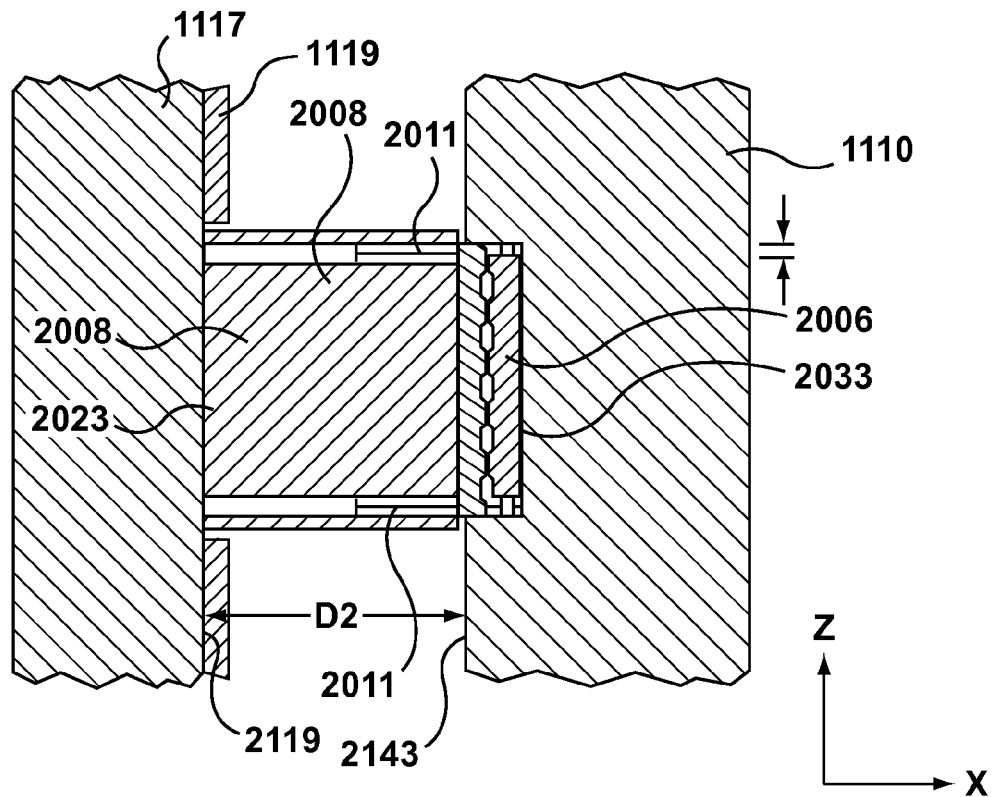
FIG. 26B is an enlarged view of the portion marked 26 shown in FIG. 23C but in another operational position.

With particular reference to FIGS. 26A and 26B, each engagement portion 2008 and separation block 2018 are moveable together in a direction parallel to axis X: between (a) a first (retracted) position (FIG. 26A) where the engagement surface 2023 is a first distance D1 from the surface 2143 of the cavity plate 1110 and (b) a second (extended) position (FIG. 26B) where the engagement surface 2023 is positioned a second distance D2 spaced away from the front of surface 2143 of cavity plate 1110. In the retracted position, tonnage block 1113 may be at least partially received in an aperture in wear plate 1119 and a gap may be left between engagement surface 2023 and stripper plate 1117. With tonnage block 1113 in this position, the distance between the opposing surfaces of the stripper plate 1117 and cavity plate 1110 is defined by the mold stack 1111 and the regular tonnage blocks 1118, and D1 (i.e. the distance between the engagement surface 2023 of the tonnage block 1118 and the surface 2143 of the cavity plate 1110 in the retracted position) is no more, and possibly is less, than the height of the regular tonnage blocks 1118. In the extended position, tonnage block 1113 is fully received in an aperture in wear plate 1119 and the engagement surface 2023 of engagement portion 2008 is in abutment with the surface 2119 of the stripper plate 1117. But distance D2 (i.e. the distance between the engagement surface 2023 of the tonnage block 1118 and the surface 2143 of the cavity plate 1110 in the extended position) is greater than D1 and the height of regular tonnage blocks 1118 and thus the distance between the opposing surfaces of the cavity plate 1110 and the stripper plate 1117 is increased by extension of the adaptive tonnage blocks 1113. Thus the height H and corresponding mold shut height S can be increased.

When the engagement surface 2023 is at the first (retracted) position (FIG. 26A) the injection mold 1100 may be in its standard mold operating configuration. When the engagement surface 2023 of the adaptive tonnage block 1113 is in its second (extended) position (FIG. 26B), the injection mold 1100 may be in an alternate operational configuration such as for example the vent cleaning operational configuration. The movement of the adaptive tonnage blocks 1113 may be coordinated with the movement of core plate adjustment mechanism 3000 and neck ring adjustment mechanism 4000 as described above.

With particular reference to FIGS. 24, 25, 26A and 26B, in addition to engagement portions 2008 and separation blocks 2118, each adaptive tonnage block 1113 may have a driving portion 2006 which is moveable with sliding motion in a direction parallel to the Z axis between first and second positions. The driving portion 2006 may be received with apertures 2016 in the cavity plate 1110 and driving portion 2006 has a surface 2033 which rests against an adjacent surface of the cavity plate 1110 in the apertures 2016 in the cavity plate. Thus, a load on the driving portion 2006 acting in the direction parallel to axis X towards the cavity plate 1110 can be transmitted to the cavity plate 1110. In the first position (shown in FIGS. 24 and 26A), upper protrusions 2007 on the surface of driving portion 2006 are received in recesses 2005 on the rear surface of the separation block 2018.

Similarly, in such a position, the recesses 2002 on driving portion 2006 may receive protrusions 2004 on the separation block 2018. In such a position, all the protrusions may not engage or at least are in such a position that the engagement portion 2008 is in its first position referenced above. Driving portion 2006 may be moved from the position shown in FIGS. 24 and 26A in a direction parallel to axis Z to a position shown in FIG. 26B where upper protrusions 2007 on its surface cam against the protrusions 2004 on the adjacent surface of the separation block 2018 and move the separation block 2018 along with engagement portion 2008 to a position where the protrusions 2007 are generally aligned with protrusions 2004 in the Z direction. This has the effect of causing the engagement portions 2008 to move outwardly in a direction parallel to the X axis. In this position an additional separation distance will be created between the opposed surface 2143 of cavity plate 1103 and the surface 2119 of stripper plate 1117.

The movement of engagement portion 2008 and separation block 2018 is limited to the aforementioned back and forward movements parallel to the X axis. This limited movement may be accomplished in many ways. For example, a pair of spaced pin members 2011 (FIG. 25) may be provided proximate opposed ends of the engagement portion 2006 having shafts that are generally axially aligned with axis X. The shafts of pins 2011 may have bottom threaded end portions 2014 that pass through the engagement portion 2008, separation block 2018 and driving portion 2006 of adaptive tonnage blocks 1113 and are received in corresponding threaded apertures in the cavity plate 1110. Thus the pins 2011 secure the adaptive tonnage blocks 1113 to the cavity plate 1110. Shafts of pins 2011 may also have upper portions that at their upper end are integrally connected with heads 2009. Each pin 3011 may be received through a generally cylindrical sleeve tube 2089 that may be itself be housed in a generally cylindrical pad aperture 2017 that passes entirely through engagement portion 2008. The sleeve 2089 may also be housed within and pass through an aligned aperture in separation block 2018. Below each pin head 2009 of pin 2011 is a shoulder portion 2069 and beneath the shoulder 2069 is a spring 2099 which engages and is retained in compression between shoulder 2069 and separation block 2018. Spring 2099 may fit around the outer surface of sleeve 2089. Engagement portion 2008 and separation block 2018 may slide up and down relative to sleeve 2089. Thus, when engagement portion 2008 and separation block are moved by driving portion 2006, there will be a restoring force exerted by the spring 2099 as it is held between the shoulder 2069 and separation block 2018. It will be appreciated that the engagement portion 2008 may move in a direction parallel to axis X as the apertures slide over pins 2011 between an extended position, and a retracted position where the protrusions 2004 of the separation block 2018 are transversely aligned and in abutment with the recesses 2002 of the driving portion 2006 (i.e. the engagement portion 2008 is fully retracted).

With particular reference now to FIGS. 23A and 24 it can be observed that to cause driving portion 2006 to be driven in reciprocating movement in a direction parallel to axis Z, driving portion 2006 may be secured to a connecting rod 2030 that generally runs in a direction parallel to axis Z. Driving portion 2006 may be secured to connecting rod 2030 by interlocking teeth 2121 (FIG. 23C) or by other suitable methods such as by way of example welding or bolting. Engagement portion 2008, separation block 2018 and driving portion 2006 may be made of any suitable material such as by way of example stainless steel. Similarly, connecting rods 2030 may be made from any suitable material such as by way of example a heat-treated steel. A single rod 2030 may be attached to driving portions 2006 of one or more aligned back up pad devices 3001. For example, the rod 2030 depicted in the cross sectional view of FIG. 23B is attached to four driving portions 2006 of separate adaptive tonnage blocks 1113.

A plurality of connecting rods 2030 may be provided so that the driving portion 2006 of each adaptive tonnage block 1113 in the cavity plate 1110 may be connected to at least one connecting rod 2030. The plurality of connecting rods 2030, which all may be aligned in a direction parallel to axis Z, may be themselves be all interconnected by any known and suitable attachment mechanism such as bolting, welding etc. to a common actuator cross bar 2035 that may be made from any suitable material such as by way of example only stainless steel.

Actuator cross bar 2035 may be oriented in a direction generally orthogonal to the connecting rods and generally parallel to axis Y. Thus connecting rods 2030 and actuating bar 2035 may together constitute a connection mechanism to connect the driving portion 2006 with an actuator. Connecting rods 2030 may in some embodiments such as is illustrated in FIGS. 22 and 23A be housed and moveable within enclosed channels that extend within the body of the cavity plate 1110, and thus will be generally not be visible when looking at the cavity plate such as in the view shown in FIG. 19. In other embodiments, the connecting rods 2030 may be housed and moveable within open channels where the channels are formed as longitudinally extending grooves defined in the cavity plate and at the inward facing surface of cavity plate 1110.

Actuator bar 2035 may in turn be secured in a suitable manner to an actuating device 2045 (FIG. 23A) such as a servo motor, pneumatic piston, under the control of controller 3050. Actuating device 2045 may have an actuating shaft (not shown) capable of providing intermittent, controlled, reciprocating movement back and forth in directions that are generally parallel to axis Z. Actuating device 2045 may thus have communication link to the controller 3050. Actuating device 2045 may be mounted within the cavity plate 1110 with screws connecting it to the cavity plate 1110. By means of the interconnection of actuating device 2045 and its reciprocating shaft interconnected to actuating cross bar 2035, which in turn is connected to each of the connecting rods 2030, which in turn are interconnected to driving portions 2006 of adaptive tonnage blocks 1113, cyclical, controlled and intermittent movement of the actuating shaft of the actuating device 2045, may result in synchronized movement of each driving portions 2006 in a direction parallel to axis Z, and thus the synchronized movement of all engagement portions 2008 in the direction parallel to axis X. By way of example only, actuator shaft of actuating device 2045 may be moved about 10 mm in a direction parallel to axis Z, resulting in a corresponding movement parallel to the Z axis of the connecting rods 2030 and the driving portions 2006 of the back up pad devices 3001. The engagement of driving portions 2006 with separation blocks 2018 and thus engagement portions 2008 may translate into 0.5 mm movement of the engagement portions 2008 in a direction parallel to axis X to result in an increase in separation of 0.5 mm separation between the opposed surfaces of the cavity plate 1110 and the stripper plate 1117. Under the control of CONTROLLER 3050, this may occur in a coordinated fashion with the movement of neck ring halves 1114a, 1114b in a direction parallel to the Y-axis and the movement of back up pads 3001 in a direction parallel to the X-axis.

During normal molding use, core plate 1103 and cavity plate 1110 will be cycled to a closed position as shown in FIG. 14 with the mold stack therebetween providing a first operational configuration for the mold 1100. While in this position, the mold stack 1111 is subjected to compressive clamping force A (FIG. 14A) as mold material is injected and then cooled and hardened. Subsequent to cooling of parts, the stack is moved from its normal operational configuration and cycled to its open position (FIG. 27), in which the clamping force is released and the core and cavity plates are spread longitudinally relatively apart, thus taking on a non-operational configuration (i.e. the mold is not in a configuration where it is being operated to inject mold material into the mold cavities). In the mold open configuration, finished parts are ejected in a conventional manner as the stripper plate 1117 slides away from the core plate 1103 and, slide bars 1115a, 1115b and neck ring halves 1114a, 1114b are moved laterally outwardly to the position shown in FIG. 27. During this normal operation, vents in neck ring halves 1114a, 1114b may function substantially as described above with reference to FIGS. 3a-3c. That is, vents in neck ring halves 1114a, 1114b may permit gas to escape, but prevent substantial quantities of injected mold material from entering the vents. In such normal operation, in order for the mold stack to close to the desired molding configuration, each of the cavity plate adjustment mechanism 2000 and core plate adjustment mechanism 3000 operate in their first (retracted) conditions, and neck ring adjustment mechanism 4000 operates in its first (normal) condition as described above. The positions of the mold stack components in the closed state of this normal molding operation are as depicted in FIG. 14A.

Figure 27:
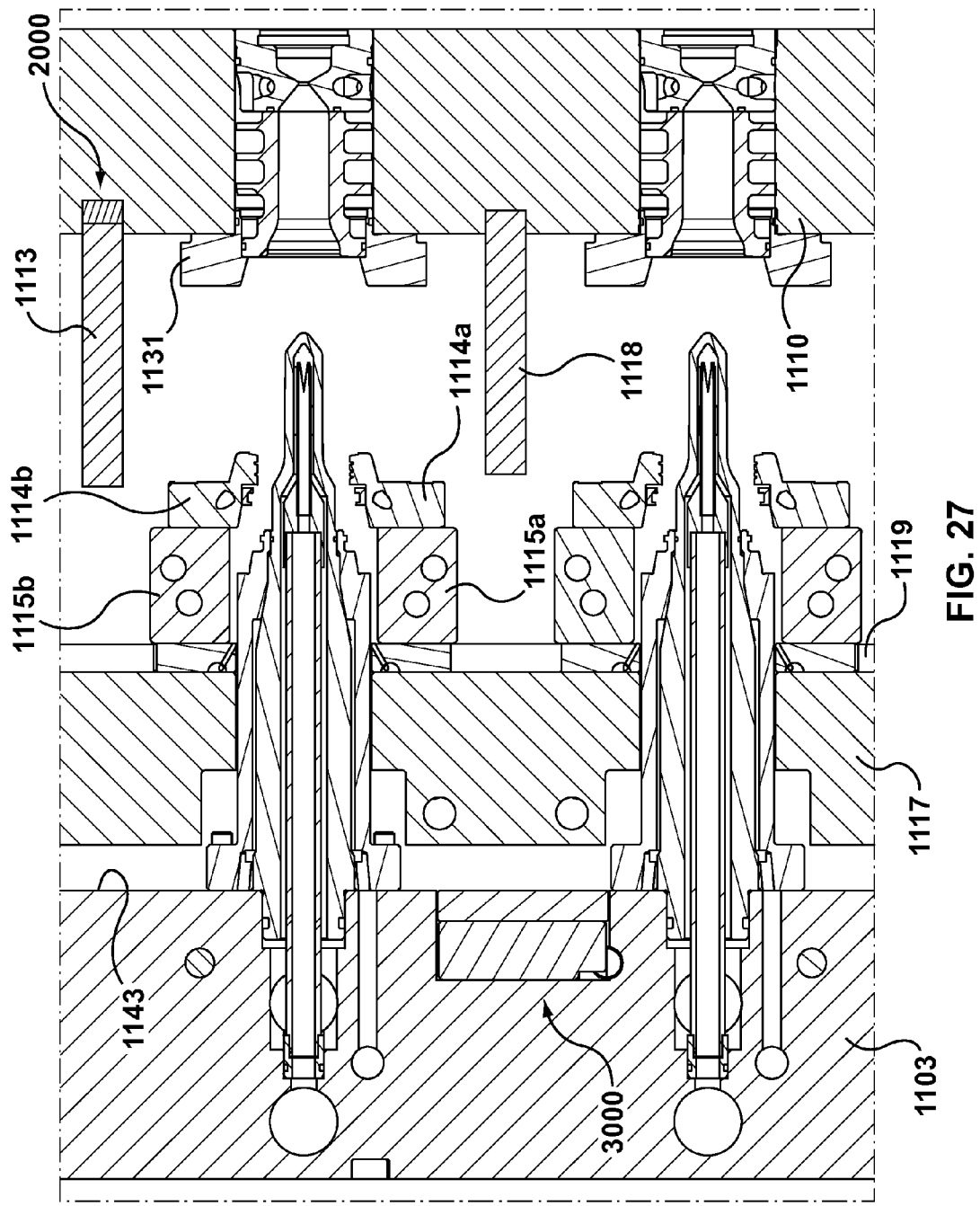
FIG. 27 is a cross-sectional view through part of the mold part of FIG. 14, with the injection mold open.

Periodically, it may be desired to place the mold 1100 in an alternate operational configuration, such as an operational configuration which can clean vents as described above. As will be appreciated from the foregoing description, cleaning may entail providing additional clearance between neck ring halves 1114a, 1114b to increase vent size. At the beginning of a cleaning cycle, the mold 1100 may be open as shown in FIG. 27. Actuating device 3045 may then be cycled to cause back up pads 3001 to be extended, which will result in core plate 1103 being spaced apart from stripper plate 1117 and the neck ring halves 1114a, 1114b. As noted, cycling of actuating device 3045 also causes movement of actuating blocks 4010 so that thrust pad devices 4012a, 4012b push the slide bars 1115a, 1115b and therefore the neck ring halves 1114a, 1114b apart. Meanwhile, actuating device 2045 may cause adaptive tonnage blocks 1113 to be extended, which in turn causes cavity plate 1110 and stripper plate 1117 to have an increased spacing apart from one another. As will now be appreciated, this provides lateral clearance permitting the neck ring halves 1114a, 1114b to be held spaced apart. The mold may then be closed, by appropriate relative movement between the cavity plate 1110 and the wear plate 1119, stripper plate 1117 and core plate 1103, but without application of any significant clamping force A.

In this alternate (cleaning) operational configuration, the components of the mold stack are positioned as shown in FIG. 28 when the mold stack is closed. In this condition, an enlarged gap exists between the neck ring halves as shown in FIG. 3D. Once the mold components are in this configuration, clamping force A may be applied. In some embodiments, clamping force A may be reduced relative to the clamping force that is applied during normal molding operation. In other embodiments, the clamping force could be the same or even greater than in the normal operational mode. This might be required because the molding material is acting on a larger surface area of the components. Molding material is then injected and cooled and molded parts are ejected substantially as described above. Due to the spacing apart of neck ring halves 1114a, 1114b during molding, molding material occupies the enlarged vents which may have the effect of removing residue from the vents as described above. This may also result in excess flash material on finished parts. Such parts may therefore be discarded.

In other embodiments, cycling of actuating device 3045 and actuating device 2045 may occur with the mold in the position depicted in FIG. 28—that is with the mold closed. In such a case, mold components may be pushed to their alternate (cleaning) configurations with cavity plate adjustment mechanism 2000, core plate adjustment mechanism 3000 and neck ring adjustment mechanism 4000 being operated so that the components adopt their alternate configurations.

In other embodiments, the cavity plate adjustment mechanism, core plate adjustment mechanism and the neck ring adjustment mechanism may be used alone or in combination to selectively create spacing between mold stack components for reasons other than vent cleaning. In some embodiments, all or some of core plate adjustment devices 3001 and cavity plate adjustment devices 2001 could be provided with individual activation instead of having connectors like 2030 or 3030. Individual activation could be done by hydraulic and/or pneumatic device (cylinder) or by servo drives (electrical).

As an alternative, or even in addition, to employing the mold shut height adjustment apparatus described herein for vent cleaning, the apparatus may also be used to implement the method described in commonly assigned US patent publication 2012/0219651 to Weber et al., published on Aug. 30, 2012. Specifically, the present non-limiting embodiments of the mold shut height adjustment apparatus may be useful in implementing a pressure-control system in an injection mold for selectively changing a volume of a mold cavity defined within the mold after isolation thereof from a stream of molding material. A technical effect attributable to the foregoing may include, amongst others, providing a pre-eject function while maintaining contact between the molded article and the molding surfaces of the mold cavity.

It should be understood that for the purposes of the description provided above and claims presented below, the term "fluid", "gas" or "air" are meant to denote fluid present in the molding cavity and being vented from the molding cavity and the molding material fills in the molding cavity. The terms "fluid", "gas" or "air" can denote ambient air around the molding system, as well as the ambient air mixed in with other substances potentially present within the molding system.

The description of the embodiments of the present inventions provides examples of the present invention, and these examples do not limit the scope of the present invention. It is to be expressly understood that the scope of the present invention is limited by the claims only. The concepts described above may be adapted for specific conditions and/or functions, and may be further extended to a variety of other applications that are within the scope of the present invention. Having thus described the embodiments of the present invention, it will be apparent that modifications and enhancements are possible without departing from the concepts as described.

Therefore, what is to be protected by way of Letters Patent are limited only by the scope of the following claims:

1. A method of cleaning of a portion of a mold component, the portion of the mold component including a passage configured, in use, to allow passage of gas and to prevent passage of melt, the method comprising:
   entering the mold component into a cleaning configuration, whereby a portion of the passage becomes part of a molding surface;
   performing a molding cycle to fill in at least the portion of the passage with molding material for incorporation and removal of a residue therefrom;
   stopping a melt front at a predefined point in the passage cleaning configuration, whereby melt flooding of the passage is executed in a controlled manner;
   wherein the passage is defined on split line surfaces between a first mold component and a second mold component that define a molding cavity therebetween the melt front is stopped at least a first melt stop defined on at least one of the split line surfaces.

2. The method of claim 1, further comprising ejecting the molded article from the molding structure, the molded article comprising a molded appendix corresponding to the shape of the at least a portion of the passage.

3. The method of claim 1, wherein said at least the portion of the passage comprises the portion that is, in use during standard molding, is wetted by the gas.

4. The method of claim 1, further comprising during said performing, increasing pressure between the melt and the residue.

5. The method of claim 1, wherein the melt front is stopped at a second melt stop defined on at least one of the split line surfaces.

6. The method of claim 1, further comprising actuating a first passage control member between a first configuration where the passage allows for the passage of fluid and prevents passage of the melt and a second configuration in which the passage becomes part of the molding surface; and
   actuating a second passage control member between a retracted and an extended configuration, the second passage control member to configure a portion of the venting passage into a secondary vent area that allows passage of the gas but not passage of the melt.

7. The method of claim 1, wherein the passage is defined on split line surfaces between a first mold component and a second mold component that define a molding cavity therebetween, wherein in the cleaning configuration the melt stops at a portion of a secondary vent area defined on the split line surfaces that is sized to provide a path for gas while preventing the flow of any substantial amount of molding material therethrough.

8. The method of claim 7, wherein the melt stops at an apex point on the secondary vent.

9. The method of claim 7, wherein with the entering of the mold component from a standard molding configuration into the cleaning configuration a width of a primary vent area increases whereas a width of the secondary vent remains substantially constant.

10. The method of claim 9, wherein when the mold component is in the standard molding configuration the primary vent area and the portion of the secondary vent area are sized to provide a gap between about 0.03 mm and about 0.05 mm and in the cleaning configuration the primary vent area is sized to provide a gap of about 0.28 mm and the portion of the secondary vent area remains sized to provide a gap between about 0.03 mm and about 0.05 mm.

11. A method of operating a mold comprising:
   maintaining a neck ring in a standard molding configuration and executing at least one molding cycle;
   actuating the neck ring into a vent cleaning configuration and executing at least one molding cycle in the vent cleaning configuration to remove residue from at least a primary vent area of the neck ring, wherein actuating comprises:
   maintaining the primary vent area in a dimension that allows the molding material to pass therein; and
   maintaining a dimension of a secondary vent area that is configured for (i) allowance of the passage of air from the primary vent area and (ii) not allowing any substantial amount of the molding material for passing therethrough;

whereby melt flooding of the primary vent area is executed in a controlled manner.

12. The method of claim 11, wherein said actuating comprises reducing clamp tonnage.

13. The method of claim 12, wherein said reducing clamp tonnage comprises reducing clamp tonnage by between 10 and 15 percent below the injection pressure for the mold.

14. The method of claim 11, wherein said actuating comprises controlling the width of the primary vent area.

15. The method of claim 11, wherein the neck ring comprising a venting structure that includes the primary vent area, wherein said actuating comprises controlling the width of the primary vent area.

16. The method of claim 11, wherein said actuating comprises mechanically controlling separation between machine components.

17. The method of claim 11, further comprising ejecting the molded article from the neck ring, the molded article comprising a molded appendix corresponding to the shape of the primary vent area.

18. The method of claim 11, wherein with the entering of the neck ring into the vent cleaning configuration a width of the primary vent area increases whereas a width of the secondary vent remains substantially constant.

19. The method of claim 18, wherein when the neck ring is in the standard molding configuration the primary vent area and the portion of the secondary vent area are sized to provide a gap between about 0.03 mm and about 0.05 mm and in the cleaning configuration the primary vent area is sized to provide a gap of about 0.28 mm and the portion of the secondary vent area remains sized to provide a gap between about 0.03 mm and about 0.05 mm.

20. A method of operating an injection mold comprising:
  i. operating the mold in a first operational configuration;
  ii. varying a mold shut height of the mold with a mold shut height adjustment apparatus that is embedded in at least one of a first mold half and a second mold half of the mold;
  iii. operating the mold in a second operational configuration;
  wherein varying a mold shut height of the mold includes actuating a distance augmenting structure between a standard molding configuration and a cleaning configuration, wherein in the cleaning configuration a pre-defined gap is provided between a stripper plate assembly and one of a first mold half and a second mold half of the mold.

21. The method as claimed in claim 20 wherein by operating said mold shut height adjustment apparatus the mold shut height is varied to facilitate the reconfiguration of said mold between said first operational configuration and said second operational configuration.

22. The method as claimed in claim 20 wherein a first mold half comprises a core plate and a second mold half comprises a cavity plate.

23. The method as claimed in claim 20 wherein said first operational configuration is associated with a first mold shut height S1 and said second operational configuration is associated with a second mold height S2 that is different than S1.

* * * * *